United States Patent
Vartanian et al.

(10) Patent No.: US 11,966,978 B2
(45) Date of Patent: Apr. 23, 2024

(54) SMART MOBILITY PLATFORM

(71) Applicant: Onlia Holding Inc., Toronto (CA)

(72) Inventors: Fernand Vartanian, Toronto (CA); Mylene Paoloni, Toronto (CA); Martin Halada, Toronto (CA); Sean Edward O'Donoghue, Toronto (CA)

(73) Assignee: Onlia Holding Inc.

( * ) Notice: Subject to any disclaimer, the term of this patent is extended or adjusted under 35 U.S.C. 154(b) by 0 days.

(21) Appl. No.: 16/280,608

(22) Filed: Feb. 20, 2019

(65) Prior Publication Data

US 2019/0287180 A1    Sep. 19, 2019

Related U.S. Application Data

(60) Provisional application No. 62/632,489, filed on Feb. 20, 2018.

(51) Int. Cl.
*G06Q 40/08* (2012.01)
*G06F 16/25* (2019.01)
*G07C 5/00* (2006.01)
*G07C 5/02* (2006.01)

(52) U.S. Cl.
CPC .......... *G06Q 40/08* (2013.01); *G06F 16/252* (2019.01); *G07C 5/008* (2013.01); *G07C 5/02* (2013.01)

(58) Field of Classification Search
CPC ...... G06Q 40/08; G06F 16/252; G07C 5/008; G07C 5/02
See application file for complete search history.

(56) References Cited

U.S. PATENT DOCUMENTS

| | | | |
|---|---|---|---|
| 8,510,200 B2 | 8/2013 | Pearlman et al. | |
| 8,812,352 B2 | 8/2014 | Boss et al. | |
| 9,466,161 B2 | 10/2016 | Ricci | |
| 2002/0111725 A1* | 8/2002 | Burge | G07C 5/008 701/31.4 |
| 2008/0243558 A1 | 10/2008 | Gupte | |
| 2011/0087520 A1* | 4/2011 | Race | G06Q 30/0201 705/7.29 |
| 2013/0151588 A1 | 6/2013 | Basir | |
| 2013/0302757 A1 | 11/2013 | Pearlman et al. | |
| 2014/0082707 A1* | 3/2014 | Egan | H04L 63/0853 726/5 |
| 2014/0180725 A1* | 6/2014 | Ton-That | G06Q 10/10 705/4 |
| 2014/0310192 A1 | 10/2014 | Boss et al. | |
| 2015/0006207 A1 | 1/2015 | Jarvis et al. | |

(Continued)

*Primary Examiner* — Bennett M Sigmond
*Assistant Examiner* — Raven E Yono
(74) *Attorney, Agent, or Firm* — McMillan LLP

(57) ABSTRACT

A method by smart mobility platform includes a mobile application executing on a mobile device, an authentication server, a mobile application server, and a driving telemetry service. The mobile application registers and activates a user account for driving monitoring and rewards. Trip detection is enabled and raw data is transformed to driving factors by the driving telemetry service. The mobile application server converts the driving factors to a safe driving score. The score may be combined with a customer value to determine reward payout. The platform authenticates users and validates requests using electronic mail and short messaging services to ensure privacy and security.

18 Claims, 56 Drawing Sheets

(56) References Cited

U.S. PATENT DOCUMENTS

| | | | |
|---|---|---|---|
| 2015/0058132 A1* | 2/2015 | Tuck | G06Q 30/02 |
| | | | 705/14.66 |
| 2015/0081404 A1 | 3/2015 | Basir | |
| 2015/0120335 A1* | 4/2015 | Braun | G06Q 40/08 |
| | | | 705/26.4 |
| 2015/0206248 A1* | 7/2015 | Kornweibel | G06Q 40/08 |
| | | | 705/4 |
| 2016/0063502 A1* | 3/2016 | Adjaoute | G06Q 20/4016 |
| | | | 705/44 |
| 2016/0086285 A1* | 3/2016 | Jordan Peters | G08G 1/096827 |
| | | | 701/484 |
| 2016/0092899 A1 | 3/2016 | Osberg | |
| 2016/0125445 A1* | 5/2016 | Jaladi | G06Q 20/387 |
| | | | 705/14.27 |
| 2016/0234284 A1* | 8/2016 | Bao | H04L 67/63 |
| 2017/0075740 A1* | 3/2017 | Breaux | H04W 48/04 |
| 2017/0140652 A1* | 5/2017 | Hodges | G06F 3/04842 |
| 2017/0339631 A1* | 11/2017 | Pugaczewski | H04W 12/06 |
| 2017/0365007 A1* | 12/2017 | Huls | H04W 4/40 |
| 2018/0068392 A1* | 3/2018 | Bowes | G06Q 40/08 |
| 2018/0097928 A1* | 4/2018 | Pandurangarao | H04M 1/72412 |

* cited by examiner

| Trip | Telematics Score | Sub-trip | SDS | Points |
|---|---|---|---|---|
| 1 | 93 | 1-1 | 98 | 9,820 |
|  |  | 1-2 | 89 | 8,910 |
|  |  | 1-3 | 93 | 9,330 |
| 2 | 93 | 2 | 93 | 9,340 |
| 3 | 85 | 3 | 85 | 8,490 |
| Average Daily SDS | | | 92 | 45,890 |

FIG. 3A

| Trip | Telematics Score | Navigation Used? | Final Trip SDS | Sub-trip | Telematics Score | Navigation Used? | Points |
|---|---|---|---|---|---|---|---|
| 1 | 93 | TRUE | 94 | 1-1 | 98 | TRUE | 9,820 |
|  |  |  |  | 1-2 | 89 | TRUE | 9,010 |
|  |  |  |  | 1-3 | 93 | TRUE | 9,370 |
| 2 | 93 | FALSE | 84 | 2 | 93 | FALSE | 8,370 |
| 3 | 85 | FALSE | 77 | 3 | 85 | FALSE | 7,650 |
|  | Average Daily SDS |  | 85 |  |  | Points | 44,220 |

SDS = 90% * (Telematics Score) + 10% * (Use of Navigation)

FIG. 3B

| Safe Drive score | Customer Payout Factor | Customer Reward | Program Payout | % of GTV |
|---|---|---|---|---|
| 1-89 | 0 | 0 | 0 | 0 |
| 90 | 46.84% | 100.00 | 444.75 | 5.0% |
| 91 | 49% | 118.79 | 566.19 | 5.9% |
| 92 | 51% | 138.81 | 709.49 | 6.9% |
| 93 | 53% | 160.08 | 865.98 | 8.0% |
| 94 | 55% | 182.58 | 1,060.10 | 9.1% |
| 95 | 57% | 206.31 | 1,165.83 | 10.3% |
| 96 | 60% | 231.29 | 1,100.43 | 11.6% |
| 97 | 62% | 257.50 | 930.55 | 12.9% |
| 98 | 64% | 284.95 | 505.77 | 14.2% |
| 99 | 81% | 387.34 | 313.55 | 19.4% |
| 100 | 99% | 500.00 | 117.37 | 25.0% |
|   |   |   | 7,800.00 |   |

Customer Factor is optimized to reward

FIG. 11

SMART MOBILITY PLATFORM

RELATED APPLICATIONS

The present application claims priority from U.S. Provisional Patent Application No. 62/632,489 filed on Feb. 20, 2018 and the contents of which are herein incorporated by reference in their entirety.

FIELD OF THE INVENTION

The present invention relates generally to mobile applications and systems, and more specifically to a smart mobility platform.

BACKGROUND OF THE INVENTION

Property and casualty insurance protects property one owns, such as homes and cars. It also provides liability coverage to help protect one if found legally responsible for an accident that causes injuries to another person or damage to another person's belongings.

Insurance is a contract between an individual and an insurance company, represented by a policy. Customers buy financial protection, and insurance companies are in the business of paying out claims. An insurance company spreads risks in exchange for premium payments. The insurance company collects a greater amount of premium payments than it has to pay for insured losses (claims filed by its insured). The premiums that insurance companies collect are calculated on different risk factors per account holder or insured which may be an individual or a group of individuals. Customers that are perceived to be exposed greater risk pay a higher premium to the insurance company because they are more likely to file a claim.

Customers often engage an insurance company which protects their family in case something unfortunate occurs. Customers particularly need to understand what any given insurance company has to offer, and need to understand what is special about the insurance company. Customers consider several options from a number of insurance companies, and then feel the need to finalize their research and make a selection of an insurance provider. Once the selection is made, the insurance coverage is purchased and secured. Customer fulfillment and retention may be accomplished when the insurance provider allows the customer to stay on top of changes to their policy and occasionally manage their account information. Customers may also need to be informed about new insurance products without having to actively seek the information.

From an insurance provider's perspective, the provider initially evaluates a customer's coverage needs and quotes a premium. This is followed by the collection of premiums in exchange for coverage. Should the customer make a claim, the claim is processed and the insurer must fulfill its obligation to receive, investigate, and act on a claim filed by the insured. The insurance provider, naturally, seeks to retain its clients in the sense that the clients do not actively cancel their coverage when they can and that they renew their contracts of insurance.

Traditional insurance pricing uses many rating factors: demographic factors such as age, gender, home location and marital status; vehicle factors such as make, model, year and type; driving record factors such as violations, accidents and claims; and other factors such as credit score. While many of these factors correlate with risk and predict future claims, they are only proxies. They do not embody the actual risk associated with someone's driving behavior. Usage Based Insurance (UBI), however, is a different way to price insurance. Telematics are used to collect information on driving practices of drivers. The telematics information is used to adjust insurance premiums. The more safely drivers drive, the less they pay. However, traditional UBI models encounter several challenges: they are slow to onboard; it takes about 1 year for assessment and a premium discount to kick in; they are heavy on insurance process in that they must be filed with a regulator; they are often focused on insurance rather than on safety and driver behaviour; and they only provide a single reward to the customer, typically one time at the time of renewal of the insurance policy which limits the incentives to improve driving behaviour.

It is in the best interest of both insurance providers and customers to reduce accidents. For insurance providers, it means a reduction in claim fulfillment and hence increased profitability. For customers, it means both increased safety and a decrease in the likelihood of a surge in insurance premiums, possibly even a reduction in premiums.

Certain driving practices have been shown to impact the probability of the occurrence of vehicle accidents. For example, hard braking, cornering, acceleration, speed, as well as distracted driving are also predictive factors in the probability of occurrence of accidents. A major synthesis of research on left-turn lanes demonstrated that exclusive turn lanes reduce crashes on left turns between 18 to 77 percent (50 percent average) and reduce rear-end collisions between 60 and 88 percent (US Department of Transportation, Federal Highway Administration). Accidents related to run off road and sideswipes can be reduced by slowing down and the increase of distance between cars by a factor of 13 to 44 percent (American Association of State Highway and Transportation Officials).

General research points to a 20-30 percent reduction in claim costs as a result of using UBI that incorporates telematics. UBI acts as a self selection program as only good drivers tend to enter the program and tend to score better in the critical factors such as acceleration, braking, cornering and speed. Improvements via coaching and monitoring of driving activity also contributes to improved driving habits and thus lower probability of accidents over time.

Distracted driving is a leading cause in accidents and has recently surpassed drunk driving. Mobile applications or apps that reduce distraction to drivers by disabling various notifications have resulted in a 25-30 percent reduction in claims for drivers who have downloaded some of the apps.

SUMMARY OF THE INVENTION

In one aspect of the present invention there is provided a method of providing a safe driving score, over a period of time, comprising: gathering motion and positioning data from a motor vehicle during trips taken by driving using telematics on a mobile phone in the motor vehicle; deriving a plurality of driving factors from gathered data; determining a telematics driving score based on the plurality of driving factors; and determining a safe driving score based on the telematics score.

In another aspect of the present invention there is provided a smart mobility platform system comprising: a client layer represented by a mobile application running on a smart phone; an integration layer comprised of a mobile application server, a database, and a plurality of other supporting entities; and a backend layer; wherein: the mobile application comprises a trip detection and scoring module for gathering motion and positioning data from a motor vehicle during trips taken by driving using telematics and for sending motion and positioning data to a driving telemetry service; the backend layer comprises the driving telemetry service for receiving the motion and positioning data, deriving driving factors, and sending; and the integration layer comprises a mobile application server that includes a trip rules engine for receiving driving factors and deriving a safe driving score therefrom.

In yet another aspect of the present invention there is provided a method by smart mobility platform including: a mobile application executing on a mobile device, an authentication server, a mobile application server, and a driving telemetry service, the method comprising: the mobile application registering a user of the mobile device with a mobile application server, for driving monitoring and rewards; the mobile application requesting activation of the user's account with said driving telemetry service; upon successful activation, the mobile application requesting the enablement of trip detection by invoking a trip detection and scoring module; sending, by said trip detection and scoring module, driving telemetry data for a trip, in raw form, to said driving telemetry service; the driving telemetry service deriving driving factors from said driving telemetry data, and sending said driving factors to the mobile application server; the mobile application server deriving a safe driving score from said driving factors; the mobile application server causing a push notification to be sent to said mobile application indicating the completion of the driving score derivation; the mobile application receiving confirmation whether the user was a driver in said trip; and if the user was not a driver, the trip detection and scoring module sends a message to the driving telemetry service indication that the trip data be tagged accordingly.

BRIEF DESCRIPTION OF THE DRAWINGS

The exemplary embodiments of methods and systems of the present invention, may be better understood with reference to the following drawings, in which:

FIG. 3A is an exemplary computation of an SDS based on a telematics score for various trips;

FIG. 3B is another exemplary computation of an SDS based on both a telematics score and the use of navigation;

FIG. 11 is an exemplary detailed computation of the distribution of rewards, compared to insurance premiums, based on the safe driving score of a sample 100 driver community;

DETAILED DESCRIPTION OF THE EMBODIMENT

Embodiments of the present invention will now be presented by way of example only and not limitation, with reference to the attached drawings.

The system and methods presented in accordance with the present invention aim to achieve various improvements over the traditional UBI models. For example, the proposed system and method provide a proposed safety model that has a number of improvements. The proposed model is easy to understand and provides simple mechanics for everyone. A simple on-boarding process is provided; the user simply downloads a mobile app and can start driving. A proposed rewards program is not tied to insurance but rather is offered by an affiliate marketing and financial technology company. The rewards are provided to users on a monthly basis and in cash. The system is engagement-based, and improvement in driving behavior leads to higher rewards and lower risk.

Safe Driving Score

A Safe Driving Score (SDS) is provided. The SDS is a calculation based on a complex and expanding set of driving metrics captured via a user's mobile phone. The SDS is grounded in a telematics model which leverages data such as: distance travelled, time of day, day of week, vehicle speed, smoothness of cornering, rate of acceleration and rate of braking. Accordingly, in one embodiment, the SDS is based on a telematics driving score. In another embodiment, the SDS also takes into account driver distraction. For example, if the driver handles the phone, or touches the phone screen while driving, this amounts to driver distraction. In another aspect, if the driver disables some or all of the notification features on the phone, then they avoid being distracted while driving provided they do not touch or handle the phone. An assisted driving safety factor may also be taken into consideration when calculating the SDS. The assisted driving safety factor is based on whether a trip is being driven with the assistance of a navigation app.

Figure 1A:
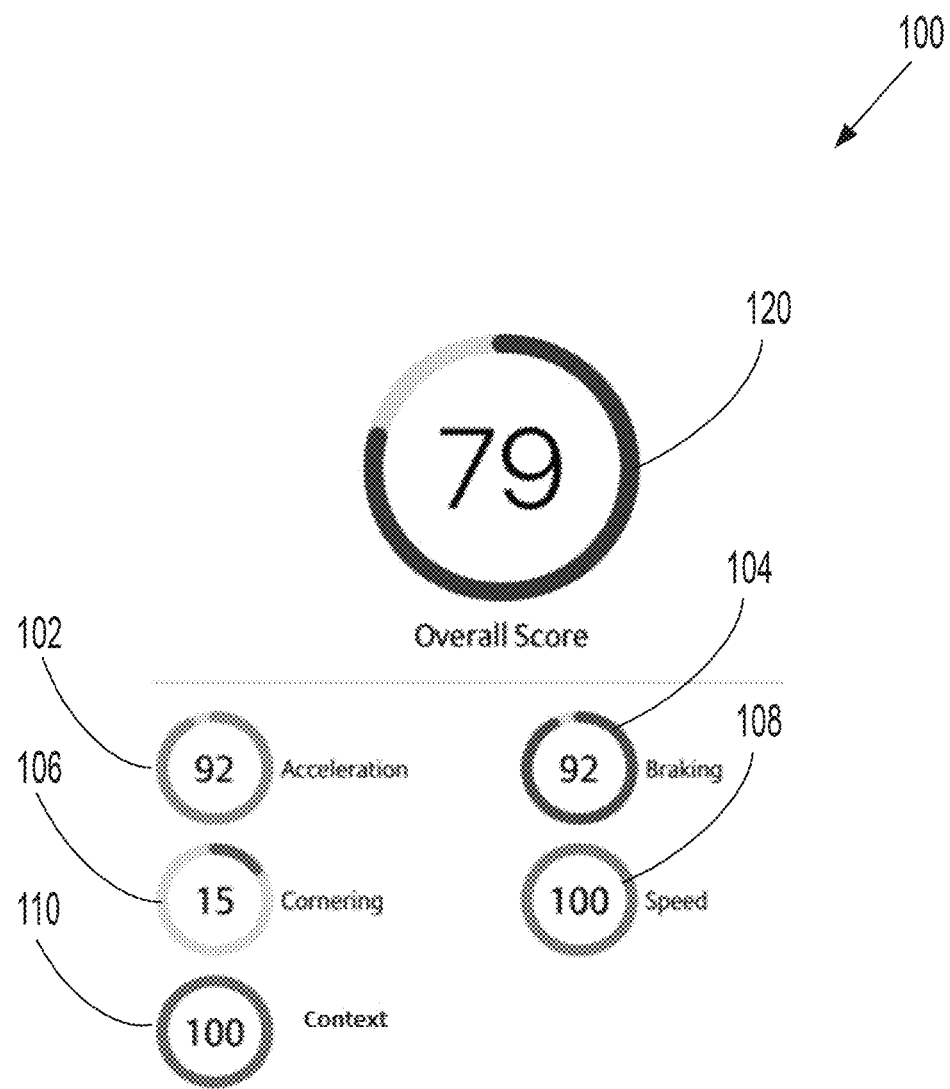
FIG. 1A is a representation of a safe driving score (SDS) as a driving telematics score computed from various driving characteristics gathered via telematics.

Mobile phones, particularly smart phones, now contain various sensors such as 3-axis accelerometers, gyroscopes, electronics compasses, and GPS transceivers. Accordingly, motion and position data can be gathered by a mobile phone and used to derive driving characteristics (or factors) data via telematics. With reference to FIG. 1A, an SDS 100 based on driving factors, derived from motion and position data captured via telematics using a driver's mobile phone is shown. SDS 100 takes into account the various driving factors for a given trip and/or averaged over a period of time such as one month. For example, acceleration 102, braking 104, cornering 106, speed 108, and context 110 are all combined to provide an overall (telematics) score 120 which represents SDS 100. Context 110 represents contextual data such as: distance travelled, time of day, traffic, and day of week. In this embodiment, SDS 100 is based on overall score 120 which is a telematics score based solely on the driving factors derived from data gathered via telematics, i.e. SDS 100 does not take the use of navigation or the use of tools that minimize distracted driving into account.

Figure 1B:
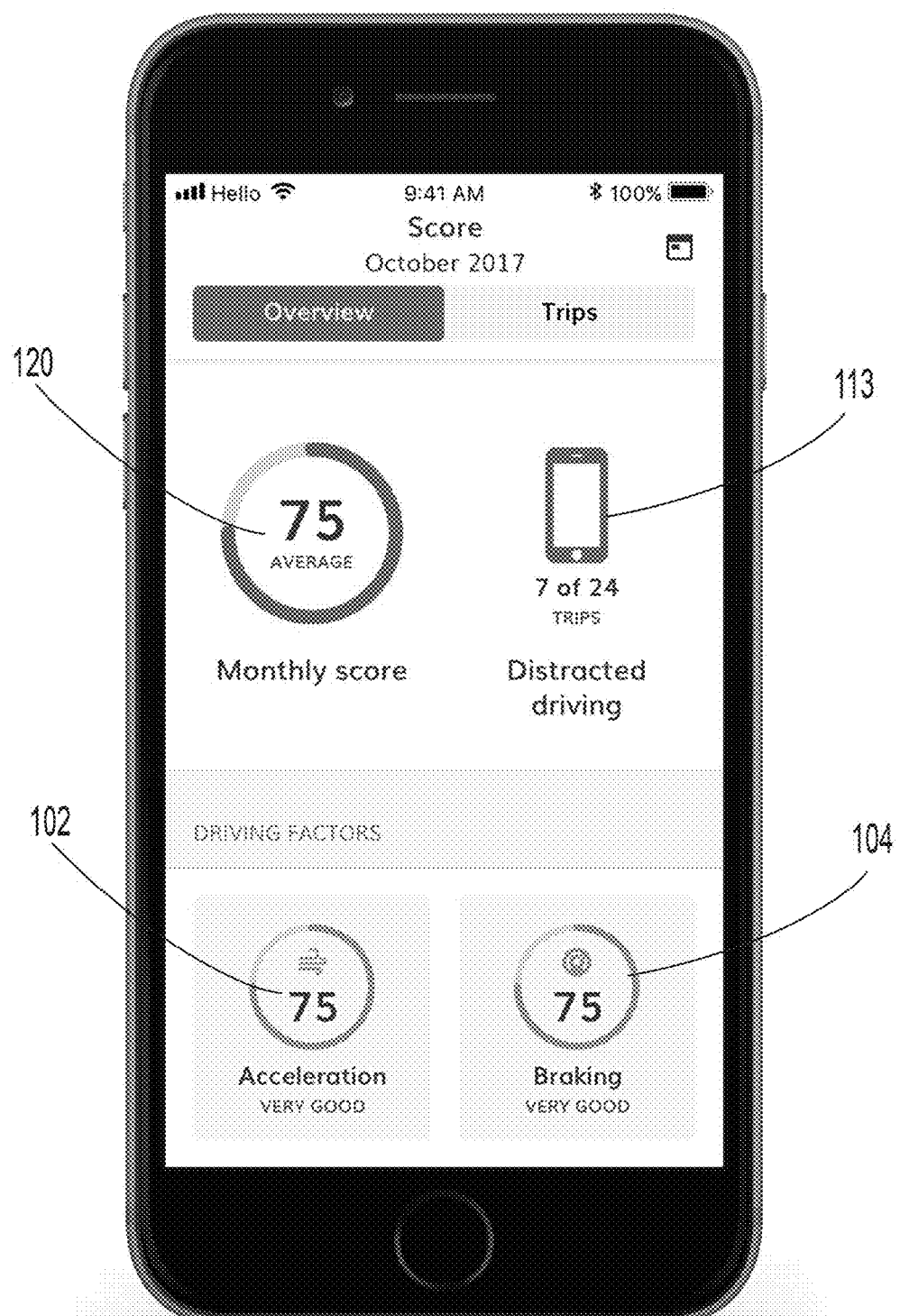
FIG. 1B depicts the top half of an SDS screen, in accordance with another embodiment of the present disclosure.
Figure 1C:
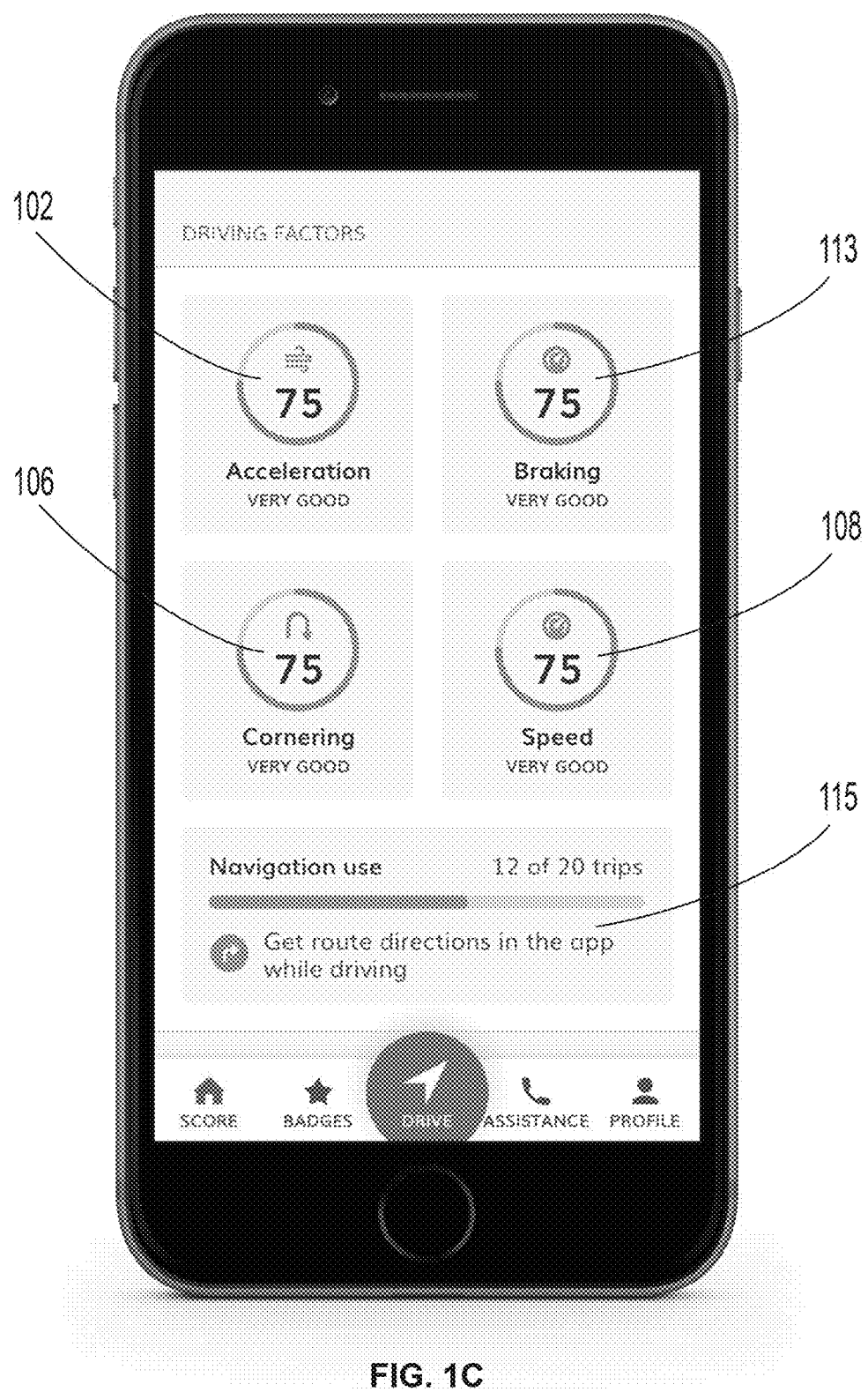
FIG. 1C depicts the bottom half of the SDS screen of FIG. 1B.

With reference to FIG. 1B, there is shown the top portion of a driving score screen, in accordance with an embodiment of the present disclosure. Monthly score 120 is a telematics score based on driving factors. Distracted driving 113 indicates the number of trips in which the driver was distracted, as well as the total number of trips taken in a particular period of time, such as a month. Below the monthly score and distracted driver stats, the scores of the various driving factors are shown. With reference to FIG. 1C, which shows the lower portion of the driving score screen of FIG. 1B, the driving scores for: acceleration 102, braking 104, cornering 106, and speed 108 are displayed. Then at the bottom of the screen, statistics regarding the use of navigation during driving 115 are also shown.

Figure 2:
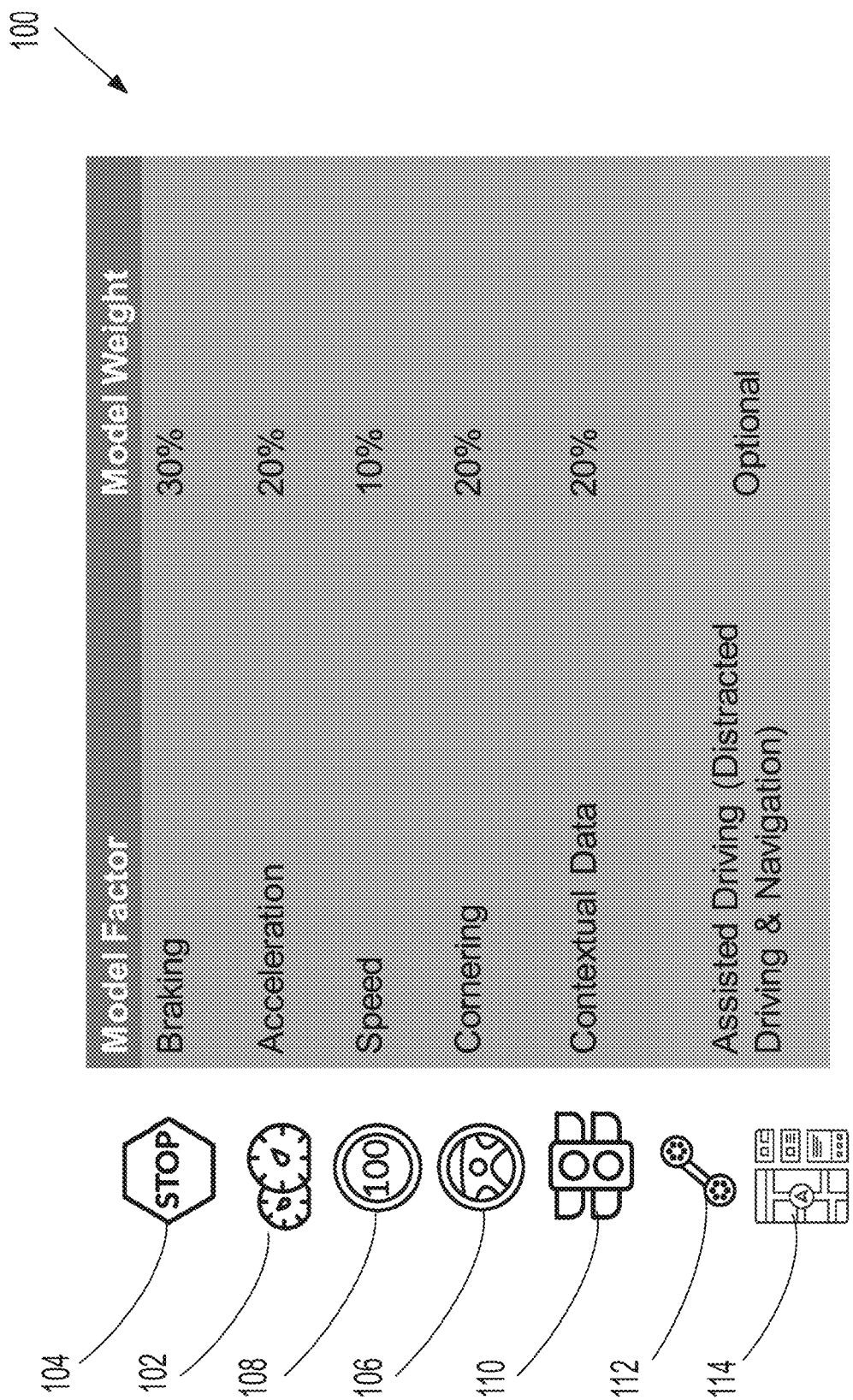
FIG. 2 is a table showing exemplary weighing factors of various driving characteristics used to compute the telematics score and the SDS.

FIG. 2 depicts one embodiment in which certain weights are given to the various driving model factors, when computing the SDS 100. For example, in the model of FIG. 2, braking 102 is given a weight of 30% in the SDS, acceleration 102 is given a weight of 20%, speeding 108 is given a weight of 10%, cornering 106 is given a weight of 20% and contextual data 110 is given a weight of 20%. Assisted driving is shown as being comprised of two optional factors: notification reduction 112 and the use of navigation 114. If taken into account, the weights of the other factors shall be adjusted accordingly so that the total weights add up to 100%. For example, assisted driving may be given a weight of 15% by adjusting the weight of braking down to 20% and adjusting the weight of contextual data down to 15%. Other weights are also contemplated. Since assisted driving comprises two factors: the use of navigation 114 and the reduction of notification 112 to the driver, the weight of both factors may also vary. For example if, as contemplated above, assisted driving was given a weight of 15%, then optionally those 15% may be allocated as: 10% for distracted driving reduction (such as disabling of phone notifications), and 5% for the use of a navigation app. Other percentages are also contemplated.

FIG. 3A shows an embodiment in which a daily average SDS 100 is computed from various trips driven on a given day, and based only on a telematics score 120. In the embodiment shown, a trip which includes a number of stops is considered comprised of a plurality of sub-trips. For example, trip 1 is comprised of sub-trips 1-1, 1-2, and 1-3. Accordingly, the overall telematics score for trip 1, which was found to be 93, is computed as the weighted average of the telematics scores of each of sub-trips 1-1, 1-2 and 1-3, which were determined to be 98, 89 and 93, respectively. For trips 2 and 3 there were no stops and hence trips 2 and 3 are not comprised of sub-trips. For a given day, the daily telematics average score is the weighted average of the telematics score of all trips and sub-trips. In another embodiment (not shown), no sub-trips are used; a stop terminates a trip and starts a new one. Since only the telematics score 120 is taken into account, the daily average SDS 101 in this case is equal to the daily telematics average score. An optional points score 123, may be computed by multiplying the SDS by 100. Since the SDS is rounded to the nearest whole number, the points 123 are based on the actual computed SDS before rounding. For example, the SDS of trip 2 was 93.4, which was rounded to 93, but the points are 93.4*100=9,340.

FIG. 3B shows another embodiment in which a daily average SDS 100 is computed from various trips driven on a given day, based on a telematics score 120 and also on whether navigation was used 117 during the trip. For example, with respect to trip 1, the Final Trip SDS 100 for the trip is based on both telematics score 120 which is equal to 93 and navigation use 117. Accordingly, although the telematics score is 93, the Final Trip SDS is 94 due to the use of navigation 117 during the trip. In this embodiment the telematics score is given a weight of 90% while the use of navigation 117 during the trip is given a weight of 10%. Accordingly the scoring logic is 90%*(Telematics Score)+ 10%*(Use of Navigation). Similar to the embodiment of FIG. 3A, an optional points score 123, may be computed by multiplying the SDS by 100. Since the SDS is rounded to the nearest whole number, the points 123 are based on the actual computed SDS before rounding. For example, the SDS of trip 3 was 76.5, which was rounded up to 77, but the points are 76.5*100=7,650.

In the embodiment of FIG. 3B, the use of navigation is a true or false value. In other embodiments the use of navigation factor 117 may be a value from 0 to 10 for example depending on the features used. For example, some navigation applications provide real-time traffic data which further reduce risk by allowing drivers to navigate away from areas with problems. In addition, other ratios between the telematics score 120 and the navigation factor 117 are also contemplated. In another embodiment (not shown), the use of tools which reduce distracted driving may also be considered when calculating the SDS. Notification reduction factor 112 may also be a true or false factor or a range of values depending on the level of notifications disabled. For example, if only notifications from social media are disabled the driving may be considered less distracted but not distraction free. In this case a low distraction reduction factor 112 is given. On the other hand, if all types of notifications including all notification for text messages and phone calls are disabled, the driving may be considered distraction free and a higher distraction reduction factor 112 is given. The distraction reduction factor may also be adjusted based on the number of times the user touches the phone screen or simply handles the phone during driving. An accelerometer and/or gyroscope may provide insight into whether the driver has, for example, removed the phone from the holder or touched/swiped the screen.

Having computed the SDS, we now turn to another important factor used in rewarding customers for good driving behavior; namely the client value factor.

Client Value Factor

Figure 4:
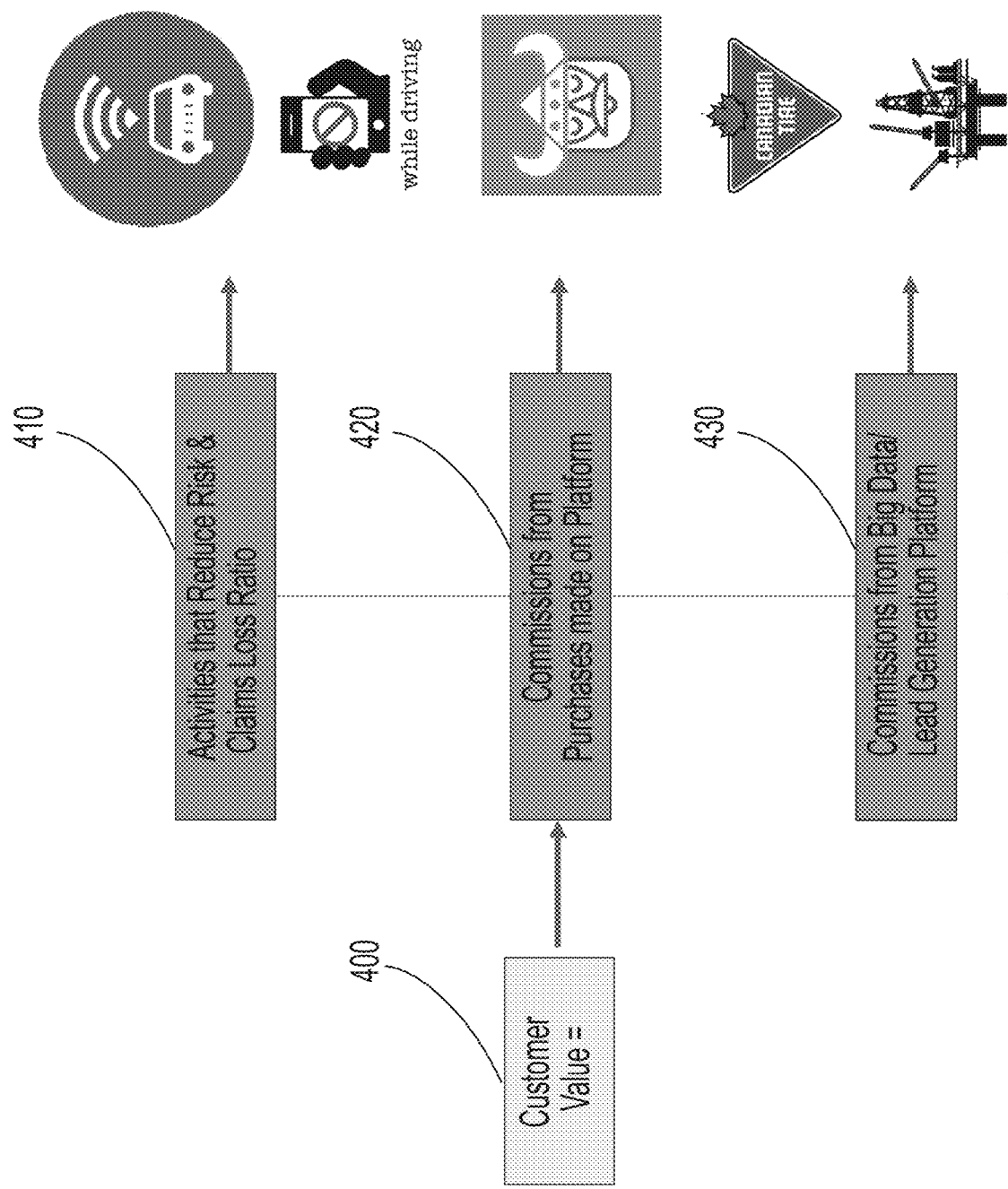
FIG. 4 is a representation of a customer value (CV) based on risk reduction and commissions.

The client value (CV) is a numeric value that is calculated for each customer. The CV is based on the sum of transactions that a customer accumulates in a predefined period of time, such as a month. There are different types of transactions which are contemplated. For example, a customer may purchase an insurance policy or make a retail transaction. Alternatively or additionally, a transaction may funded by an affiliate partner offering goods or services via the smart mobility platform. Furthermore, getting and/or keeping a user engaged with the app represents an internal marketing client value. As an example, while engaged with the app, a user might be shown an ad or a banner. Thus, the financial technology entity (Fintech), provides engagement reward badges as will be detailed below. Each retail transaction generates a value that the customer can potentially earn as a reward. For non-retail transactions, the CV is totally dependent on the customer's aggregated SDS. Accordingly, the CV is a profit sharing mechanism offered to customers as a reward for safe driving behavior. With reference to FIG. 4, various examples of Customer Value (CV) 400 are shown. For example, a customer's driving activities 410 such as driving characteristics (slow acceleration, low speeding, mild braking, easy cornering), and/or avoiding distraction while driving all represent a CV since they have been shown to reduce risk, and accordingly, reduce the claims loss ratio (CLR) to their insurance company. Retail purchases made on the smart mobility platform (i.e. through the platform's mobile application) are tracked and commissions 420 from those purchases are paid to the platform provider by the retailer. A portion of those commissions 420 can be passed on to the customer, provided they have a high SDS, as will be explained below. Another example of CV is the revenue paid as commissions 430 to the platform provider by affiliates that would be interested in the aggregated marketing information (big data) generated by the platform. For example, statistics about safe driving practices, retail purchases, and insurance claims would be of great value to marketers for lead generation, for example.

A Customer Reward Model Based on Safety

Figure 5:
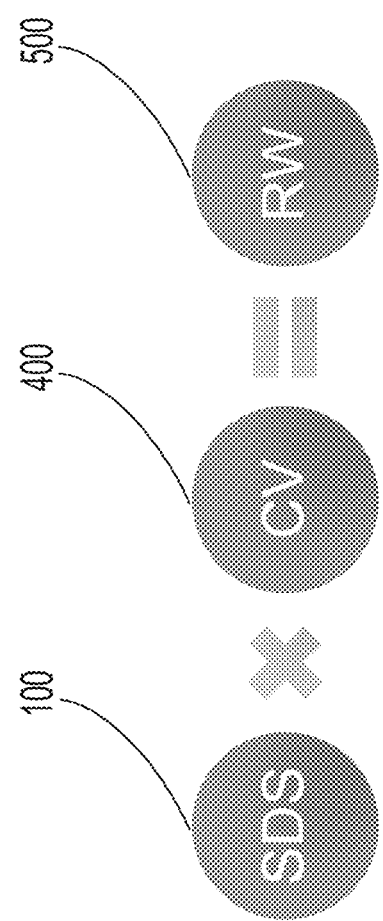
FIG. 5 is a representation of a rewards (RW) calculation based on an SDS and a CV.

FIG. 5 depicts a customer reward model based on safety. The SDS 100 is the safe driving score described above which is mainly based on telematics, but may also include navigation and/or distracted driving data. The CV 400 is the client value described above with reference to FIG. 4. The CV 400 represents the maximum value of a given transaction such as: driving a trip, making an in-app purchase from a partner, and for engagement/marketing value such as completing a marketing campaign. The reward (RW) 500 is the customer's profit share of the CV. The profit sharing may be in the form of money back. The money may be sent to the customer via email money transfer, Interac® direct deposit, or by any other suitable means. While the RW 500 is shown as a product of the SDS and the CV, a customer must obtain a minimum SDS score to be eligible for a reward. For example, a customer many need to obtain at least an SDS of 80% or 90% to be eligible for any reward payment as will be described below.

Gamification of the Application Reward System

Gamification is the use of game thinking and game mechanics in a non-game or near-game context in order to better engage companies or end-users and to solve problems. In this age, when there are increasing distractions, it is difficult for a brand to retain the focus of its consumers. One way to get customers to literally spend more time with the brand (i.e., engage with the brand) is through gamification techniques that capture interest, involve individuals in an activity related to the brand and build off an individual's desire to perform, compete, and win either in a team or as an individual. The typical rewards for gamification include the collection of points, achievement of levels, and/or collection of virtual currency, badges or status e.g., becoming the virtual mayor of a particular geography. As such, gamification is another method to reward and recognize an individual. All gamification scores are presentable on a trip basis, a daily basis, a weekly basis, a monthly basis, and/or a yearly basis.

To reinforce good driving behavior a model is used to map these scoring data to tangible rewards or offers that the driver may receive, such as cash back or service offers, including but not limited to: retail (e.g. coffee), air miles, insurance discounts, car loan discounts and gas cards. Driving behavior is also recognized by badges, trophies, etc. The model is developed so that it encourages safer driving. The safer the driver is the more rewards the driver gets. A model may also balance distance driving with award allocation to prevent usage of long distance driving from being used as means to accumulate awards. That is, a balance is struck between quantity of driving and quality of driving. A driver can gift their rewards to special causes that they support or are supported by this platform. The driver can choose how the reward points are redeemed. The reward points can be redeemed as cash, or used to contribute to a charitable organization or through in-app competitions where a collective of users contributes points toward a common goal or cause (e.g. supporting a Mothers Against Drunk Driving funding campaign).

Badges

Users who have installed the mobile application component of the smart mobility platform, which tracks their driving habits, benefit from other features of the application. The users will unlock reward badges through ongoing application usage and demonstrated safe driving behavior. Advantageously, earning a badge has been proven to elicit a more emotional response from a user than a numerical score. For example, a badge indicating that the user is in the top 20% of drivers, in the community of users using the mobile application, is more meaningful than an indicator displaying "You are 2395 out of 12,000 drivers".

Figure 6:
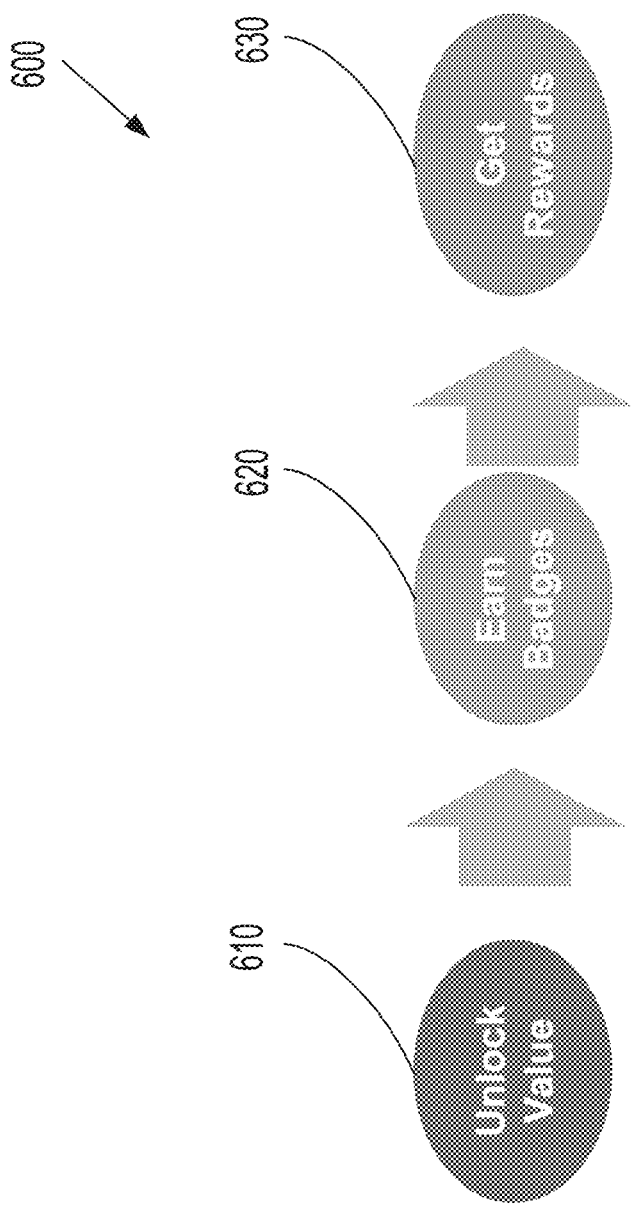
FIG. 6 is a representation of the steps involved in earning badges and getting rewards for good driving.

FIG. 6 shows a flow 600 for earning rewards by users who have downloaded the mobile application implementing the invention. Initially, at step 610, the user needs to drive enough trips and earn an SDS sufficient to unlock the value 610 of a badge. For example, 30 trips may need to be driven before earning a particular badge. Different badges may have different point requirements. Once the monthly SDS aggregated score is earned, and the criteria of a badge or badges are met, the badge is earned at 620. The badge may be displayed on the application screen as will be shown below. Unlocking the value 610 and earning the badge 620 also entitles the user to share a percentage of the rewards 630 associated with that badge. Each user's SDS will be tracked internally by the provider platform, for example on a centralized server, to facilitate the functioning of the badge system.

In one embodiment, the badge system is composed of three pillars: insurance badges, retailer badges, and engagement badges. Insurance badges are provided by insurance providers, retailer badges are provided by affiliate retail partners, and engagement badges are provided by marketing to keep the user engaged.

Figure 7:
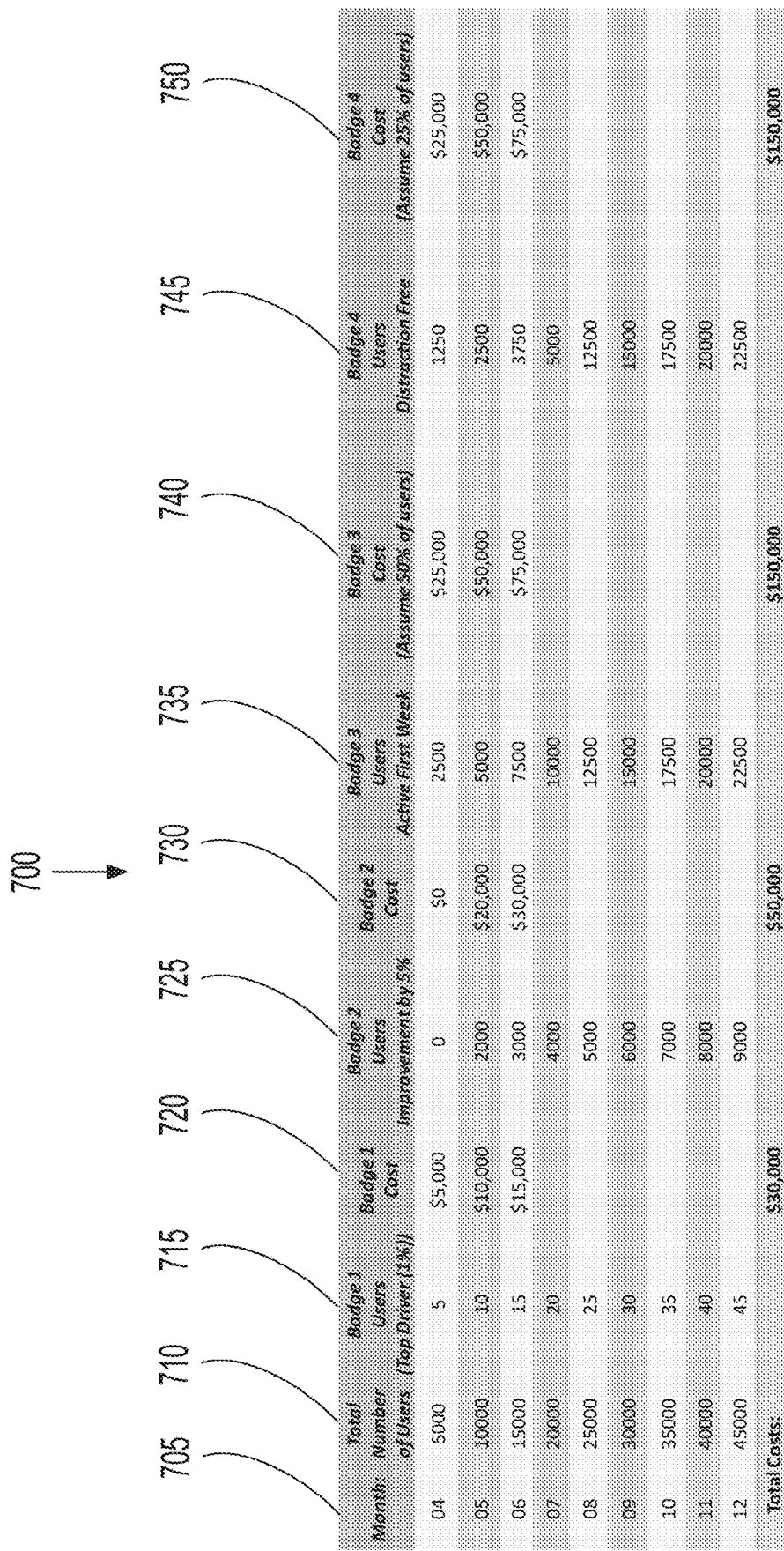
FIG. 7 is a table showing a budgeting example of the awarding of badges and rewards for a community of drivers, using the platform presented in one aspect of the present invention.

FIG. 7 depicts an example of budgeting spending money for rewarding embodiment 700 for rewarding badges showing, for each month 705, the total number of people participating in the program 710, as well as the number of people who earned each type of badge (715, 725, 735 and 745) in the months of April (04) through December (12). In this embodiment, there are four types of badges which have paid rewards associated therewith, but in other embodiments more or fewer types are contemplated. Badge 1 (715) is a Top Driver or an Expert Driver badge awarded to drivers having an SDS score that is in the top 1% relative to all other drivers in the community of the mobile platform users using the platform's mobile application to track their driving behavior using telematics. The monetary value of this badge is $1000. Accordingly, the badge's cost 720 for the month of April, for example, was $5000 given that 5 drivers have earned that badge. Badge 2 (725) is a safety badge, awarded to users who have improved their SDS by 5% or higher. The monetary value of this badge is $10. For the month of April, there were 0 drivers that have improved their SDS by 5% or higher, so the total cost 730, for Badge 2, was $0. However, in May 2000 users have improved their SDS by 5% or higher, so the total cost 730 for Badge 2 in May was $20,000. Badge 3 (735) is a novice badge, awarded to users who are active during the first week after they have downloaded the platform's mobile application. The value for this badge is $10. For May, for example, 5000 users joined the program and were active the first week, and accordingly the total cost 740 for the Badge 3 was $50,000. The novice badge 735 may be offered as a monetary award or as a voucher for a free car wash, for example. Badge 4 (745) is for distraction free drivers and is awarded to drivers who have a high percentage of their driving in distraction free mode. For example, if 80% or 90% of the distances driven were made while notifications on the mobile phone were disabled then the user receives the Distraction Free badge 745. The value of Badge 4 is $20. Accordingly, in April for example 1250 users earned that badge at a total cost 750 of $25,000. In addition to the badges that offer monetary awards, there may also be badges offered to encourage engagement which have no monetary value. Some badge rewards may be offered for a temporary duration, such as for 3 months, and then their offering is re-evaluated based on collected data meeting certain safety objectives. Additionally, a minimum requirement may be set for attaining any badge. The minimum requirement may be set as a minimum number of trips such as 30 trips, or a minimum distance travelled such as 250 Km per month.

Figure 8:
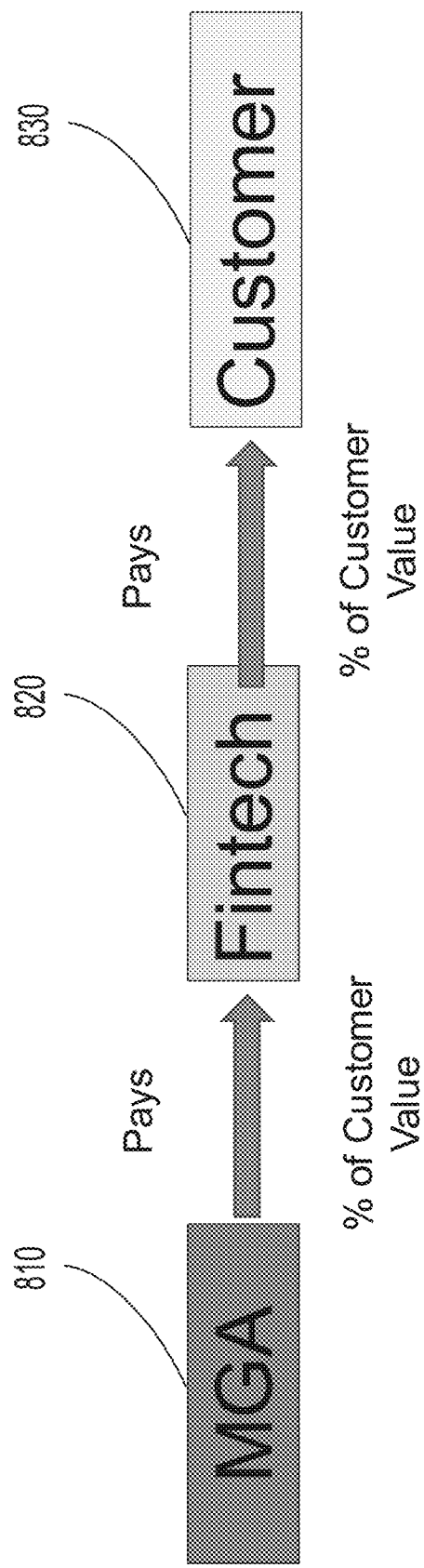
FIG. 8 shows the flow of rewards payments from an affiliate entity, a.k.a. the Managed General Agent (MGA), to the financial technology (Fintech) entity, and to the customer.

FIG. 8 depicts the entities involved in the awards process. The MGA represents an affiliate retailer that offers goods or services, via the smart mobility platform, to customers. When a customer 830 purchases goods or services from the MGA 810, the MGA 810 pays a percentage of the customer value (CV) explained earlier, as a commission, to the financial technology entity (fintech) 820. The fintech 820 is the smart mobility platform provider which keeps track of SDS for all members of the community who have downloaded the associated mobile application and activated their SDS tracking therewith. The fintech 820, in turn, rewards the customer 830 with a percentage of the CV, contingent upon the customer 830 earning a high enough SDS.

Figure 9:
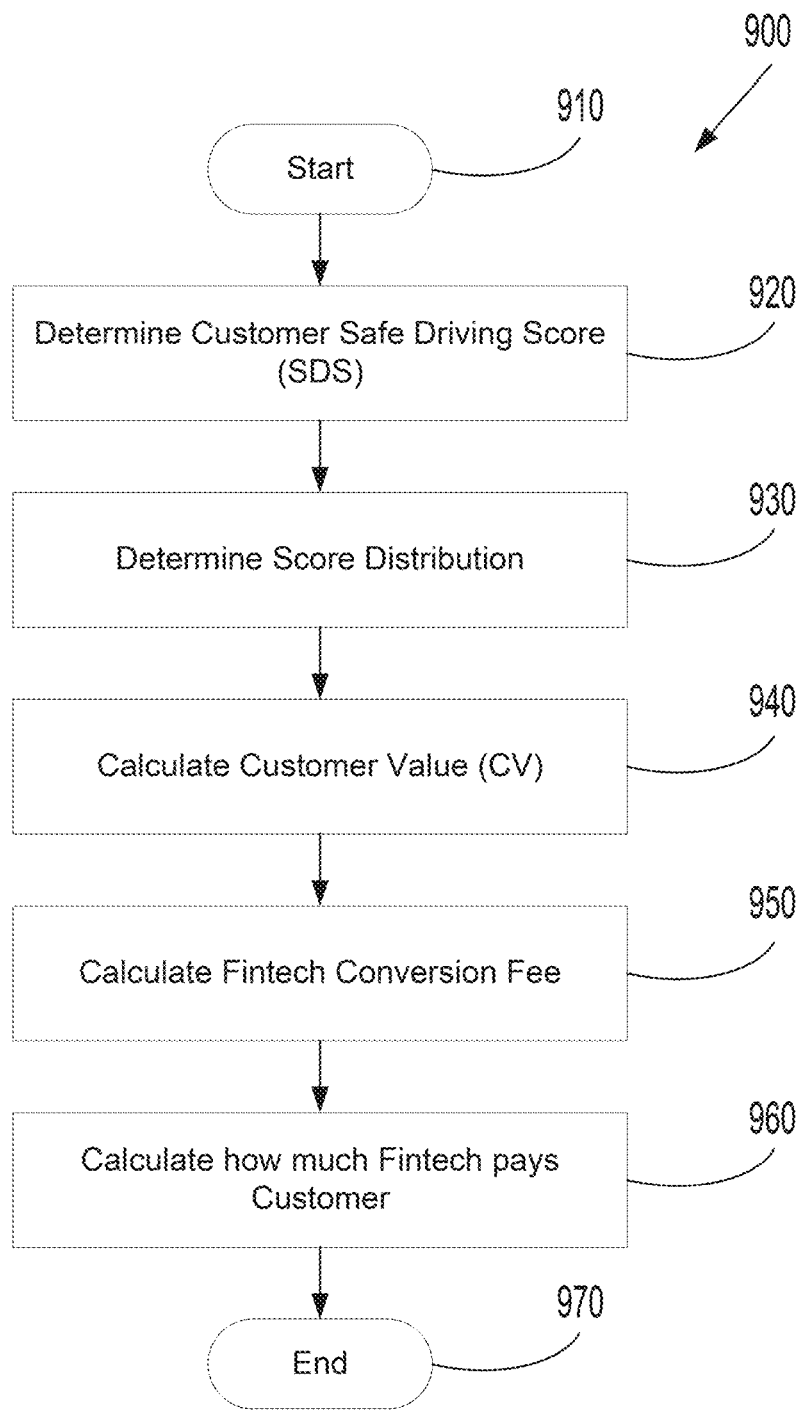
FIG. 9 is a flow chart showing a method for determining the rewards earned both by a Fintech and a customer based on the customer's SDS and CV.

FIG. 9 depicts a method for determining how rewards are paid to each of the fintech and the customer. The method starts at 910. At step 920 the customer's SDS is determined as explained earlier with reference to FIGS. 1 and 2. At step 930 the SDS distribution for all users in the community is determined, as can be seen with reference to FIG. 10.

Figure 10:
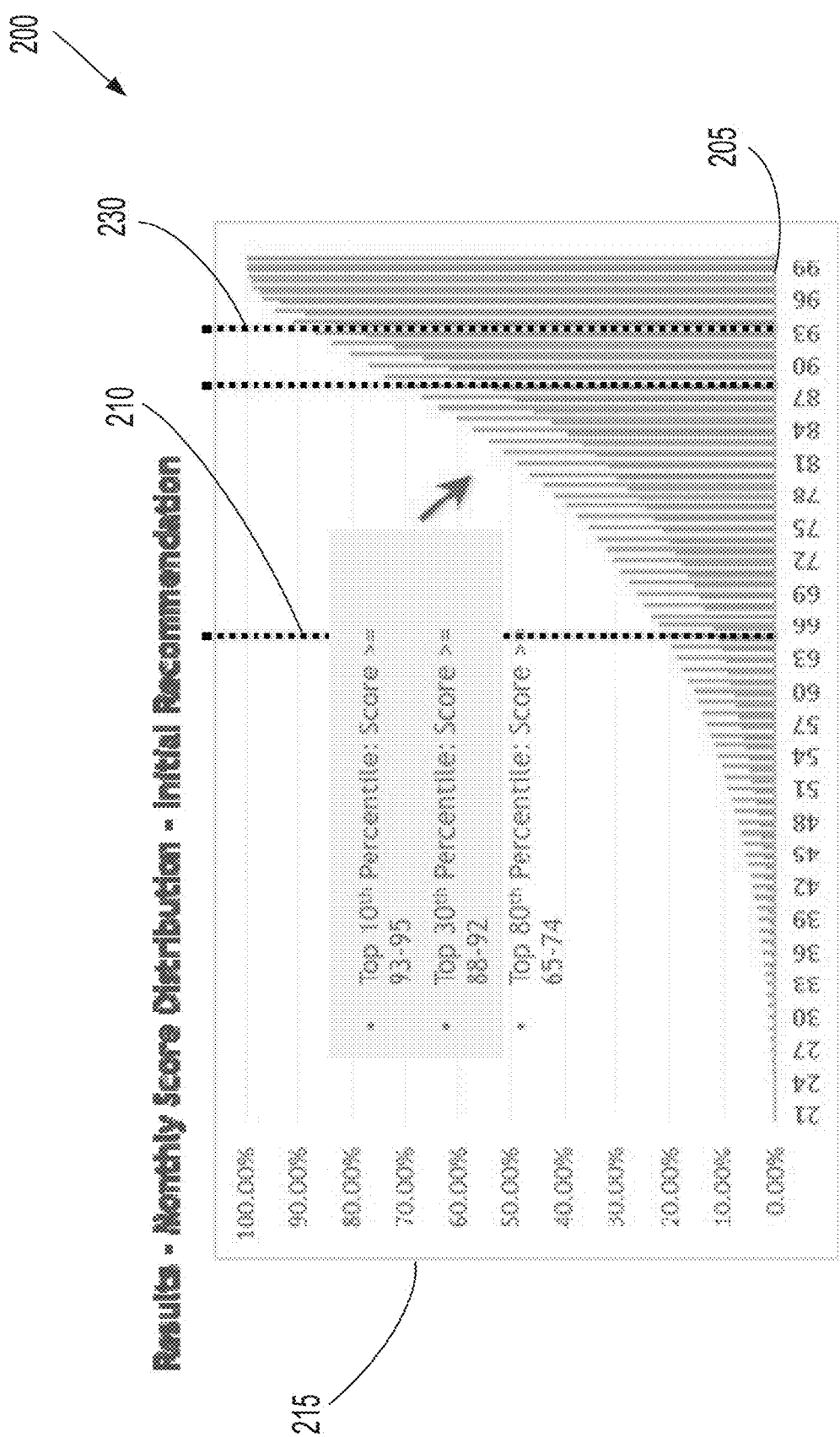
FIG. 10 is a graph showing an exemplary monthly SDS distribution graph showing the typical score ranges for various top percentile customers.

FIG. 10 shows a graph 200 which depicts an example of SDS distribution for a community of drivers using the mobile application of the smart mobility platform. The horizontal axis 205 represents the number of drivers, and the vertical axis 215 represents the percentage of users at a particular SDS. The percentage represented by the vertical axis can be used to determine the number of users at a particular top percentile. For example, there are between 65-74 users in the top 80% percentile. This can be determined by drawing a horizontal line at 20% of the vertical axis (the top 80% percentile are those whose scores are higher than the lowest 20%) until the line meets the graph and then going down as can be seen at line 210. Similarly, to determine the top 10% percentile, a horizontal line is drawn from the 90% mark on the vertical axis 215 towards the graph. Line 230 indicates that, from the horizontal axis 205, there are about 93-95 drivers in the top 10% of SDS scores. It can also be determined from the graph that approximately 72% of participants are expected to receive an SDS of 80 or higher, and that approximately 42% are expected to receive an SDS of 90 or higher.

For some transactions, the CV may be simple. For example, if the customer purchases a roadside assistance service that costs $100, the Fintech may receive a $20 commission on the transaction, and the customer may receive a cash back dividend based on their aggregated SDS score that ranges from $0-$20. The higher the SDS score, the higher their dividend will be.

At step 950 of FIG. 9 the fintech conversion fee for the customer is calculated. The goal is to reward the best drivers on an ascending scale that is optimized to fit within the total rewards budget. FIG. 11 contains an illustration of the rewards model used. This example is based on a total rewards budget 1135 of $7,800. Assuming 100 drivers, each with an insurance policy having a GTV of $2000, the example shows the allocation of rewards for drivers based on their SDS 100. The customer payout factor 1110 determines the percentage of the CV, determined above, which is passed on to the customer as a reward 1120. This rewards model requires drivers to have an SDS of 90 or higher in order to receive any reward. Accordingly, the customer payout factor for drivers having SDS of 1 to 89 is 0. Between an SDS of 90 and 100, the customer payout factor 1110 increases with the SDS, starting, for example at 46.84% at an SDS of 90, and reaching 99% at an SDS of 100. As a customer reward 1120, customers at an SDS of 90 earn $100, whereas customers at an SDS of 99 earn $387.34. As a percentage of GTV 1140, an SDS of 90 earns a customer 5% of their GTV (a $100 rewards is 5% of a $2000 gross premium), whereas an SDS of 99 earns a customer $500, which represents at 25% of GTV. The program payout 1130 represents the total monetary reward paid to all customers at the specific SDS level. The total of all program payout values 1130 equals the total rewards budget 1135. The model presented by FIG. 11 is based on 100 drivers and statistical historical data. So based on this hypothetical model, 4.4475 drivers would be at the 90 SDS level, hence the program payout 1130 at that level is 444.75. In reality the number of customers (drivers) at each SDS level is a whole number.

Figure 12:
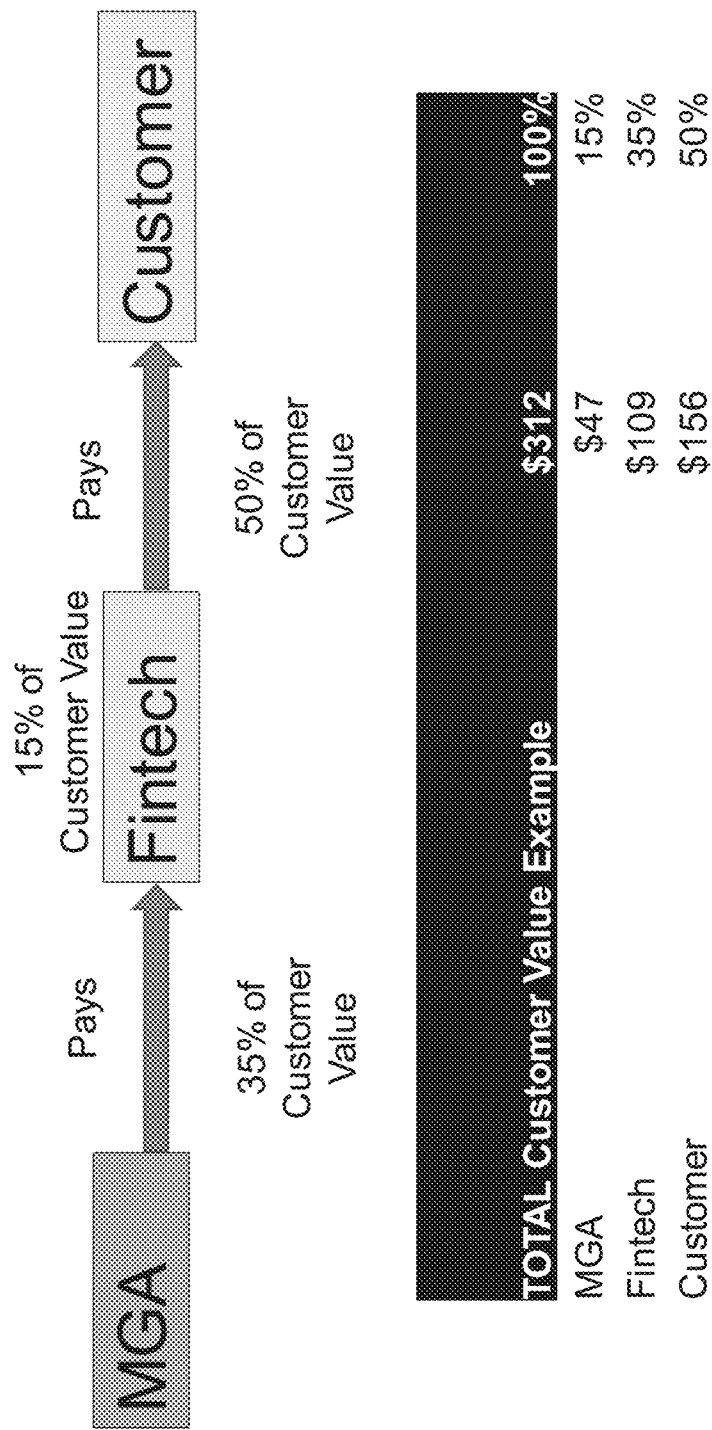
FIG. 12 is an example computation of the distribution of rewards from an affiliate entity (MGA) to both a financial technology entity (Fintech) and a customer.

At step 960 of FIG. 9 a calculation of how much the fintech pays the customer in rewards is made. With reference to FIG. 12, an embodiment is shown where the customer value is $312, as computed above. Of the $312, the MGA keeps 15% ($47), the fintech keeps 35% ($109) and 50% ($156) of the customer value is passed on to the customer as a reward.

System Architecture

Figure 13:
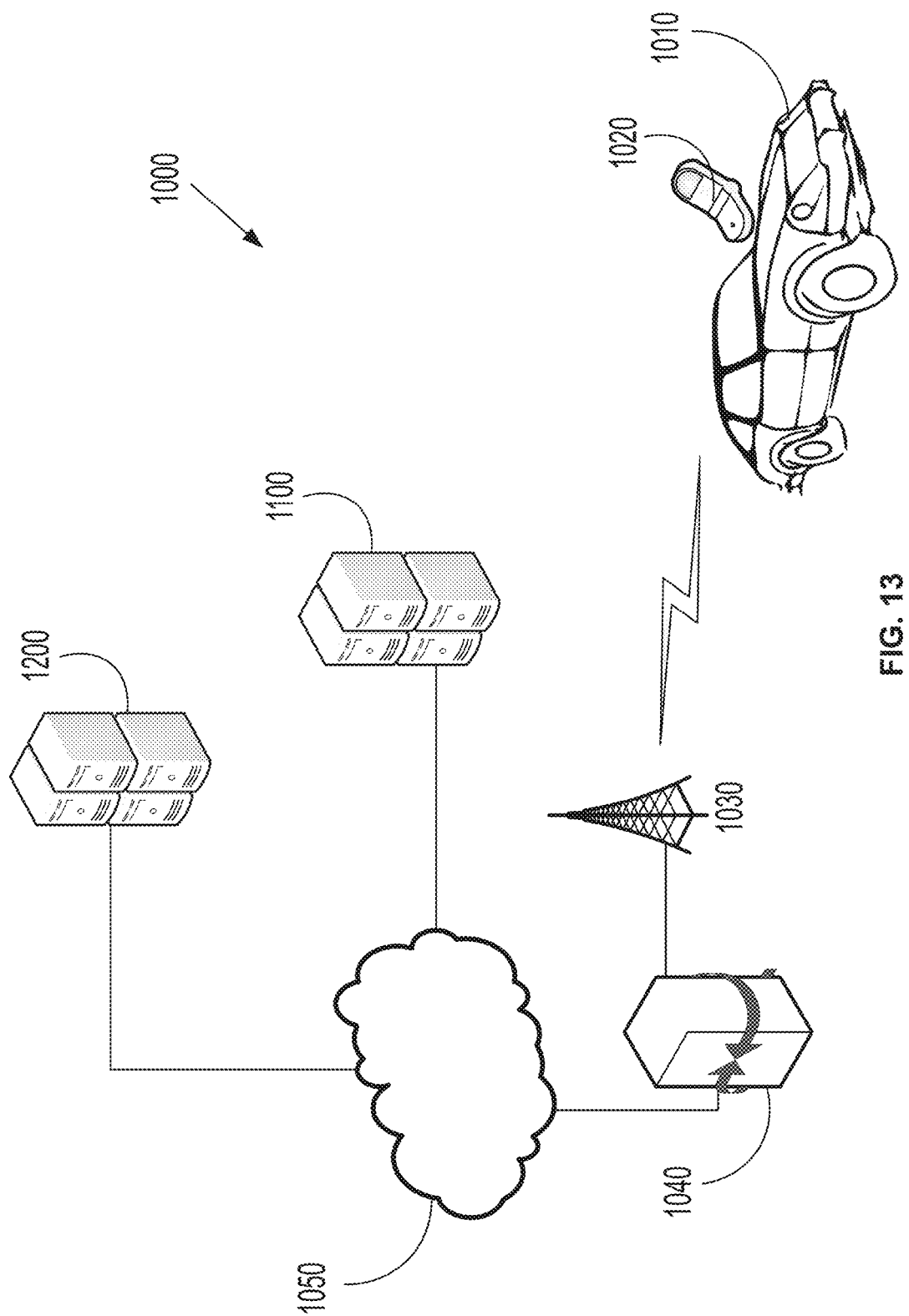
FIG. 13 is a simplified network diagram showing the various entities of a smart mobility platform system.

Referring to FIG. 13, a system 1000 for using telematics to measure, analyze, and report driving parameters and compute rewards in accordance with one aspect of the present invention. A motor vehicle 1010 is driven by a customer who owns a mobile phone 1020. The mobile phone 1020 has installed thereon a mobile application of the smart mobility platform. The application has software modules which configure the phone 1020 for data gathering of driving parameters. The phone 1020 may include a number of modules such as: a global positioning satellite (GPS) receiver, a three-axis accelerometer, a gyroscope and an electronic compass, which could be housed within the mobile phone 1020. These modules permit the mobile phone 1020 to gather motion and positioning data that can be used to derive driving characteristics data such as: speed, acceleration, turning, cornering, and braking.

The mobile phone 1020 may include a cellular communications module or radio, a satellite communications module, or a WiMax transceiver for providing a connection to a wide-area network such as the Internet 1050. The mobile phone 1020 may also includes short-range communication capabilities such as Wi-Fi, Bluetooth, Zigbee or any other suitable short-range communication capability.

The mobile phone 1020 gathers the motion and positioning data, using the aforementioned modules, and transmits this data (or summaries or analyses thereof) through a wireless network to a driving telemetry server 1200. For example, cellular phone 1010 may send the gathered motion and positioning data, to cellular base station 1030. Base station 1030 may receive the data and transfer it across the internet 1050 via gateway 1040. Server 1200 then receives the motion and positioning data and derives driving characteristics data specific to the driver who owns mobile phone 1020. The driving data includes: acceleration, braking, cornering, speed as mentioned earlier with reference to FIG. 1. The server 1200 may also add contextual data such as day of week, time of day, and distance travelled.

The mobile application server 1100 performs many tasks including computing the safety driving score (SDS) for each driver who has installed the mobile application. The driving telemetry server 1200 and the mobile application server 1100 are in communication over Internet 1050. Once driving characteristics such as: acceleration, braking, cornering and speed are derived for a plurality of drivers, that information is sent over Internet 1050 to mobile application server 1100 where an overall SDS is derived. Mobile application server 1100 may receive other information from the mobile application on mobile phone 1020. For example, the mobile application server 1100 may receive information about purchases made by the mobile phone's owner, their insurance policy, and so on. Accordingly, the mobile application server can derive customer value (CV) and rewards paid to the driver of vehicle 1010 and owns phone 1020, as described above.

Software Architecture

Figure 14:
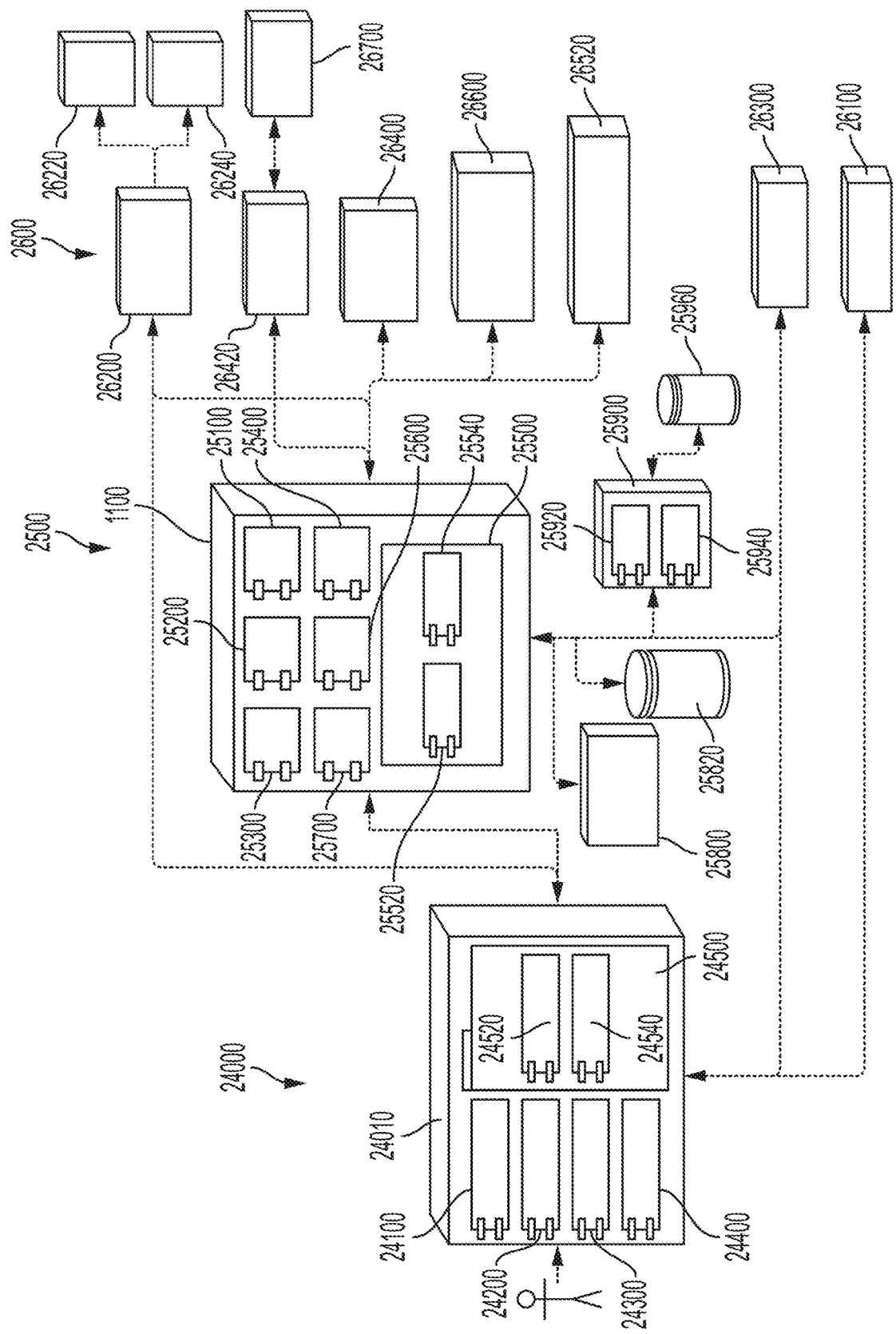
FIG. 14 is a software architecture diagram of the smart mobility platform, depicting a client layer, an integration layer, and a backend layer.

FIG. 14 depicts the overall software architecture, at a high level, of the smart mobility platform, in accordance with an aspect of the present invention. The platform is comprised of 3 layers: a client layer 24000, an integration layer 25000, and a backend layer 26000.

The client layer 24000 is represented by a mobile application 24010 running on a smart mobile phone such as mobile phone 1020 of FIG. 13, and used by a customer or user. The mobile application 24010 comprises many software components or modules. Module 24100 is a library or a package for providing navigation functions, module 24200 provide authentication for the user during login, trip detection and scoring module 24300 gathers driving characteristics data, and Affinity Service Framework module (ASF) 24500 communicates with third party providers including a roadside assistance partner via roadside assistance module 24520 and other partners via module 24540. Module 24400 is custom code which enables the application to communicate with other modules, and to provide the functionality and user interface described herein.

The integration layer 25000 is comprised of a mobile applications server 1100 and other supporting components. Server 1100 contains most of the functionality provided by the smart mobility platform. Advantageously, implementing most services and functionality on server 1100 ensures that the same functionality may be provided to different smart phone platforms such as Apple iOS, and Google Android with minimal differences in the custom code 24400 between the different smart phone platforms. Server 1100 may be supported by one or more of the following modules: financial accounting software 25800, online application database 25820, Customer Relations Management (CRM) 25940, and CRM database 25960.

Server 1100 may be comprised of a number of modules for performing various functions. Trip rules engine 25300 derives an SDS from driving characteristics (or factors) obtained from telematics. Trip history engine 25200 keeps track of all trips driven by a customer, so the mobile application 24010 may display a trip log when desired. The gamification rules engine 25100 provides rules for awarding badges, points, or cash based on both the SDS and the CV, as discussed above. The rewards engine 25600 computes awards for each customer based on their SDS, CV, and rules defined by the rules engine 25100. Payment processing engine is for receiving payments for goods and services purchased via the smart mobility platform. The session management engine 25700 is for managing user sessions, such as preventing multiple login instances by the same user.

Server 1100 also contains an Affinity Services Framework (ASF) component 25500 that is in communication with Affinity Services Framework (ASF) module 24500 on mobile application 24010. ASF 25500 contains a roadside assistance module 25520 and an affinity partners module 25540 for communication with third party affiliates or MGAs.

Financial accounting software (such as online accounting software provided by Twinfield) 25800 is for capturing the transaction data generated by the mobile application, and storing it in a General Ledger for the Fintech company. The application database 25820 is for storing information related to the app users, their trip data, the badge system and reward payouts. CRM 25900 and CRM database 25960 are for maintaining a history of the customer interactions with the Fintech, and the other accounts that the customer has within the ecosystem (e.g. Insurance user, Roadside assistance user, Blog subscriber, etc.). The CRM assists with customer support issues.

Backend layer 26000 contains various third party servers and services. Server 26200 is an authentication server such as Google Firebase Server 26200 accepts authentication requests from module 24200 and provides appropriate responses. For Android devices, server 26200 utilizes Google Cloud Messaging (GCM) push service 26220, and for iOS devices server 26200 utilizes Apple Push Notification Service (APNS).

The banking (e.g. RBC) server 26420 will receive a bulk batch Interac email money transfer file with information about which users need to be paid cash rewards for a given period (e.g. a month) from the rewards engine 25600 for a plurality of users. Server 26420 then instructs Interac server 26700 to deposit the cash rewards for individual users. Payment processing server 26400 is for processing purchase payments made through the platform. Insurance policy platform 26600 is used to validate insurance customers and retrieving their information. For example, when a badge reward is tied to an insurance partner, the reward will be based on a percentage of the user's conversion fee, which is based on the insurance policy transaction value. The insurance policy platform 26600 can be used to verify that the user is a customer of the insurance provider, to provide the transaction value information, and to check if the user still has the policy active before paying out the reward.

Roadside assistance service 26520 is in communication with roadside assistance module 25520 of the ASF 25500. When a user requests roadside assistance via the application, at least one message is sent by module 24520 on application 24010, to roadside assistance module 25520 on ASF 25500.

Driving telemetry service 26300 receives motion and positioning driving data gathered by trip detection and scoring module 24300 and derives various driving characteristics such as accelerating, braking, cornering, and speed. Additionally driving telemetry service 26300 may add context information. The derived driving characteristics and context data are then sent to the mobile application server 1100 so that trip rules engine can compute the SDS, as described earlier.

Navigation server 26100 provide navigation data to the navigation component 24100 thus allowing the mobile application 24010 to provide accurate and up-to-date navigation instructions to the user along a trip.

Figure 14A:
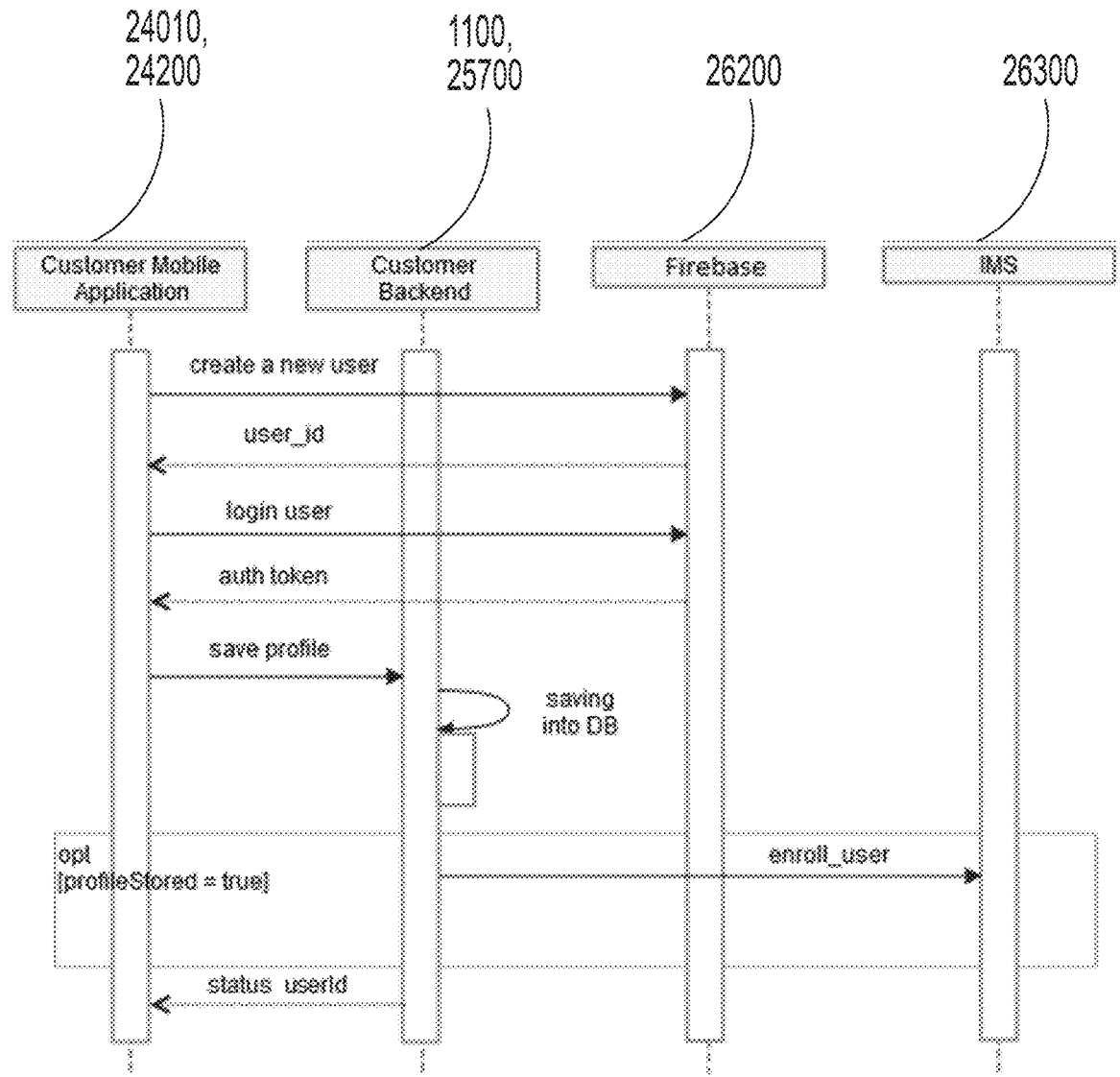
FIG. 14A is a sequence diagram showing the steps of creating a new user of the smart mobility platform.

FIG. 14A is a sequence diagram depicting a process by which a new user of the smart mobility platform is created. The mobile application 24010 requests the creation of a new user from the authentication server 26200. The authentication server authenticates the user and returns a user ID to the mobile application 24010. The mobile application 24010 uses the returned user ID to login to the authentication server 26200 and receives back an authentication token. At this point a profile for the user has been created and authenticated. The mobile app 24010 sends the profile information to the customer backend 1100, and more particularly to the session management component 25700. The session management component saves the user profile into a database such as the CRM database 25960. When the profile is successfully stored, the user may be enrolled into the driving telemetry service 26300. More details of the latter is provided below.

Figure 14B:
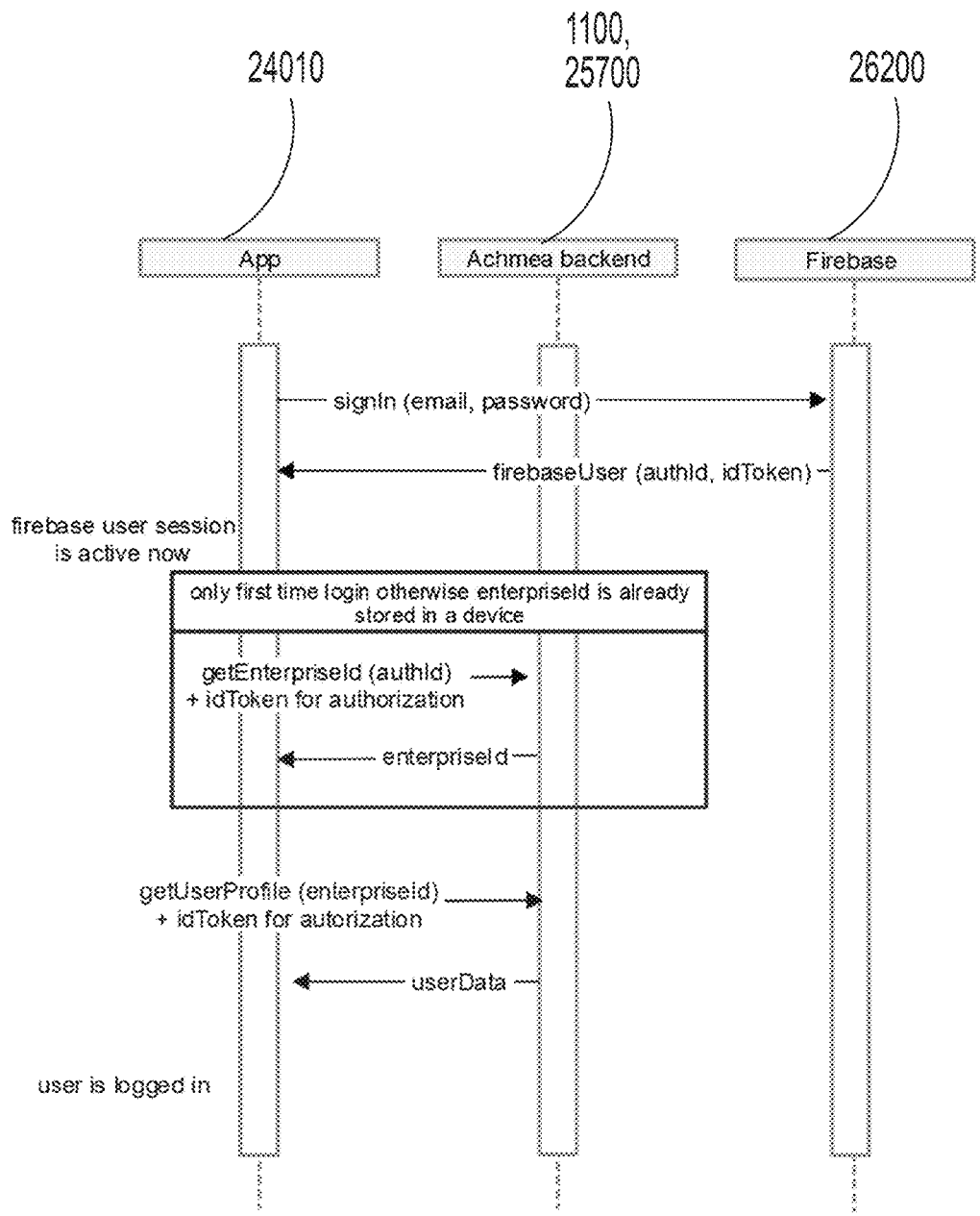
FIG. 14B is a sequence diagram showing the steps of authentication and login of a user of the smart mobility platform.
Figure 14C:
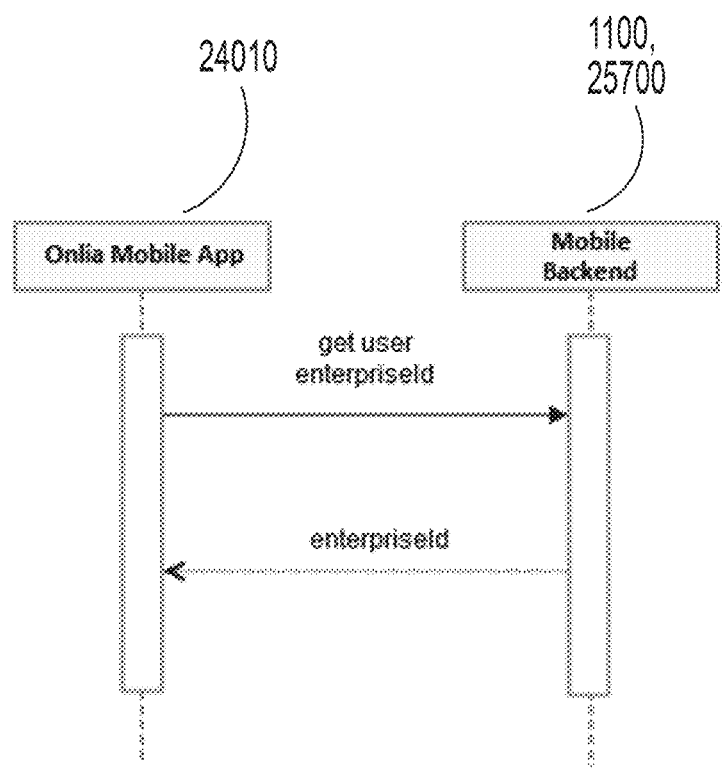
FIG. 14C is a sequence diagram showing the steps of obtaining an enterprise user ID for the user of the smart mobility platform.
Figure 14D:
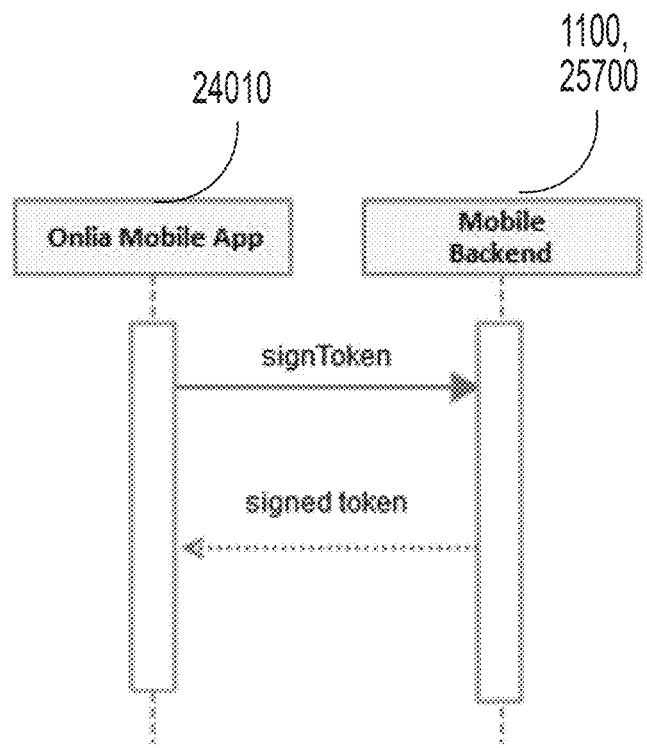
FIG. 14D is a sequence diagram showing the steps of getting a token signed.

FIG. 14B provides more details of the user login process. Initially the mobile application 24010 provides credentials such as a username and a password to the authentication server 26200. The authentication server 26200 authenticates the user using the provided credentials, and provides back an authentication ID and an ID token. If the user was logging in for the first time, an enterprise user ID is requested by the mobile application 24010 from the session management module 25700 on the mobile application server 1100. The mobile application 24010 provides the authentication ID and ID token to the mobile application server 1100, and requests an enterprise user ID. When the session management module 25700 provides back an enterprise user ID, the enterprise user ID is saved in the mobile application persistent storage for subsequent logins. Otherwise, if this is a subsequent login the enterprise user ID is retrieved from persistent storage on the mobile device running the mobile application 24010, as shown in FIG. 14C. Subsequent to obtaining the enterprise user ID, either from the session management module 25700 or from the mobile device's persistent storage, the ID token needs to be signed. This is done by providing the ID token to the session management module 25700 as shown in FIG. 14D. Using the signed token, the mobile application 24010 obtains user data from the session management module 25700 as shown in FIG. 14G. If the user information needs to be updated, the mobile application can provide the updated information to the session management module 25700, as shown in FIG. 14F.

Figure 14E:
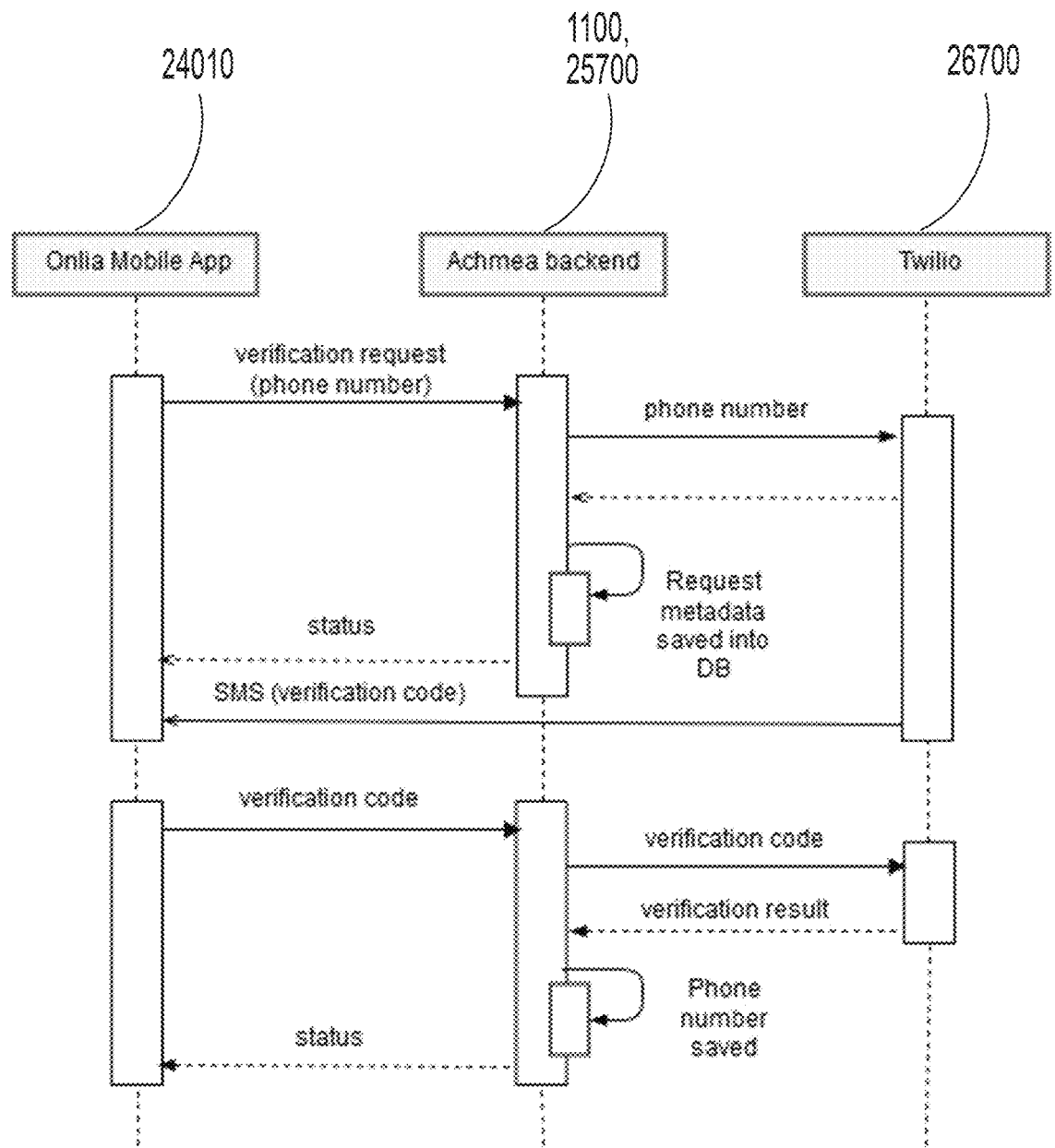
FIG. 14E is a sequence diagram showing the steps of user verification using Short Messaging Service (SMS) performed prior to unlocking a reward.
Figure 14F:
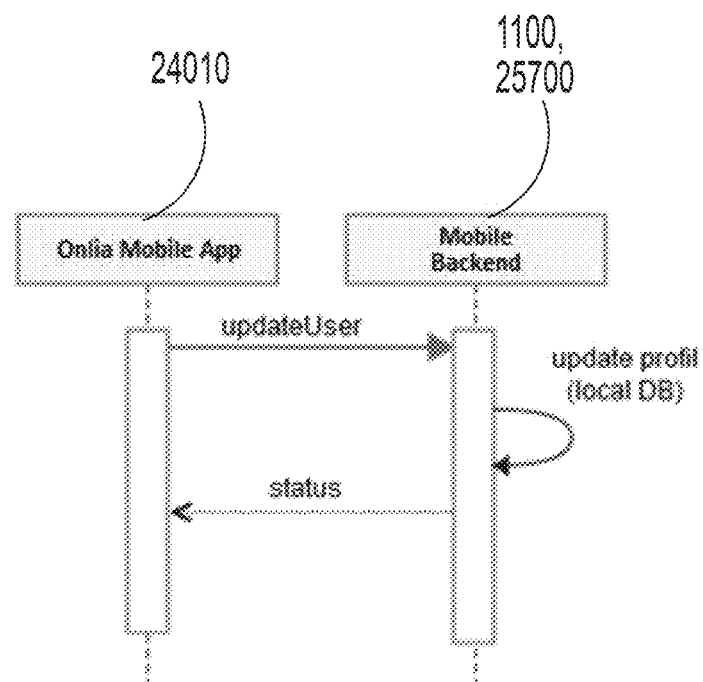
FIG. 14F is a sequence diagram showing the steps of updating a user's profile.
Figure 14G:
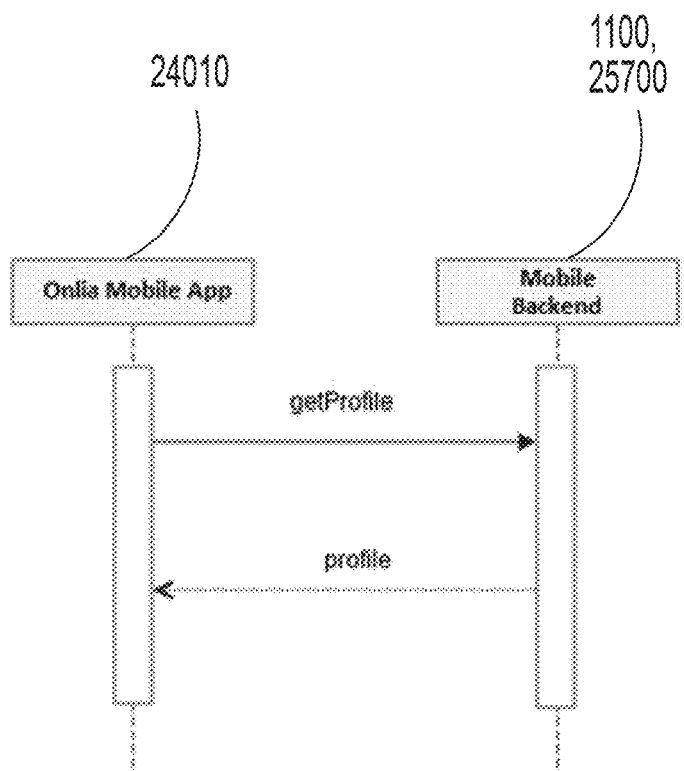
FIG. 14G is a sequence diagram showing the steps of retrieving a user's profile.

With reference to FIG. 14E, to unlock a reward from the mobile application, the user needs to be verified via the telephone number associated with the mobile phone on which the mobile application 24010 is running. A verification request is sent to the session management module 25700 on the mobile application server 1100. The validation request contains the telephone number associated with the mobile phone running the mobile application 24010. The session management module 25700 retrieves metadata associated with the telephone number from a database. Additionally, the session management module 25700 forwards the verification request to the telephone number verification service 26700. The telephone phone number verification service generates a verification code and sends that code in a message sent via Short Messaging Service (SMS) to the mobile telephone running the mobile application 24010. The mobile application 24010 intercepts the SMS message and retrieves the code. The mobile application 24010 then sends the code to the session management module 25700, which in turn forwards it to the telephone phone number verification service 26700. The telephone number verification service 26700 checks the verification code received against the one it sent earlier by SMS, and notifies the session management module 25700 of the result. If the verification codes match, the session management module 25700 saves the phone number's metadata along with an indication that the phone number has been verified. The session management module 25700 also returns a status code to the mobile application indicating that the telephone number has been verified. At this point rewards may be unlocked for the current user of the mobile application 24010.

Figure 14H:
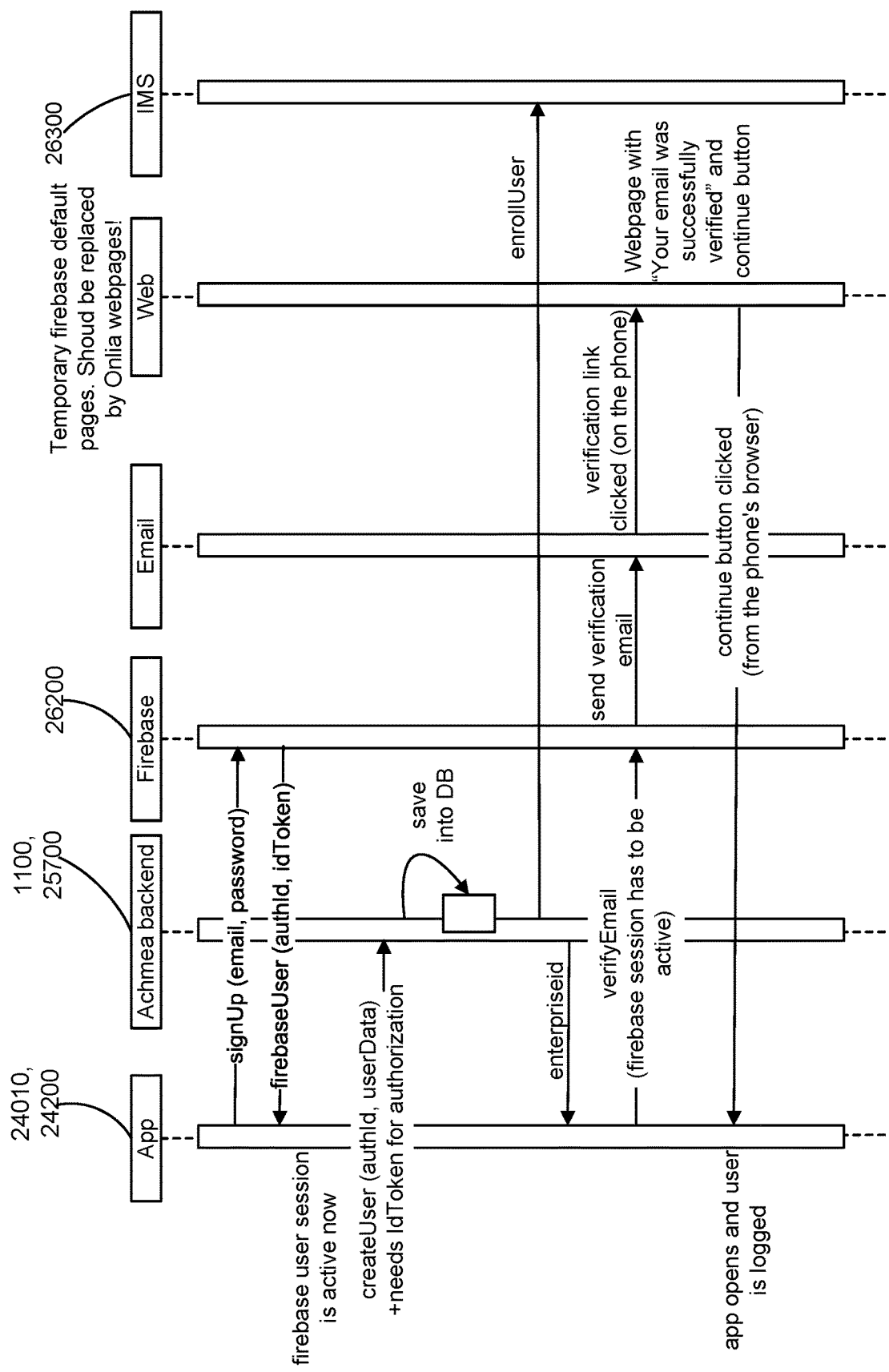
FIG. 14H is a sequence diagram showing the steps of login and enrollment in the driving telemetry service, and associated email address verification.
Figure 14I:
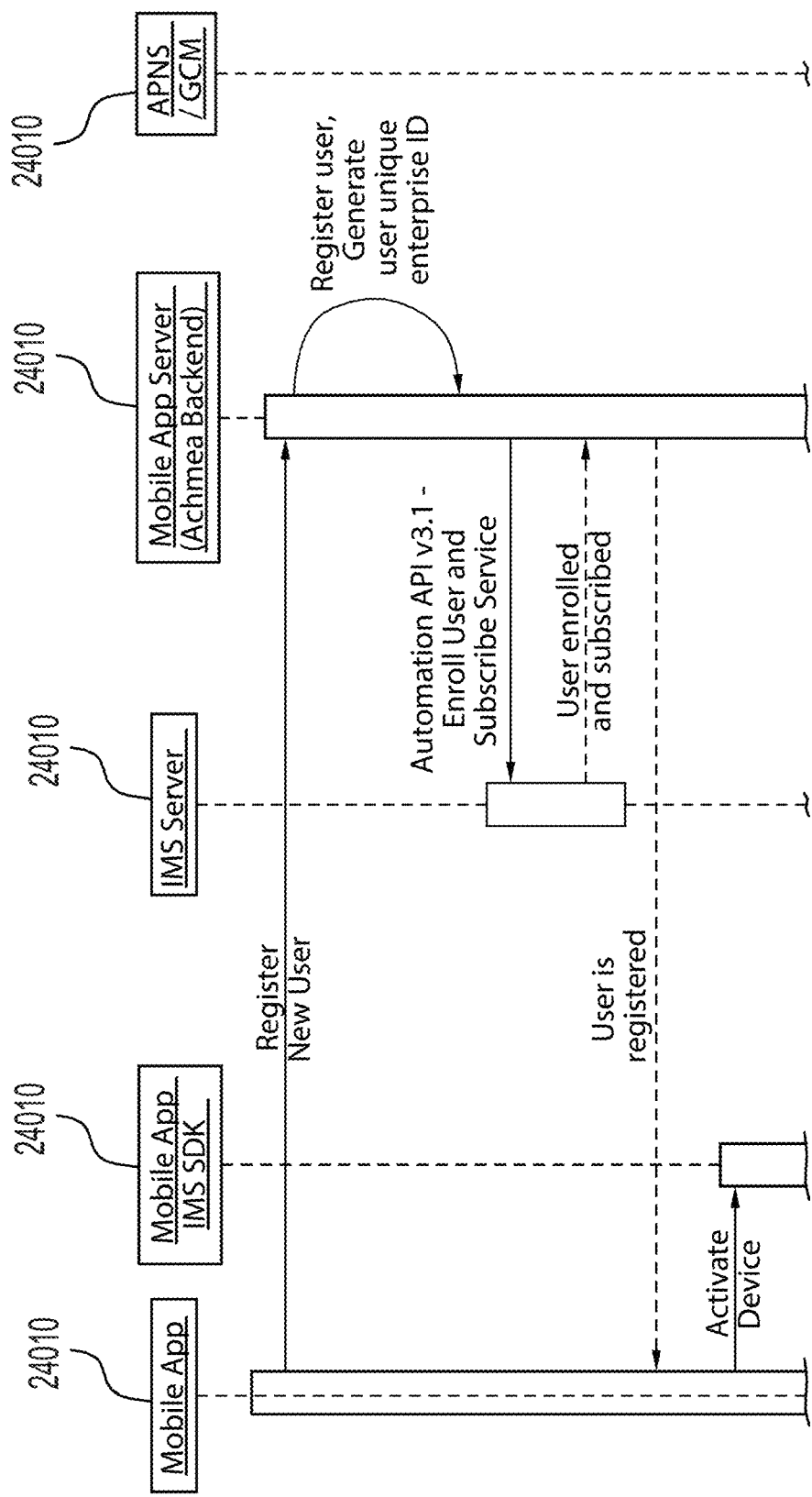
FIGS. 14I-L form a sequence diagram showing the steps of enrolling in a driving telemetry service and computing a safe driving score (SDS)
Figure 14J:
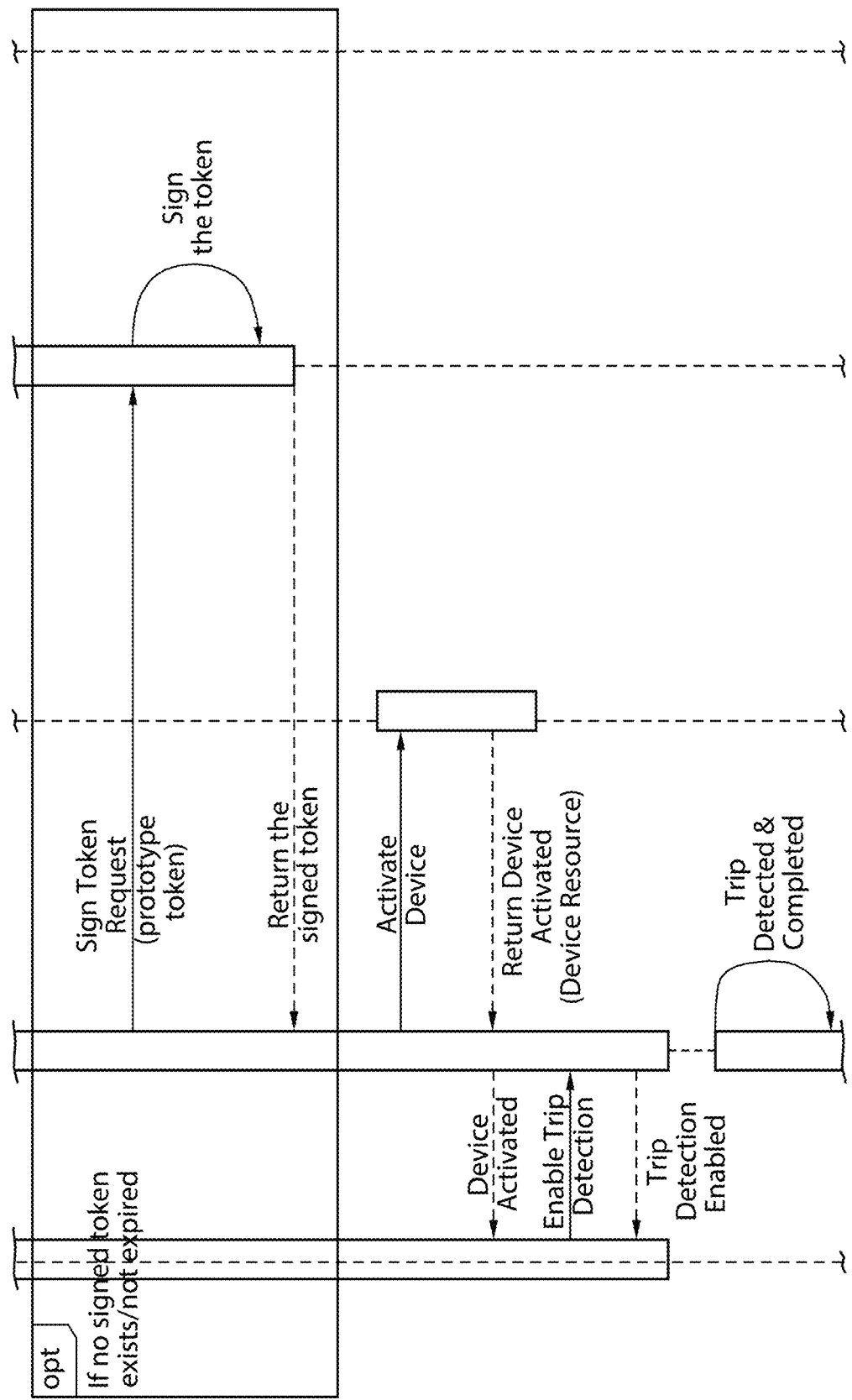
Figure 14K:
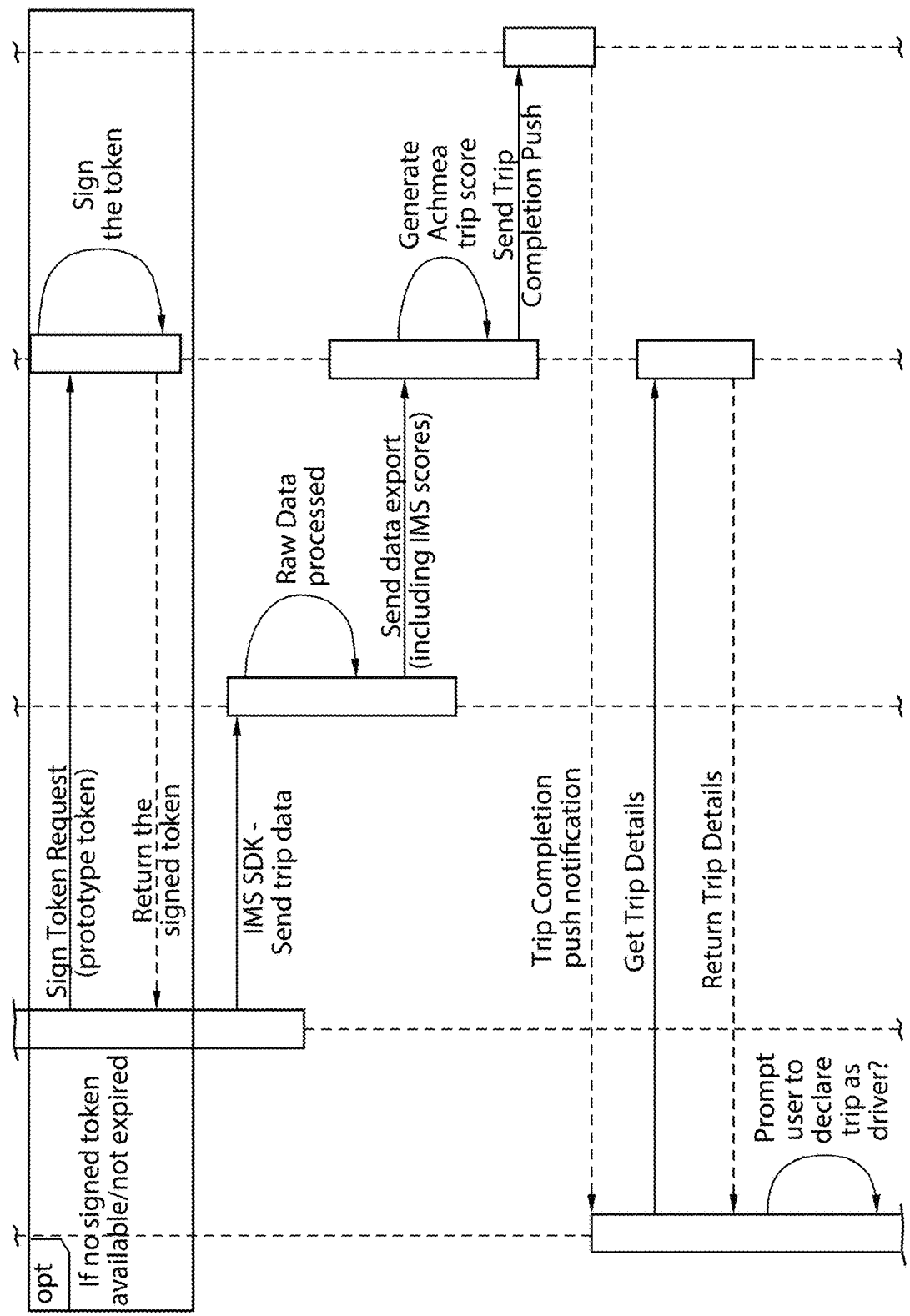
Figure 14L:
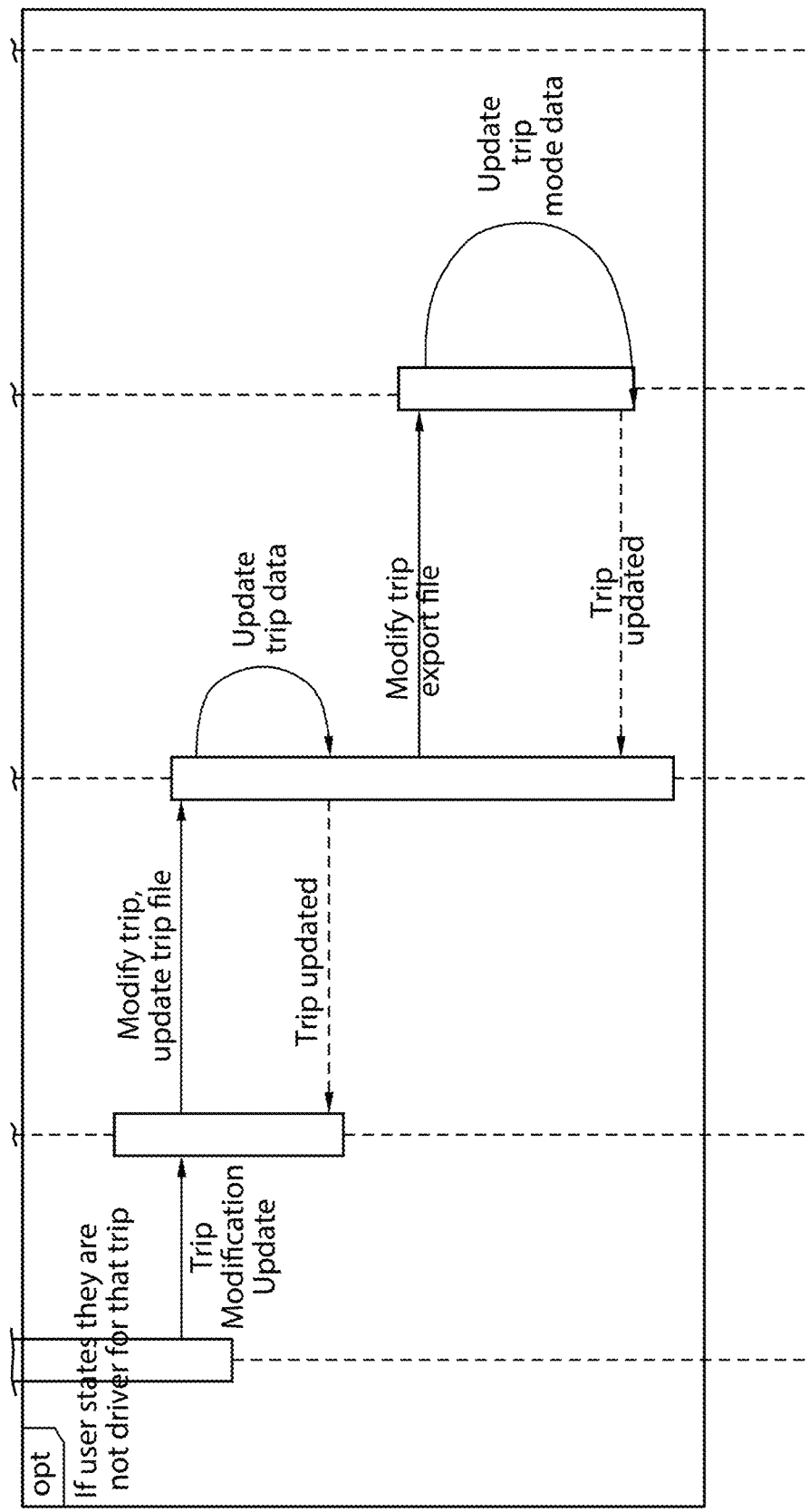

FIG. 14H depicts a method whereby a user is authenticated, and enrolled in a driving telemetry service with email verification, in accordance with an embodiment of the present invention. Initially, the mobile app 24010 utilizes the authentication SDK 24200 to send user's credentials to the authentication server 26200, and the authentication server 26200 provides back an authentication ID and an ID token, as discussed earlier. The mobile app 24010 requests the creation of the user from the session management module 25700 on the mobile application server 1100. The new user is created and saved into a database associated with the session management module 25700 on the mobile application server 1100. A request to enroll the user is sent to the driving telemetry service 26300. When the user is created, the session management module 25700 generates an enterprise user ID and returns it to the mobile app 24010. Upon receipt of the enterprise user ID, the mobile application requests verification of the user's email address from the authentication server 26200. The authentication server 26200, in turn, sends a verification email with a verification link or URL (Universal Resource Locator). The email arrives at the mobile application 24010, and when verification link is clicked, the mobile browser is launched and a message indicating that the user's email has been verified. A user interface element, such as a button, is displayed along with the verification message. The button may say "continue", for example. Upon activation of the user interface element, the mobile app 24010 is launched and the user is logged in.

FIGS. 14I-L show a main method in accordance with an embodiment of the present invention. The mobile app 24010 registers a new user for driving monitoring and rewards. The steps for registering a new user have been explained in detail with reference to FIGS. 14A-14H, and therefore will not be revisited. Subsequent to user registration and token signing, the mobile application 24010 requests activation of the user's account with the driving telemetry service 26300. Upon successful activation, the mobile application 24010 then requests the enablement of trip detection, by invoking the trip detection and scoring module 24300. Upon trip completion, if the available signed token expires, another signed token is obtained from the mobile application server 1100. The trip detection and scoring module 24300 now sends the driving telemetry data gathered throughout the trip, in raw form, to driving telemetry service 26300. The driving telemetry service 26300 processes the raw driving telemetry data and provides driving factors (such as the ones depicted earlier in FIG. 2) to the mobile application server 1100. The mobile application server 1100 derives a safety driving score from the driving factors, as discussed earlier. When done, a push notification is sent to the mobile application indicating the completion of driving score derivation for the particular trip. The mobile application 24010 requests confirmation from the user that they were the driver in the trip. Upon receiving an indication that the user of the mobile application was not the driver for that trip, the mobile app requests from the trip detection and scoring module that the trip stats be tagged to indicate that the user was not the driver and hence the trip statistics are not to be used to derive an SDS for the user.

Figure 14M:
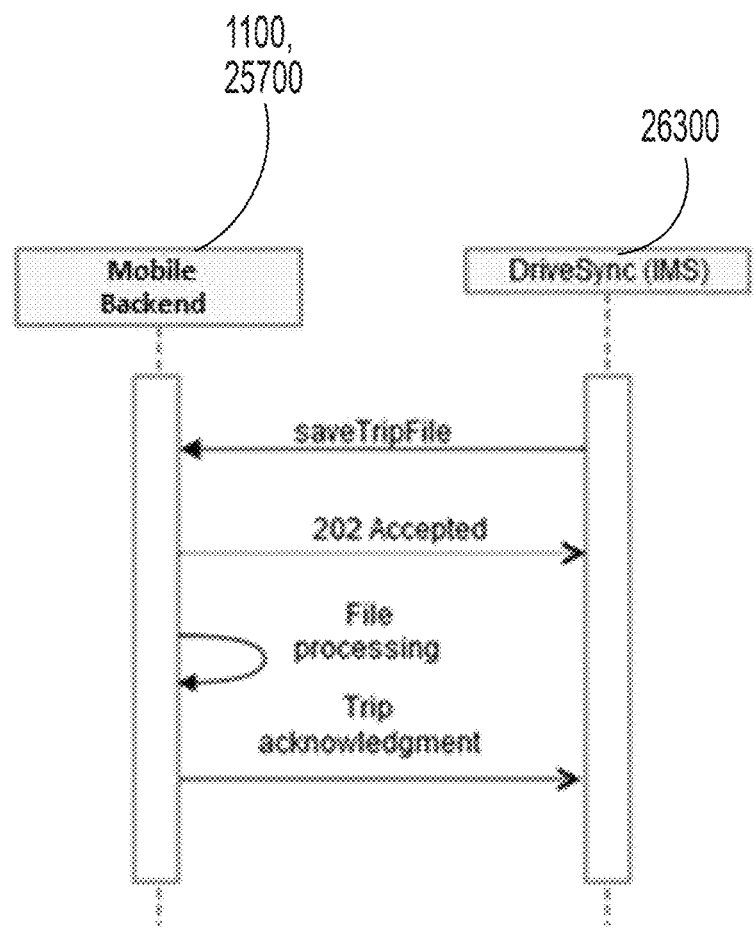
FIG. 14M is a sequence diagram showing the steps of receiving a trip file including driving factors from the driving telemetry service and processing it to derive an SDS.

FIG. 14M shows the steps carried out by the mobile application server 1100 upon receiving the trip information file from the driving telemetry service 26300. The mobile application server confirms receipt by sending an acceptance message back to the driving telemetry service 26300. The mobile application server 1100 then processes the trip data and derives an SDS. Finally the mobile application server 1100 acknowledges the tip with the driving telemetry service.

Figure 14N:
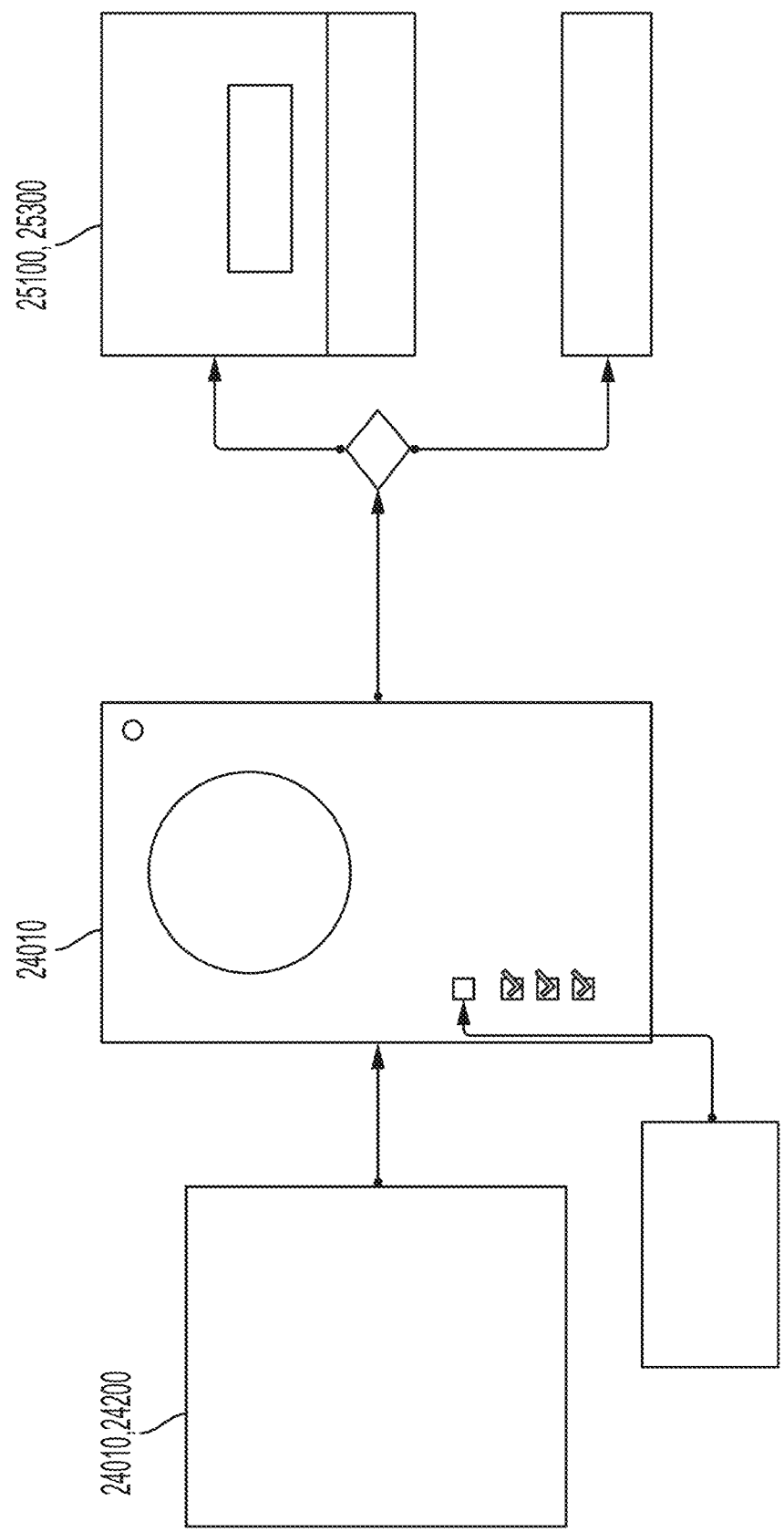
FIG. 14N is a sequence diagram showing the steps involved in receiving a perk based on certain criteria.

FIG. 14N shows the steps by which perks are paid out based on a number of factors.

Mobile Application User Interface

Registration and Login

Figure 15B:
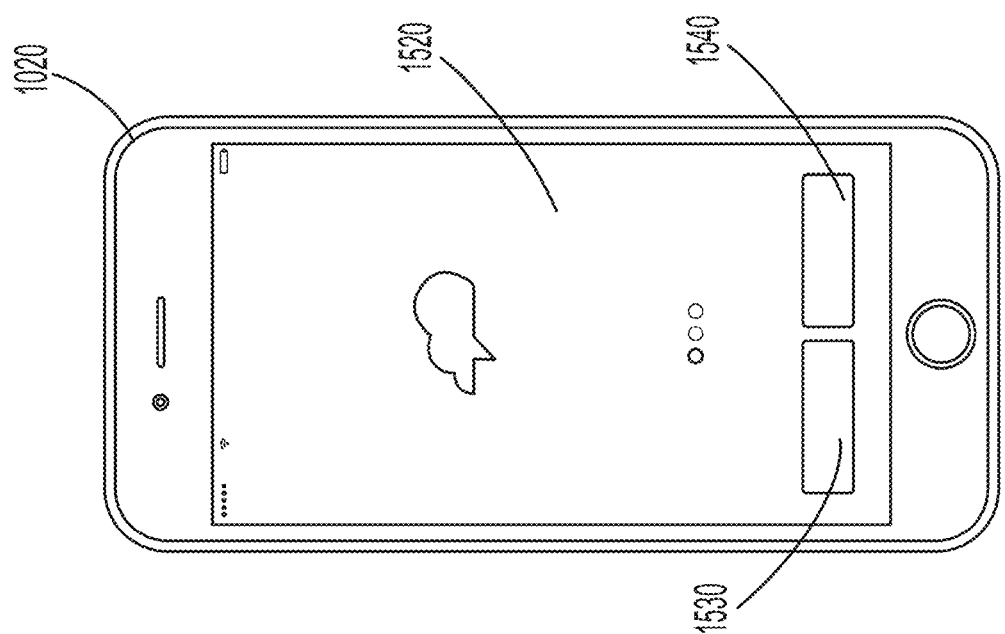
FIG. 15B is an exemplary login screen of the mobile application.
Figure 15A:
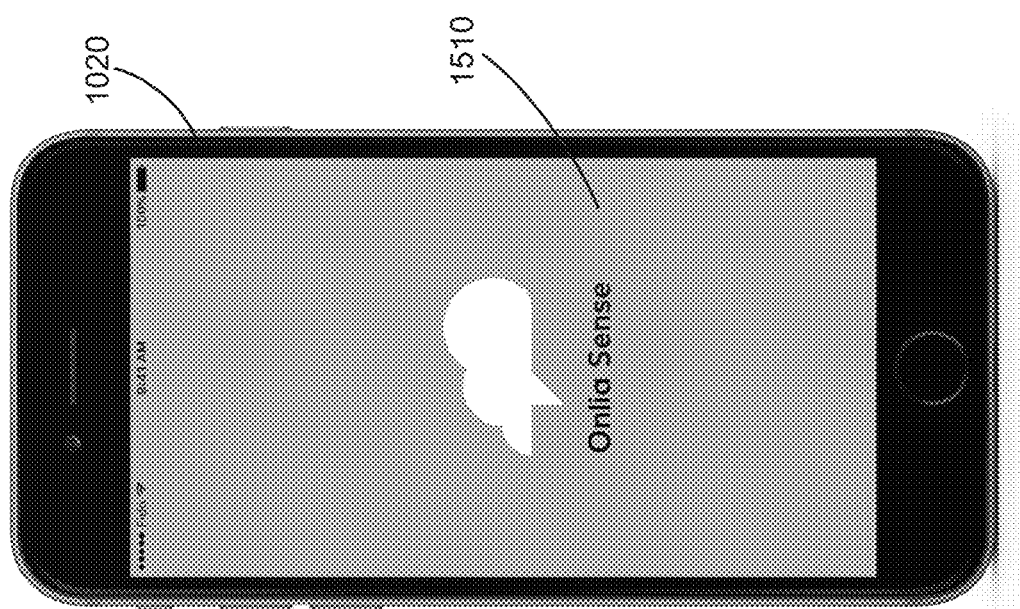
FIG. 15A is an exemplary splash screen of a mobile application of the smart mobility platform.
Figure 15C:
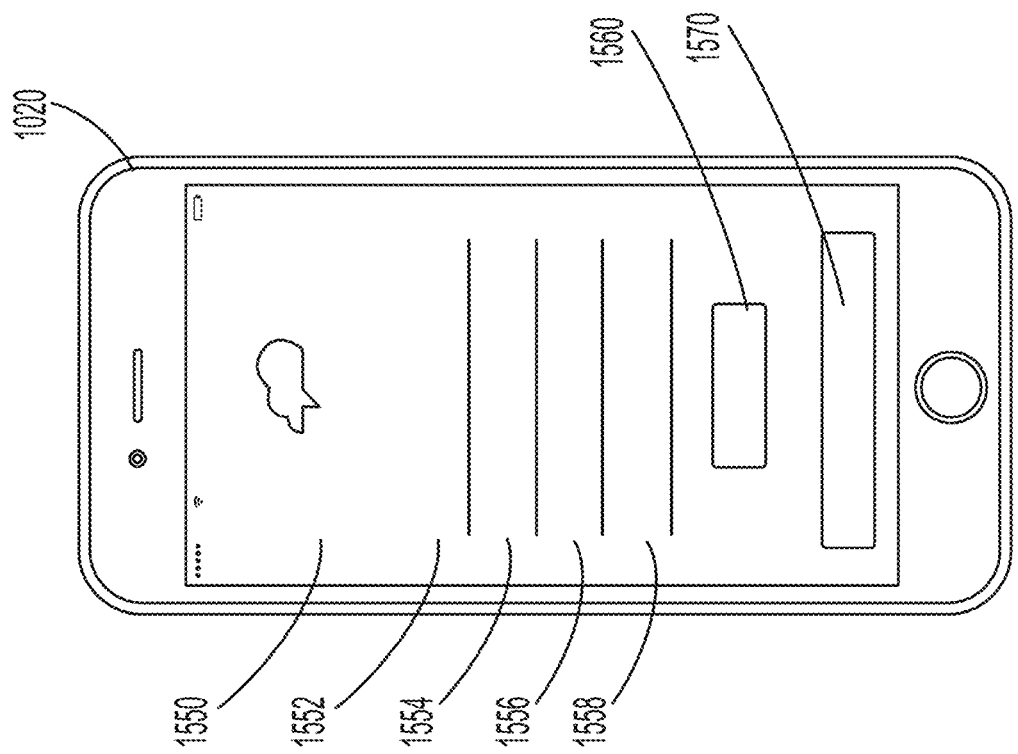
FIG. 15C is an exemplary registration screen of the mobile application.

FIGS. 15A-15C show the initial screens that a user encounters when starting the smart mobility platform's mobile application. FIG. 15A shows an initial splash screen 1510 displayed on the screen of mobile phone 1020. FIG. 15B shows a registration/login screen 1520. Screen 1520 includes a registration user interface element 1530, and a login user interface element 1540. Registration element 1530 is for new users who have not yet created an account with the system. Login element 1540 is for returning users who already have login credentials and are able to login to the platform. For new users, activating element 1530 directs them to screen 1550 (FIG. 15C) for creating a new account. Screen 1550 contains fields for entering user account information such as: first name 1552, last name 1554, email address 1556, and password 1558. In addition, screen 1550 contains a submission user interface element 1560 that the user activates once the information in fields 1552-1558 are entered. Alternatively, the user may elect to register with the smart mobility platform using their Facebook® account by activating user interface element 1570.

Figure 16:
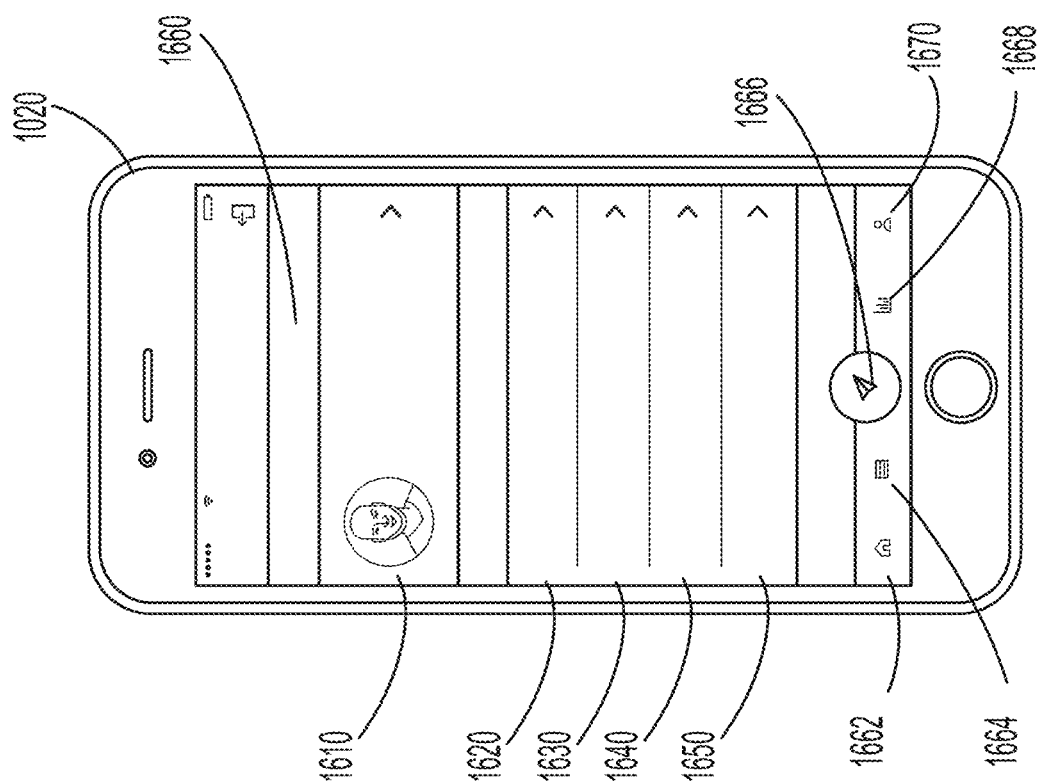
FIG. 16 is an exemplary settings screen of the mobile application.

FIG. 16 shows a settings screen 1600. The settings screen 1600 allows the user to change profile information, such as profile photo, email address, and telephone number by activating user interface element 1610. The user may change map options by activating user interface element 1620, may plan a route using element 1630, may set regional settings using element 1640, and may configure sounds and notifications using element 1650. At the bottom of the screen there are other elements such as: 1662 for taking the user back to the home or SDS screen of the application, activate element 1664 to see the badges earned by the user, activate element 1666 to activate navigation, activate 1668 to invoke roadside assistance, and activate 1670 to invoke the profile settings screen.

Navigation

As mentioned earlier, the use of navigation may be combined with a telematics score to arrive at an SDS.

Figure 17:
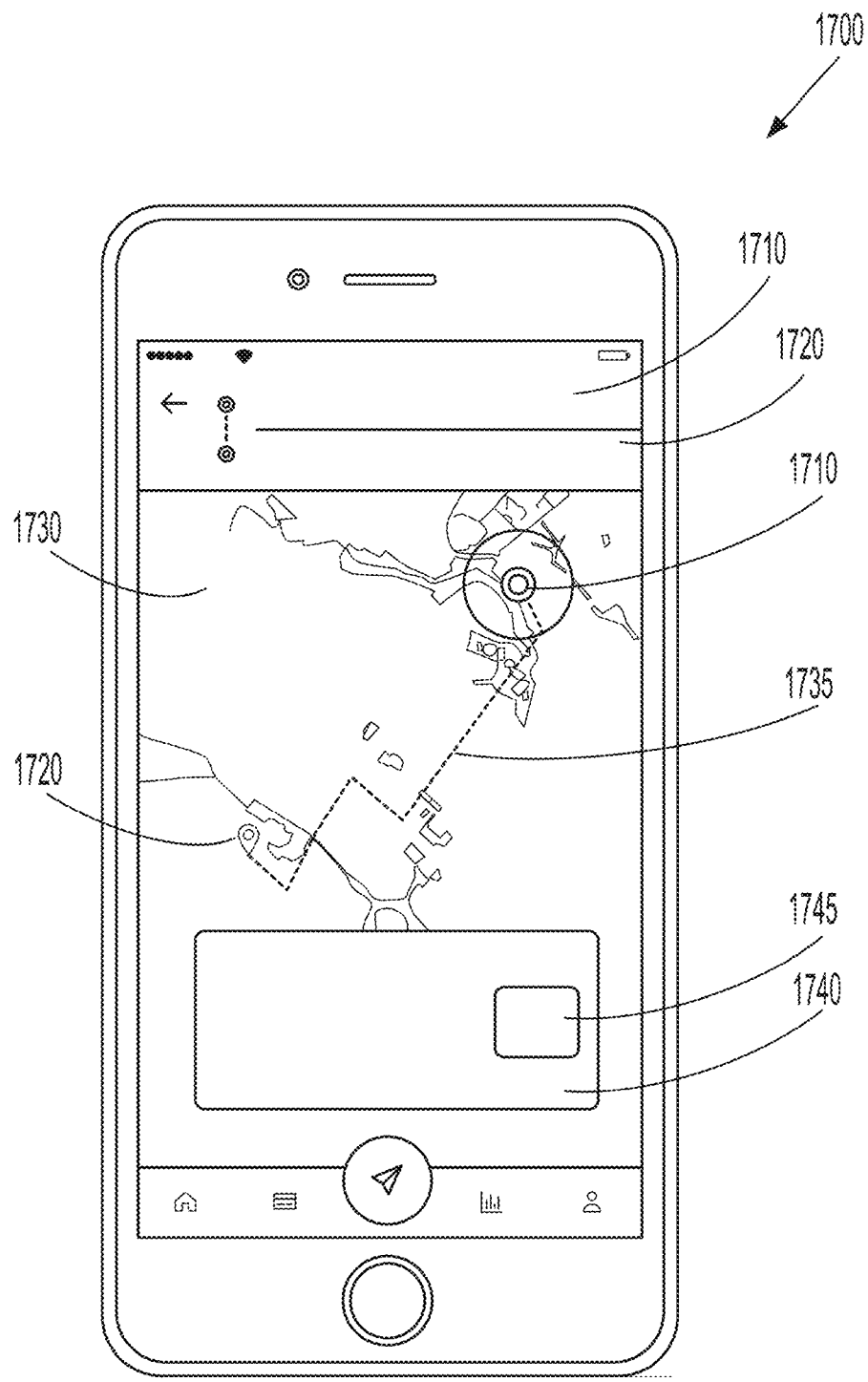
FIG. 17 is an exemplary navigation screen of the mobile application.

FIG. 17 shows an exemplary navigation screen 1700, in accordance with an embodiment of the present invention. Navigation screen 1700 contains a source field 1710 and a destination field 1720 for specifying the source and destination of a trip, respectively. Navigation screen 1700 also contains a map region 1730 showing the source 1710, destination 1730 and the route 1735 therebetween. Once the source, destination and route are identified, a dialog box 1740 is displayed containing information about the route including, for example, whether it includes tolls or unpaved roads. Additionally, dialog box 1740 has a confirmation user interface element 1745 which when activated starts the navigation.

Figure 18A:
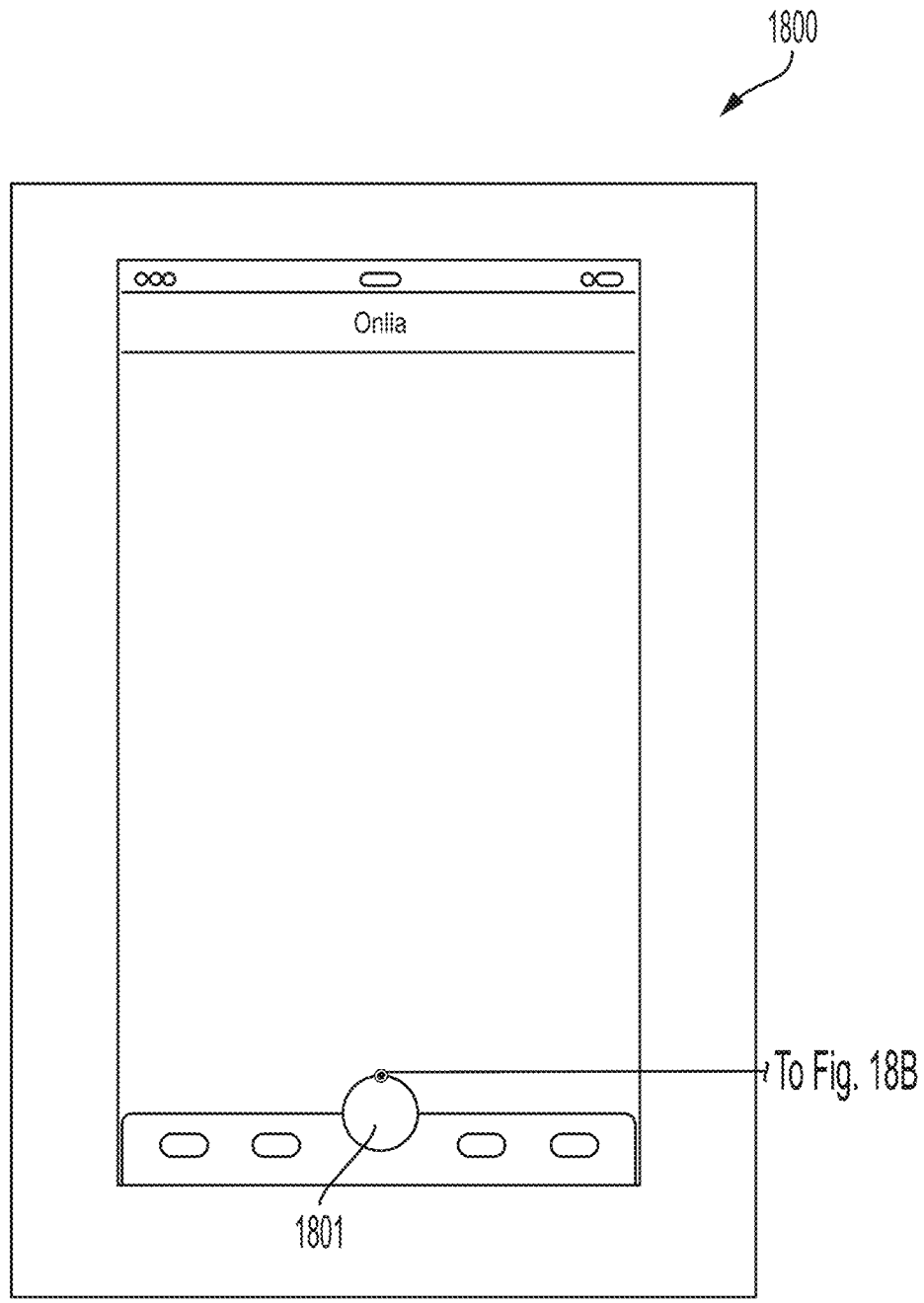
FIG. 18A is an exemplary default screen of the mobile application.
Figure 18B:
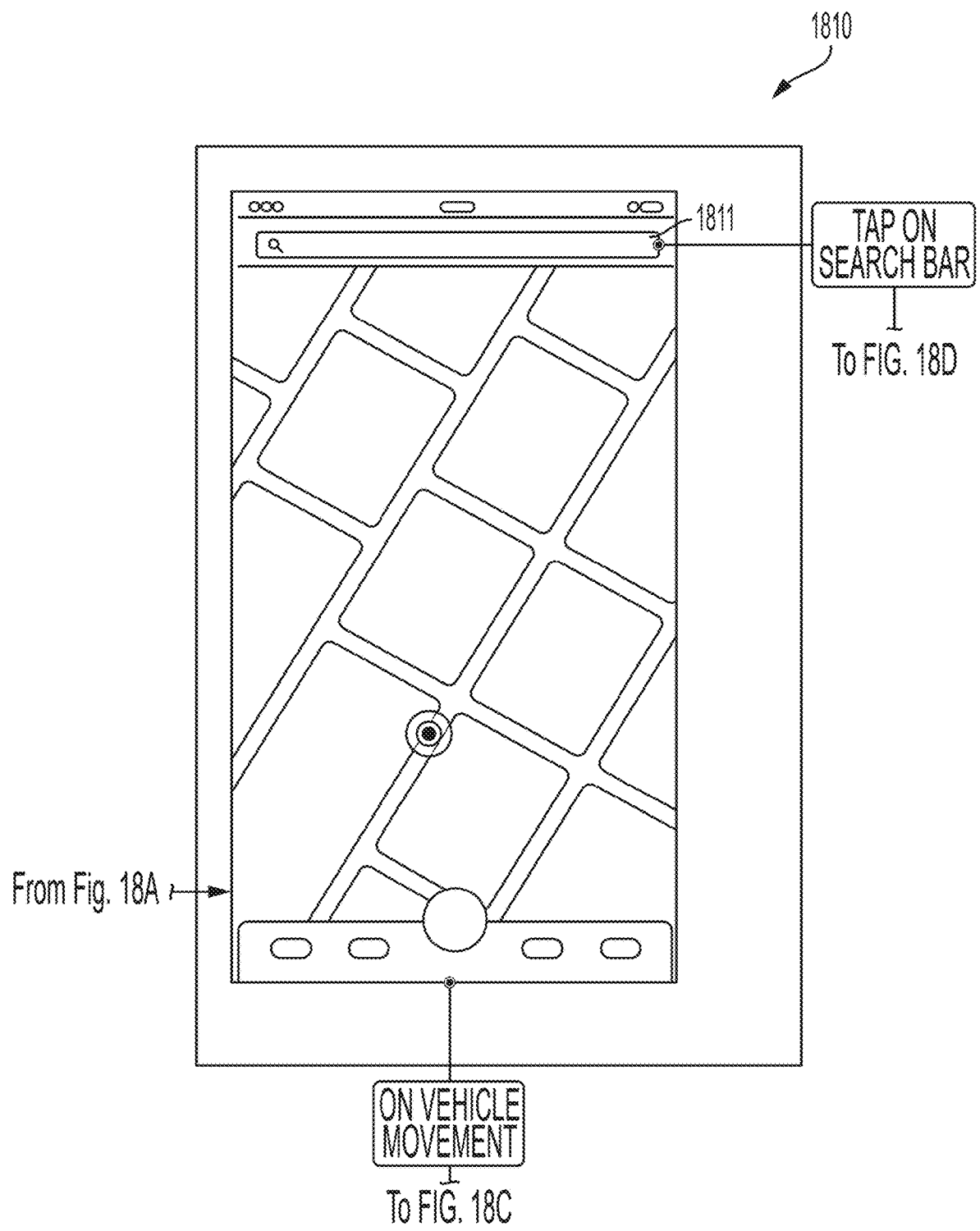
FIG. 18B is an exemplary driving destination search screen of the mobile application.
Figure 18C:
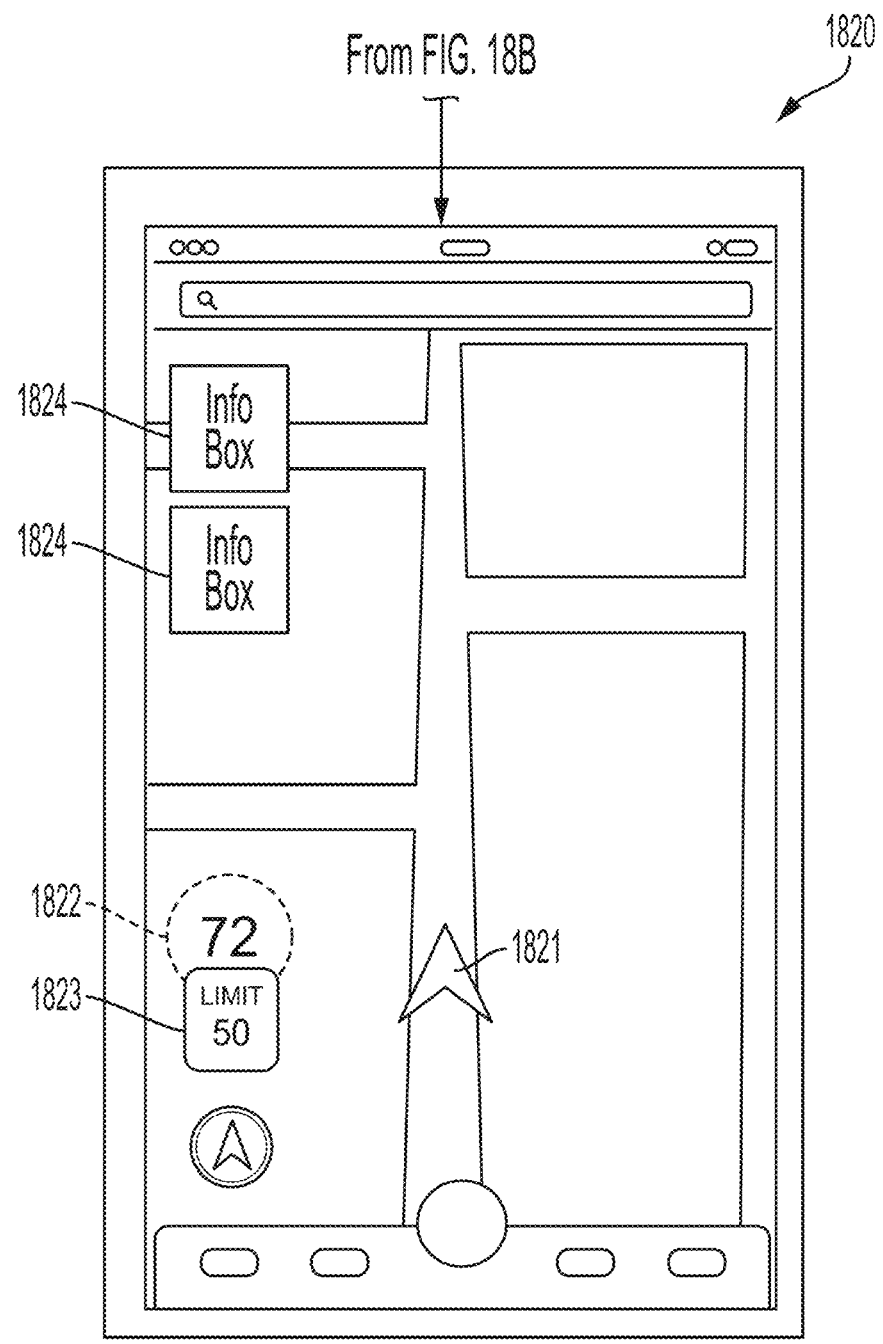
FIG. 18C is an exemplary passive navigation screen of the mobile application.
Figure 18D:
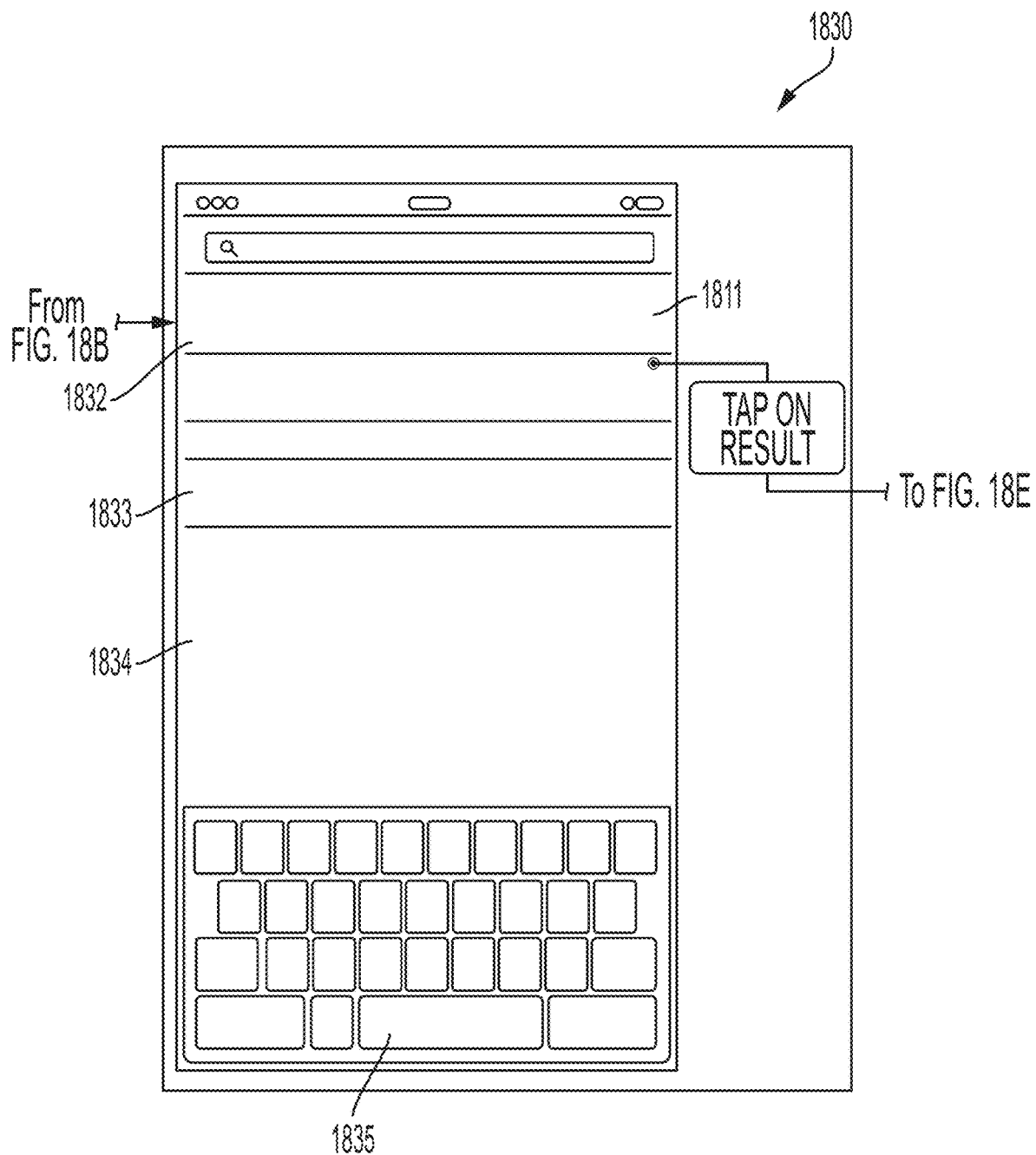
FIG. 18D is search for navigation destination screen of the mobile application.

FIGS. 18A-18I depict a navigation flow in the mobile application. FIG. 18A shows a default navigation screen 1800 containing a control 1801 which when activated starts navigation and displays the navigation search screen 1810 depicted in FIG. 18B. Search screen 1810 contains a search bar 1811 that a user can tap on to search for a place that they wish to navigate to, and the search for destination navigation screen 1830 of FIG. 18D is displayed. Alternatively, a user may wish to simply activate passive navigation, and they do so by simply starting driving while in the navigation search. On vehicle movement, the passive navigation screen 1820 is displayed. Screen 1820 shows a map of the current location of the car and a location indicator 1821. Additionally, the current vehicle speed 1822 as well as the speed limit 1823 are also shown. Optionally, additional information may be displayed in information boxes 1824.

In navigation search screen 1810, and upon tapping search bar 1811, the search for destination screen 1830 is displayed, as shown in FIG. 18D. The use now has different options. Bookmarked locations 1831 such as home 1832 and work 1833 may be tapped to make either location the destination for the planned trip. Additionally, recent trips may also be selected from the recent trips list 1834. Alternatively, a new destination may be searched for by entering it with virtual on-screen keyboard 1835.

Figure 18E:
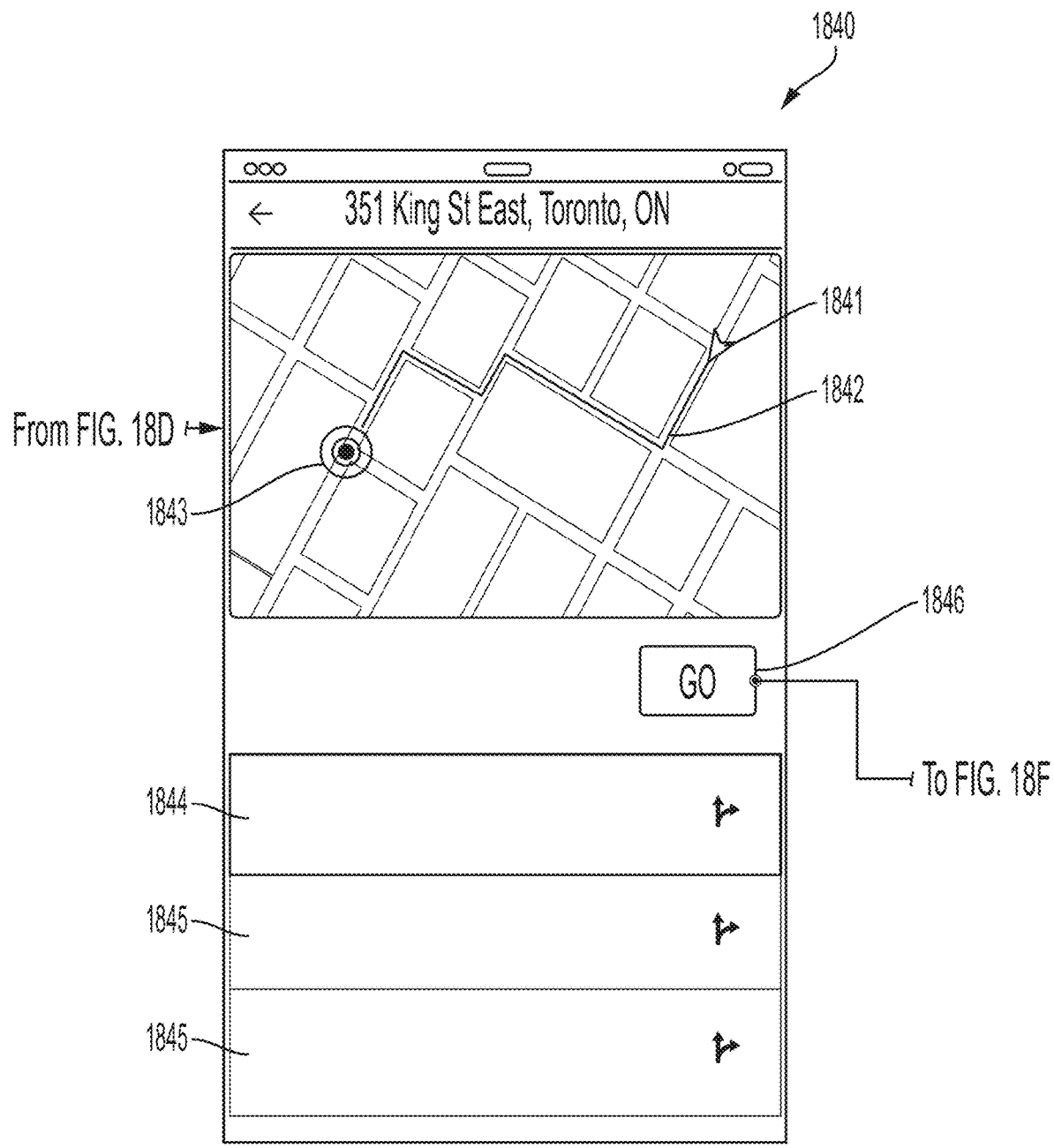
FIG. 18E is a route overview navigation screen of the mobile application.

Upon selecting a destination for the navigation, the route overview screen 1840, shown in FIG. 18E, is displayed. A map portion on the screen shows the current location 1841, the destination 1843, and a visual depiction of a proposed route 1842 for the trip. Below the map, a written description of: a recommended route 1844, and alternative routes 1845 such as a shortest route and an economical route are all displayed. Any of the recommended or alternative routes may be selected, and the visual route 1842 on the map is updated accordingly. Once the route is selected, navigation may be commenced by activating the navigation activation control 1846, to display the En-route navigation screen 1850.

Figure 18F:
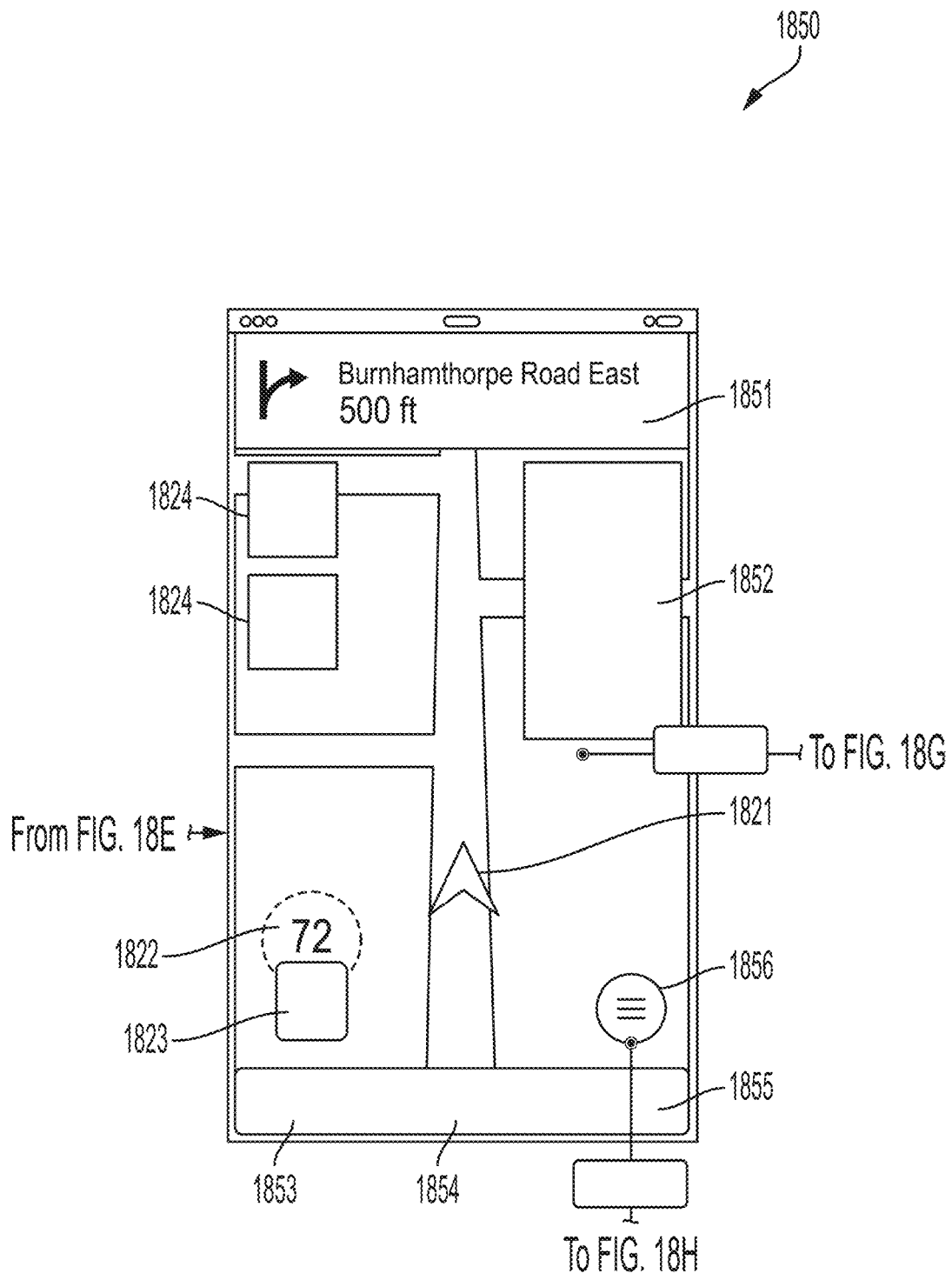
FIG. 18F is an en-route navigation screen of the mobile application.
Figure 18G:
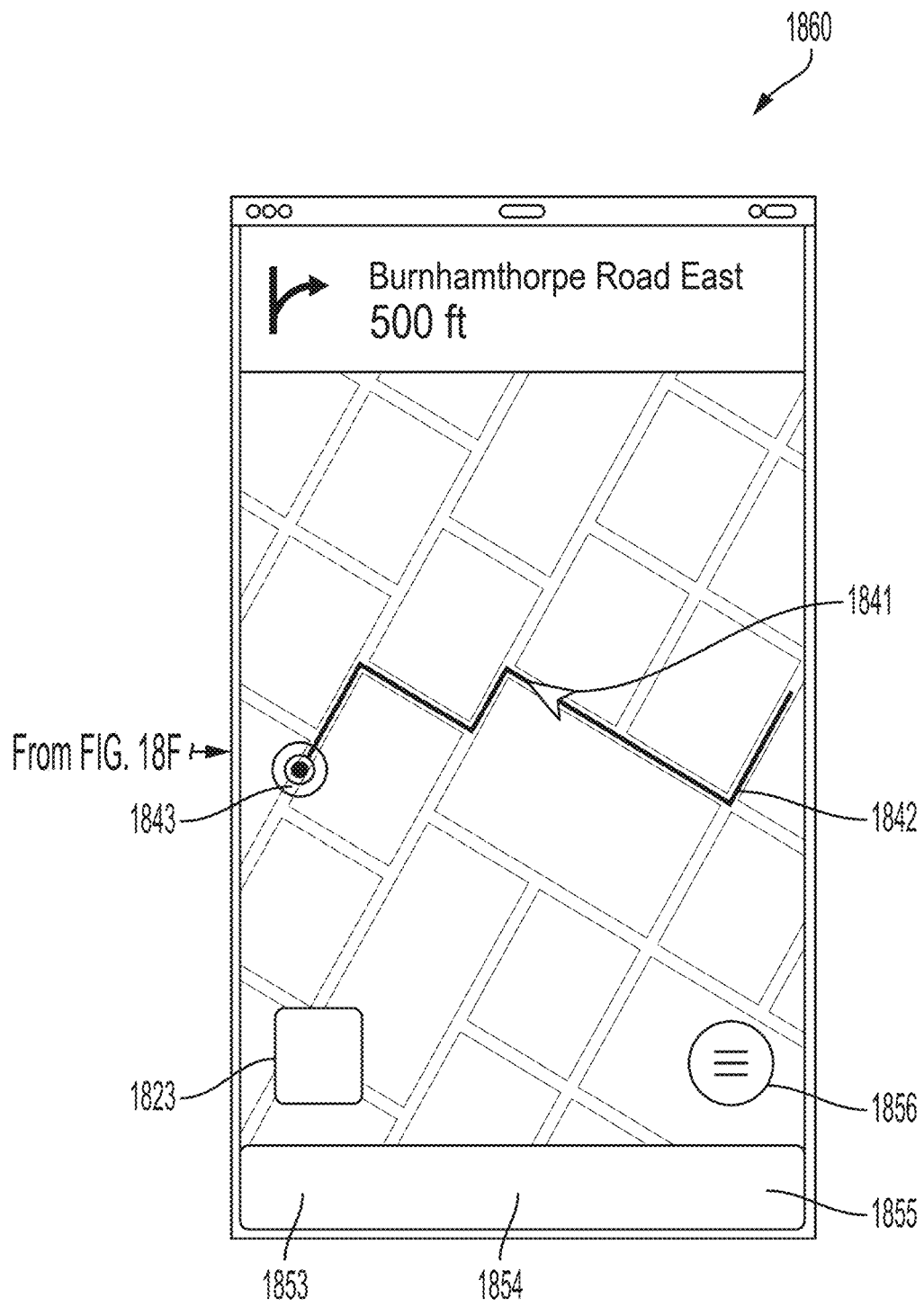
FIG. 18G is an en-route navigation progress screen of the mobile application.
Figure 18H:
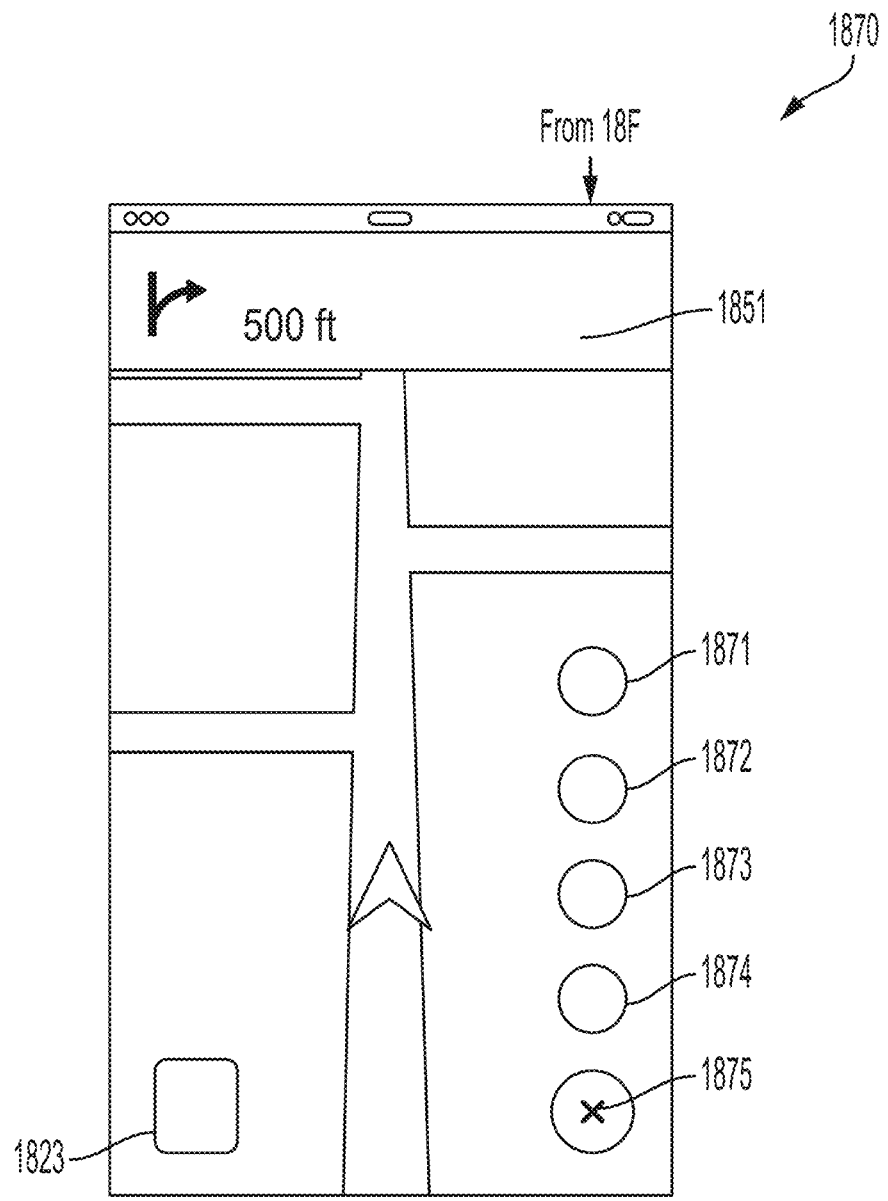
FIG. 18H is an en-route navigation screen of the mobile application with a Floating Action Button (FAB) overlay.
Figure 18I:
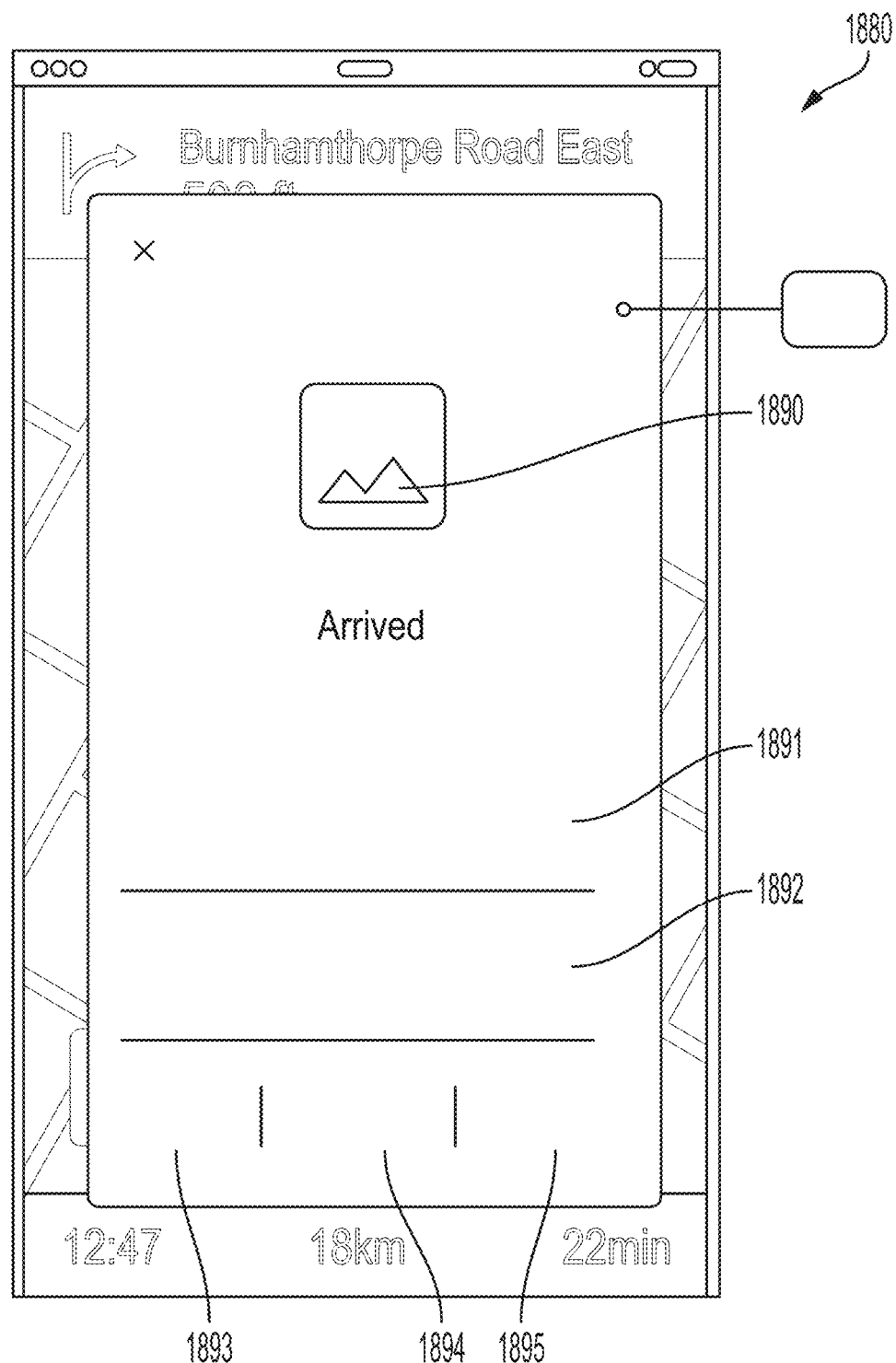
FIG. 18I is a navigation arrival screen of the mobile application with an end of navigation trip popup.

FIG. 18F shows the En-route navigation screen 1850. Screen 1850 displays turn-by-turn navigation 1851. It also includes lane assistance 1852 so that the driver may know which lane they need to be in to make the next turn. Information boxes 1824 are present for optional additional information. The current speed 1822 and speed limit 1823 are also displayed. At the bottom of the screen the estimate time of arrive (ETA) 1855 is displayed, along with the distance 1854 for the trip, and the estimated arrival time 1853. Screen 1850 also includes a Floating Action Button (FAB) user interface element 1856 which when activated causes the En-route screen with FAB overlay to be displayed, as explained below.

Tapping on the map portion of the En-route navigation screen 1850 activates an En-route screen with the route in progress overview 1860. This screen shows the current location 1841 of the driver along the trip route 1842.

Tapping on the FAB user interface element 1856 of screen 1850 invokes the En-route screen with FAB overlay screen 1870. Screen 1870 includes the turn-by-turn navigation 1851, as in previous screens, but adds a plurality of user interface elements 1871-1875 which perform different functions when activated. Activating element 1871 ends the route and stops navigation. Activating element 1872 dispatches emergency services. Activating element 1873 invokes the roadside assistance service, described below with reference to FIGS. 30-35. Activating element 1874 invokes a head up display. Finally, activating element 1875 removes the FAB overlay, and the En-route screen 1850 is displayed.

Upon arrival at the destination, the Arrived screen 1880 is displayed. An indicator 1890 indicates that the vehicle has arrived at the destination. The trip details are also displayed including the starting point 1891, the arrival point 1892, the total trip time 1893, the total trip distance 1894, and the average speed 1895.

Figure 19:
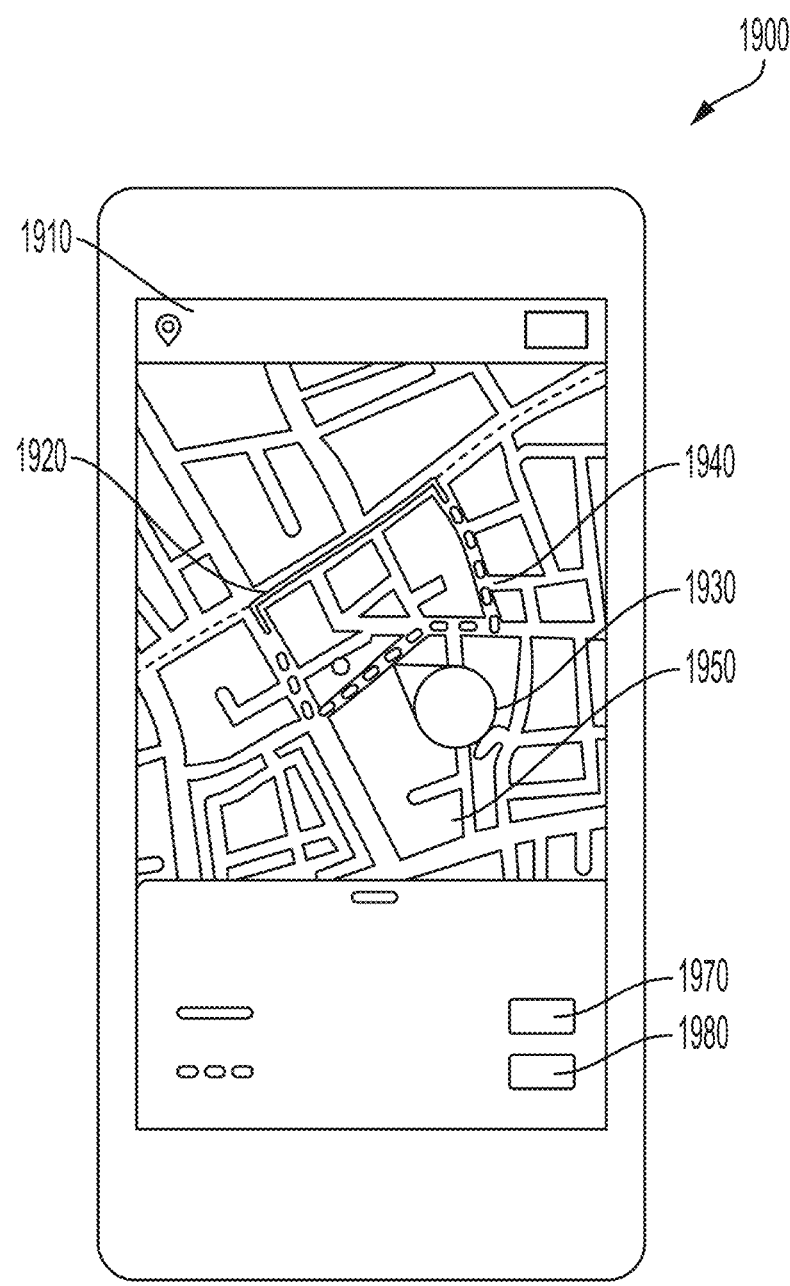
FIG. 19 is an alternative exemplary navigation screen of the mobile application featuring a safest route option and a quickest route option.

FIG. 19 depicts another example for a navigation screen as navigation screen 1900 which shows a source and a destination 1910 for a route. Also shown is a map element 1950 showing both a quickest route 1920 from the source to the destination specified in 1910 and the safest route 1940 between the source and the destination. An indicator 1930 on the map shows the number of points awarded to the driver if they take the safest route 1940 instead of the quickest route. A user interface element 1970 allows the user to select the quickest route and earn 0 points, whereas user interface element 1980 allows the user to select the safest route and earn 5 points.

Figure 20:
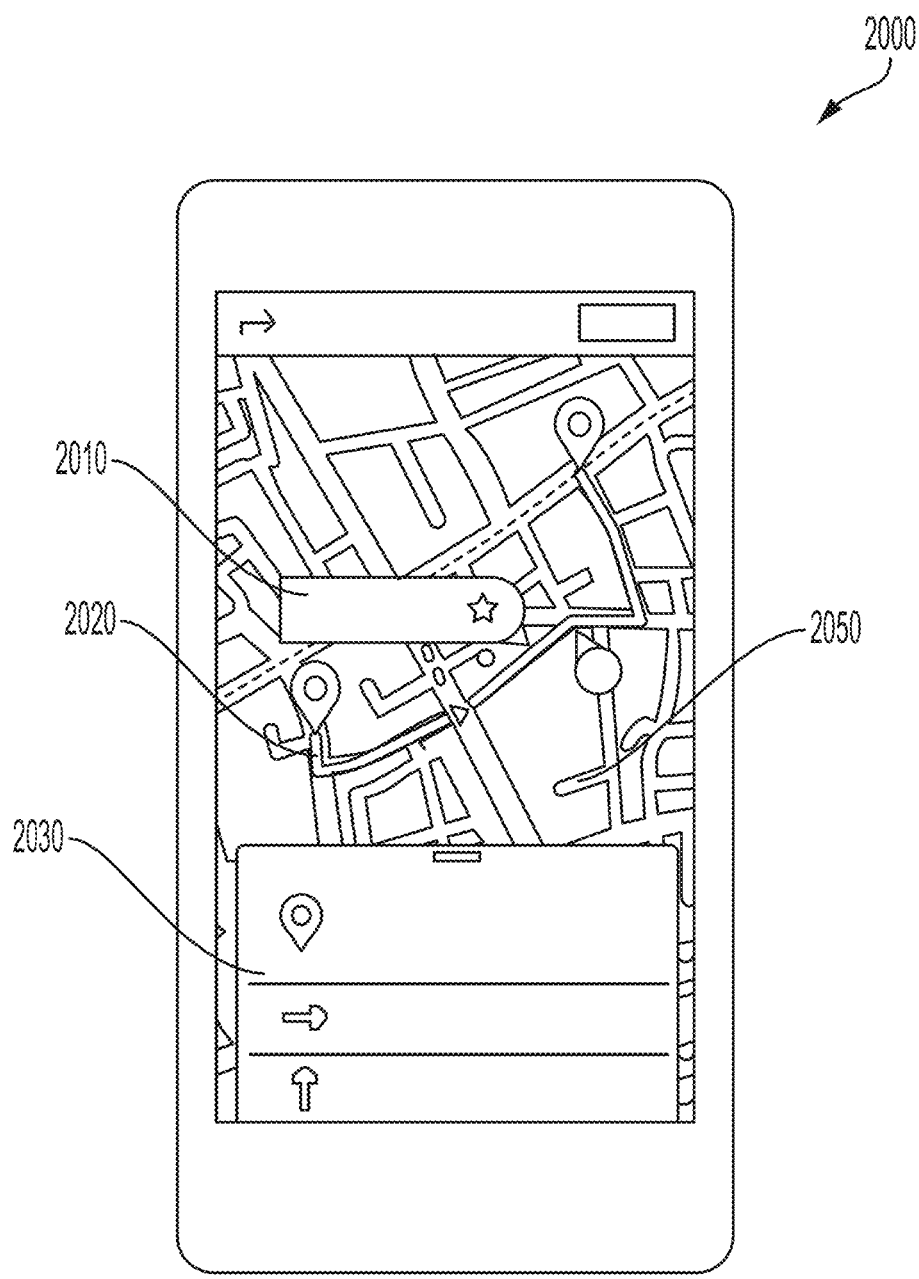
FIG. 20 is an alternative exemplary navigation screen of the mobile application featuring vouchers displayed along a route.

FIG. 20 shows another exemplary navigation screen 2000 similar to navigation screen 1900, but having optional additional features. In addition to showing navigation steps 2030, map section 2050 displays vouchers 2010 that a driver collects when following a particular route 2020. For example, a free coffee voucher is shown as 2010 which can be collected if route 2020 is taken by the driver.

Figure 21:
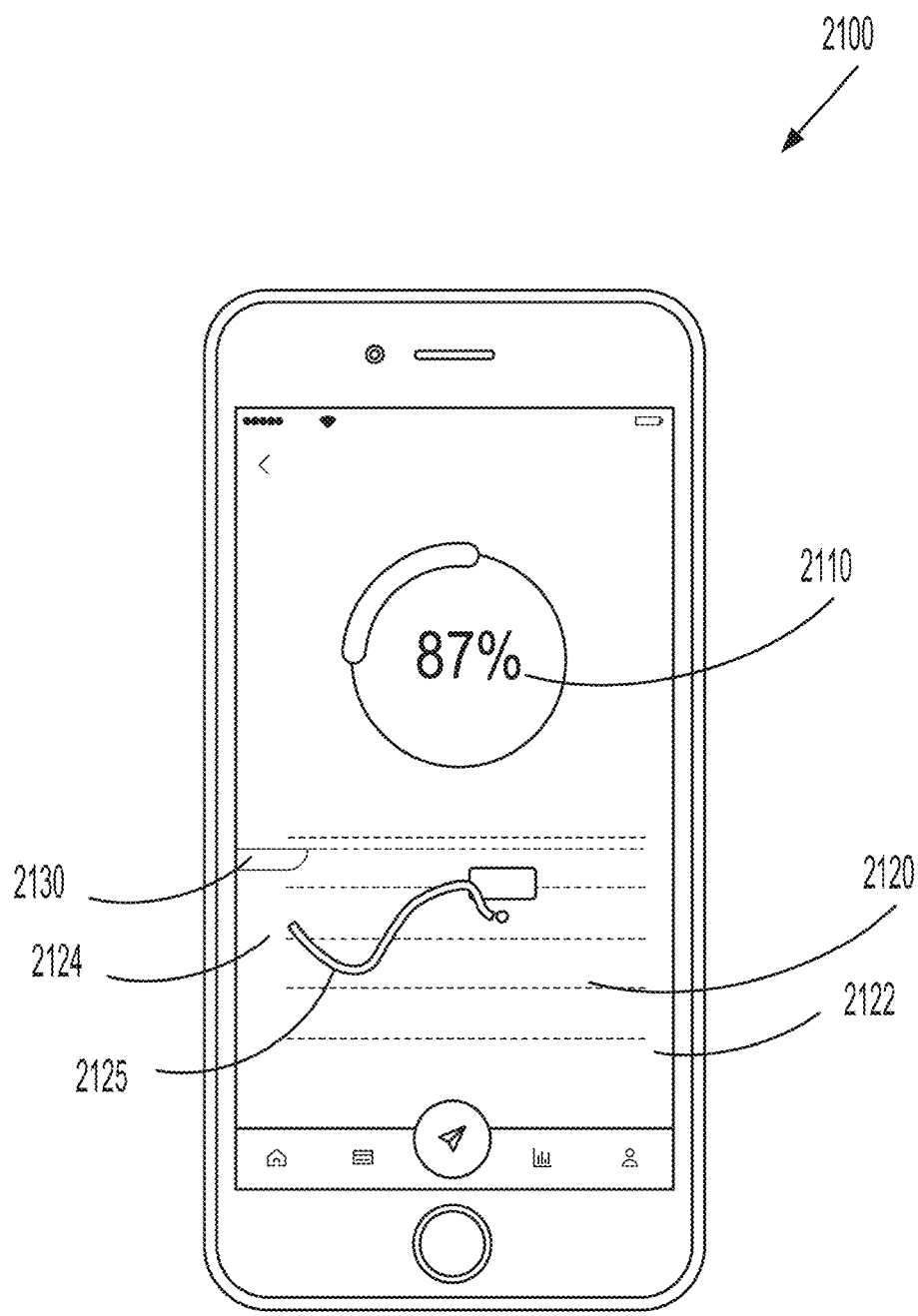
FIG. 21 is an exemplary screen of the mobile application, showing a daily SDS and an overall monthly SDS for a given month.

FIG. 21 is a drive score (SDS) screen 2100 showing both an overall monthly SDS 2110 and a daily SDS 2125 shown on a graph 2120 having a horizontal axis 2122 representing the day of the month and a vertical axis 2124 representing the daily SDS. Also shown is an indicator 2130 of the SDS level at which the user is awarded the top 1% reward and/or badge.

Figure 22:
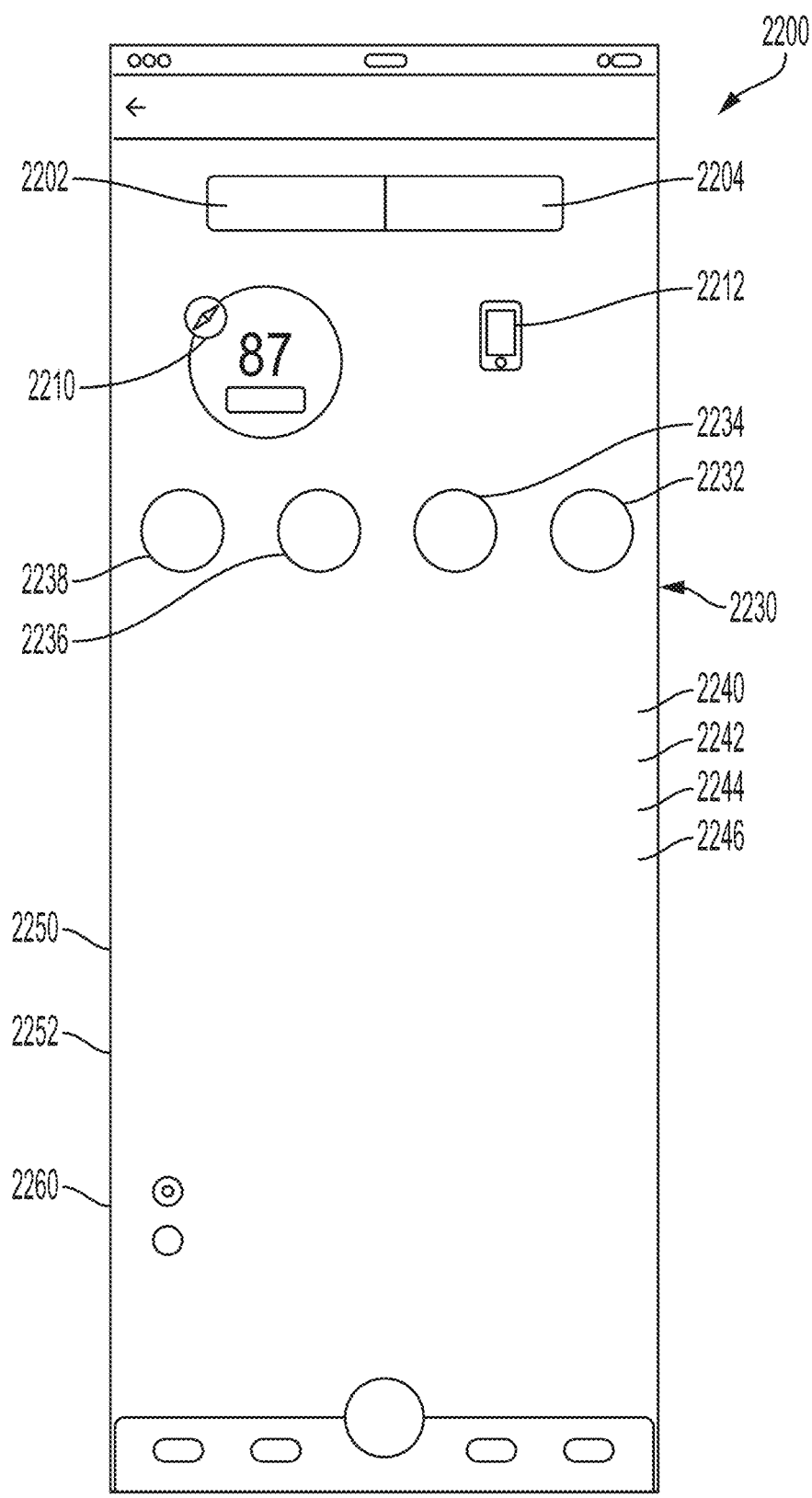
FIG. 22 is an exemplary screen of the mobile application showing an individual trip's details, statistics and telematics data.
Figure 23:
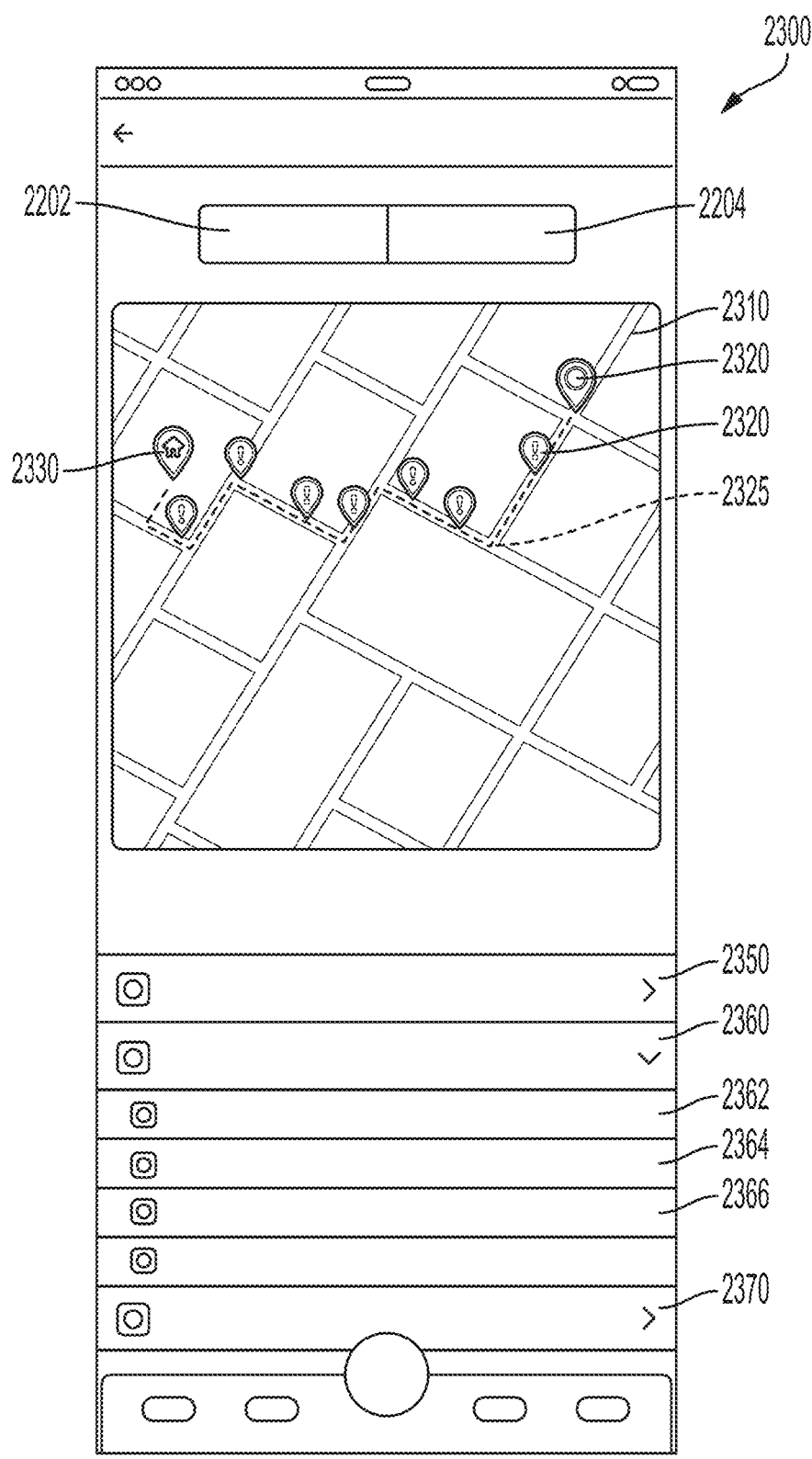
FIG. 23 is an exemplary screen of the mobile application showing driving events along a particular trip, arranged by severity.

FIGS. 22-23 show trip detail screens 2200 and 2300 for a driven trip. Screen 2200 is a Drivescore screen showing driving parameters statistics for a given trip. Screen 2300 is map screen showing various driving events on a map section. Screen 2200 is displayed when user interface element 2202 is activated. Similarly screen 2300 is displayed when user interface element 2204 is activated. Screen 2200 shows an SDS 2210, and the duration of high severity events 2212 during the trip. Section 2230 shows an evaluation of the various driving parameters. For example, in FIG. 22, the trip had a good speed score of 100 (2232), a poor cornering score of 95 (2234), an average braking score of 89 (2236), and a very good acceleration score of 87 (2238). Other statistics related to the tip are shown such as travel time 2240, distance 2242, the average speed 2244, and the maximum speed 2246. The source address 2250, and the destination address 2252 are shown, as well as the role of the application user 2260 which can either be a driver or a passenger. If the role 2260 is a passenger then the SDS and the statistics are not taken into account for the application user when determining rewards or badges.

FIG. 23 shows map screen 2300 showing more trip details information. For example, the starting point 2320, the destination 2330, and the route 2325 therebetween are shown on a map section 2310 of screen 2300. Additionally, the various driving events 2340 are shown on the map section 2310 along the route 2325. The various driving events are also listed below the map section, as organized by severity. The high severity events 2350 are listed, followed by medium severity events 2360, and then by low severity events 2370. Each list is collapsible and expandable, as required. For example, FIG. 23 shows a case where the medium severity events list has been expanded to show events for braking 2362, cornering 2364, and acceleration 2366 and 2368 (which occurred twice).

Figure 24A:
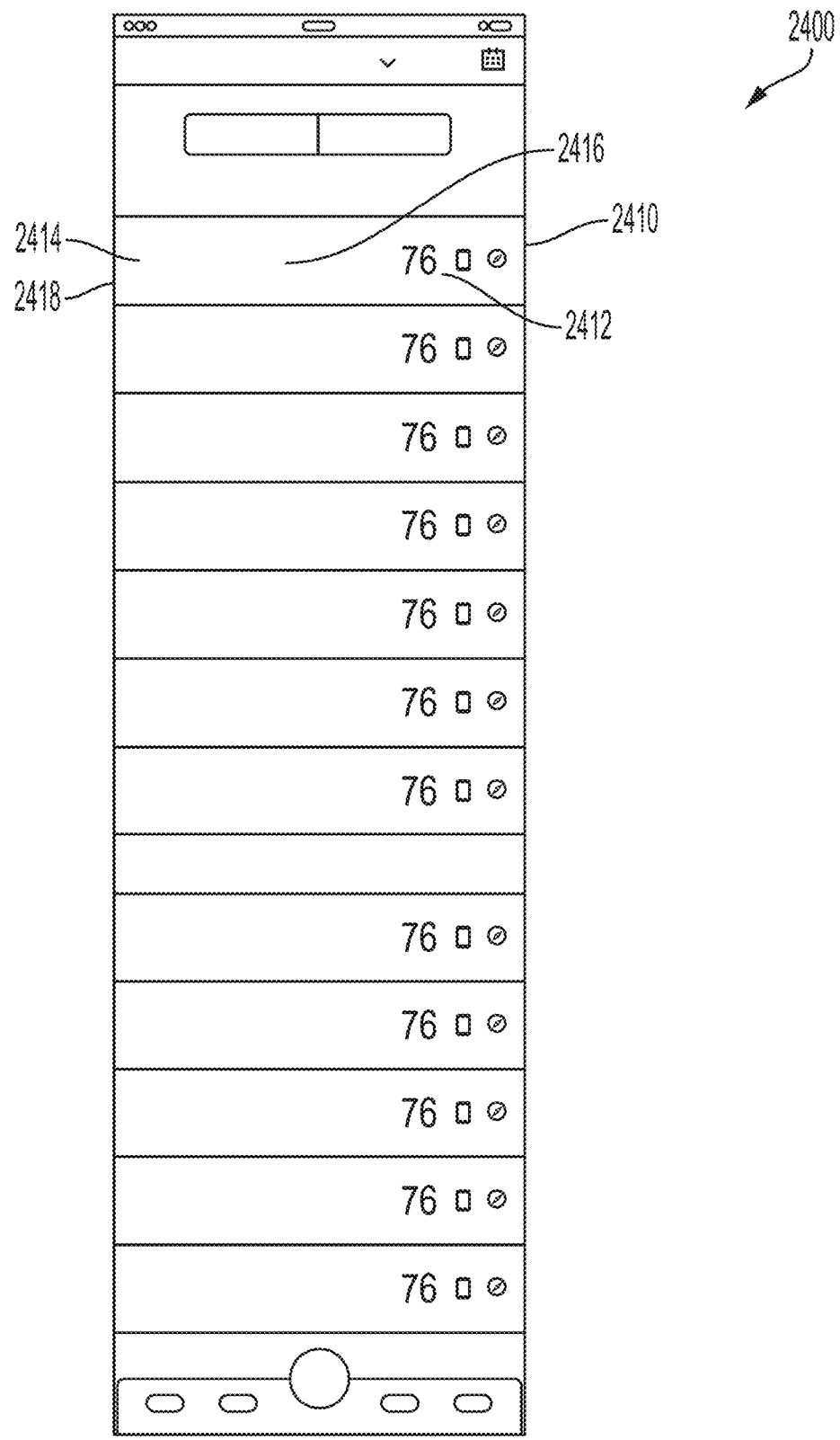
FIG. 24A is an exemplary screen of the mobile application showing a list of recent trips, along with the SDS for each trip.
Figure 24B:
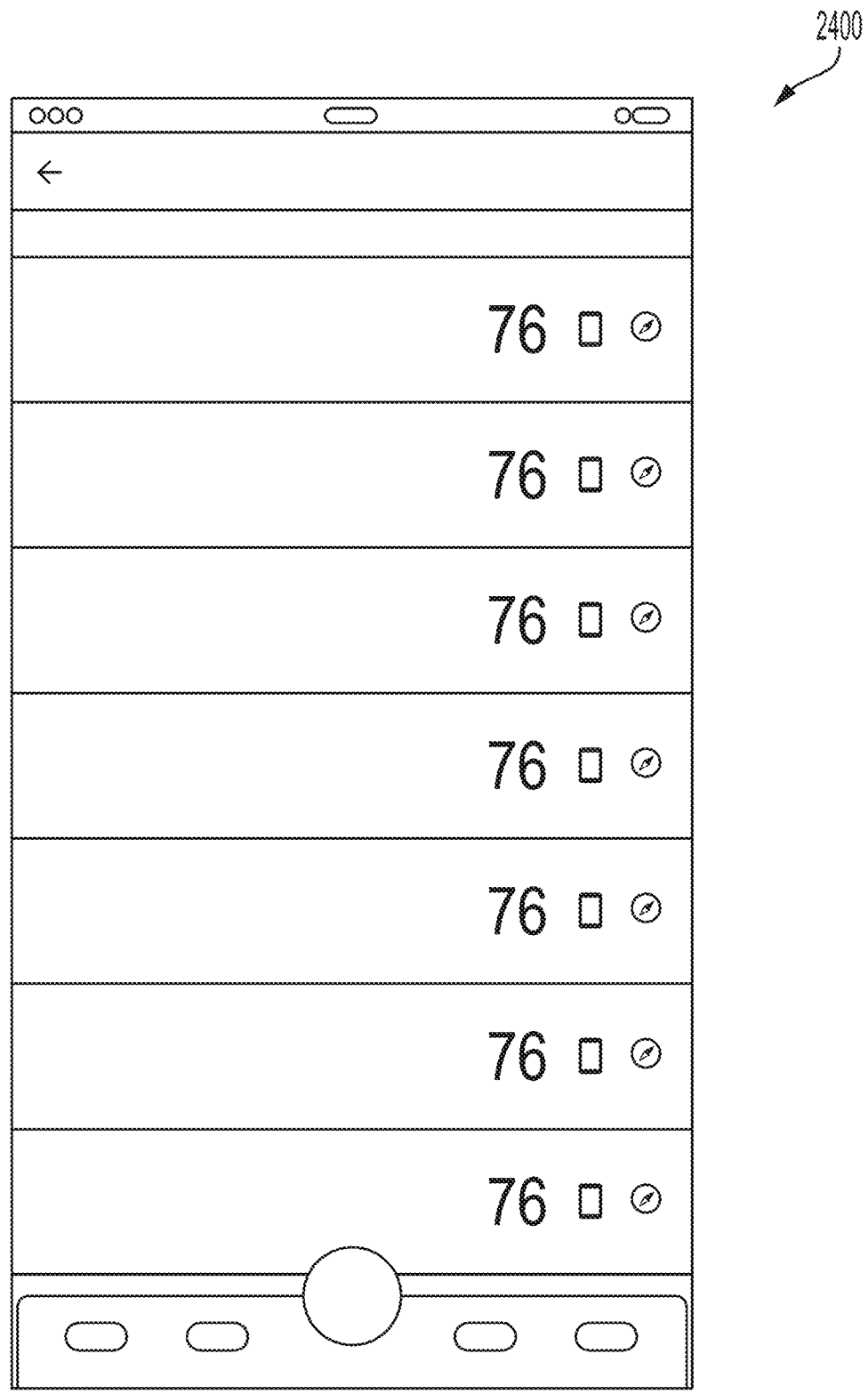
FIG. 24B is an exemplary screen shown when a user scrolls down the screen of FIG. 24A.

FIGS. 24A-24B depict a trip log. FIG. 24A shows a portion of a tip log spanning two days, whereas FIG. 24B shows a tip log screen 2400 that is shown as the user scrolls up and down along the trip log. The tip log shows a list of recent trips driven by the user, ordered by the most recent one. For each trip 2410, the SDS earned 2412 is displayed along with the destination address 2414, the starting time 2416, and the arrival time 2418.

Figure 25:
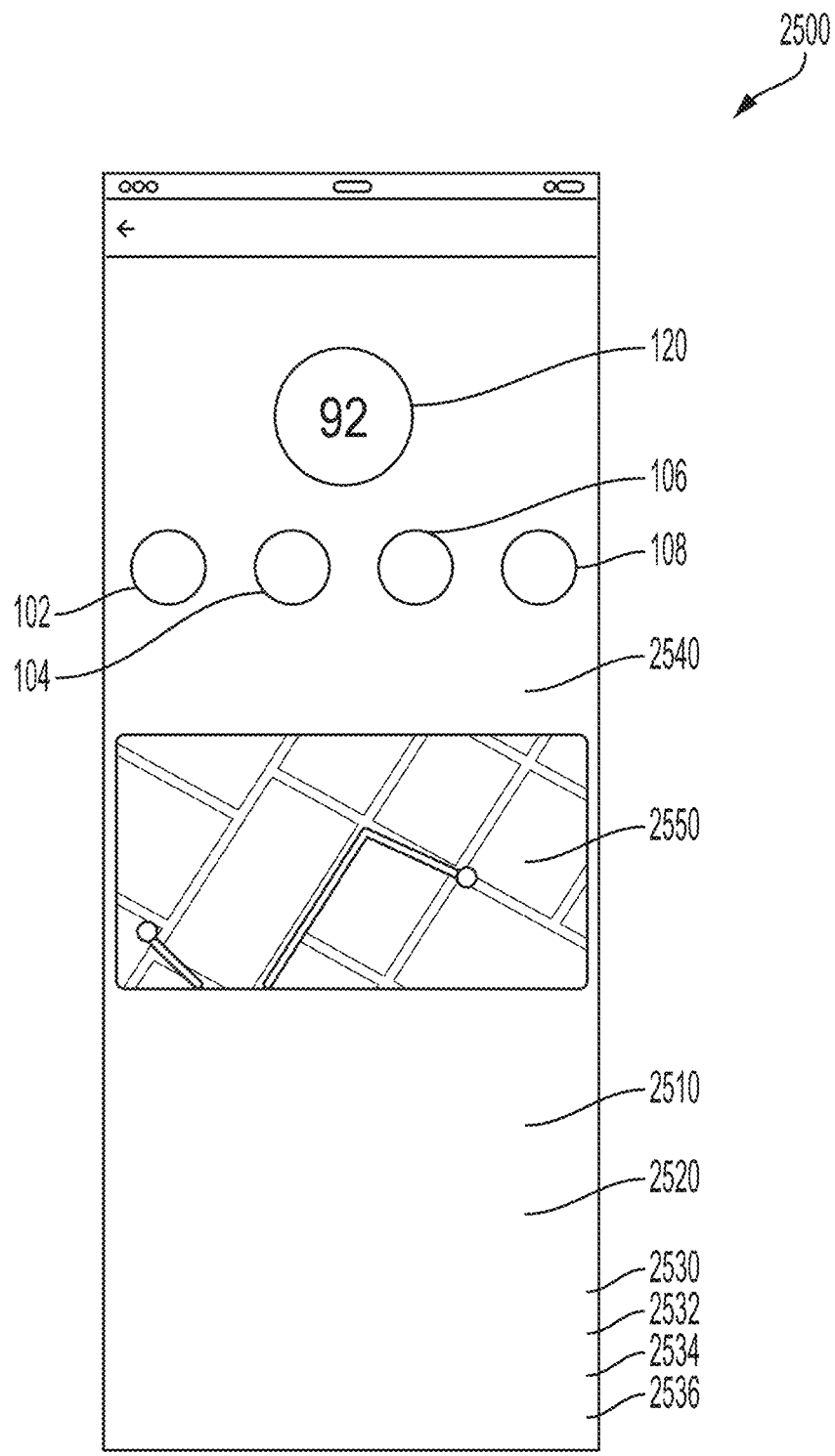
FIG. 25 is an alternate embodiment to the trip details screen of FIG. 22.

FIG. 25 show an alternate embodiment for the trip details screen. Trip details screen 2500 is divided into a number of sections. In one section, the overall telemetry score 120, for the trip, is displayed. The driving characteristics used to derive the driving score may also be displayed. For example, acceleration 102, braking 104, cornering 106 and speed 108 may all be displayed below the overall telemetry score. If no other factors are considered to derive an SDS, then the SDS is equal to the telemetry score 102. The duration of time for which the driving was distracted is also displayed as 2540. This may be due to the driver handling the phone 1020 while driving or due to the phone 1020 producing notifications during the trip. Section 2550 of screen 2500 displays a map showing the route taken during the trip. Additionally, the date and time of the trip may also be displayed, along with the source address 2510 and the destination address 2520. Other statistical information about the trip are shown such as: travel time 2530, distance 2532, average speed 2534 and maximum speed 2536.

Figure 26:
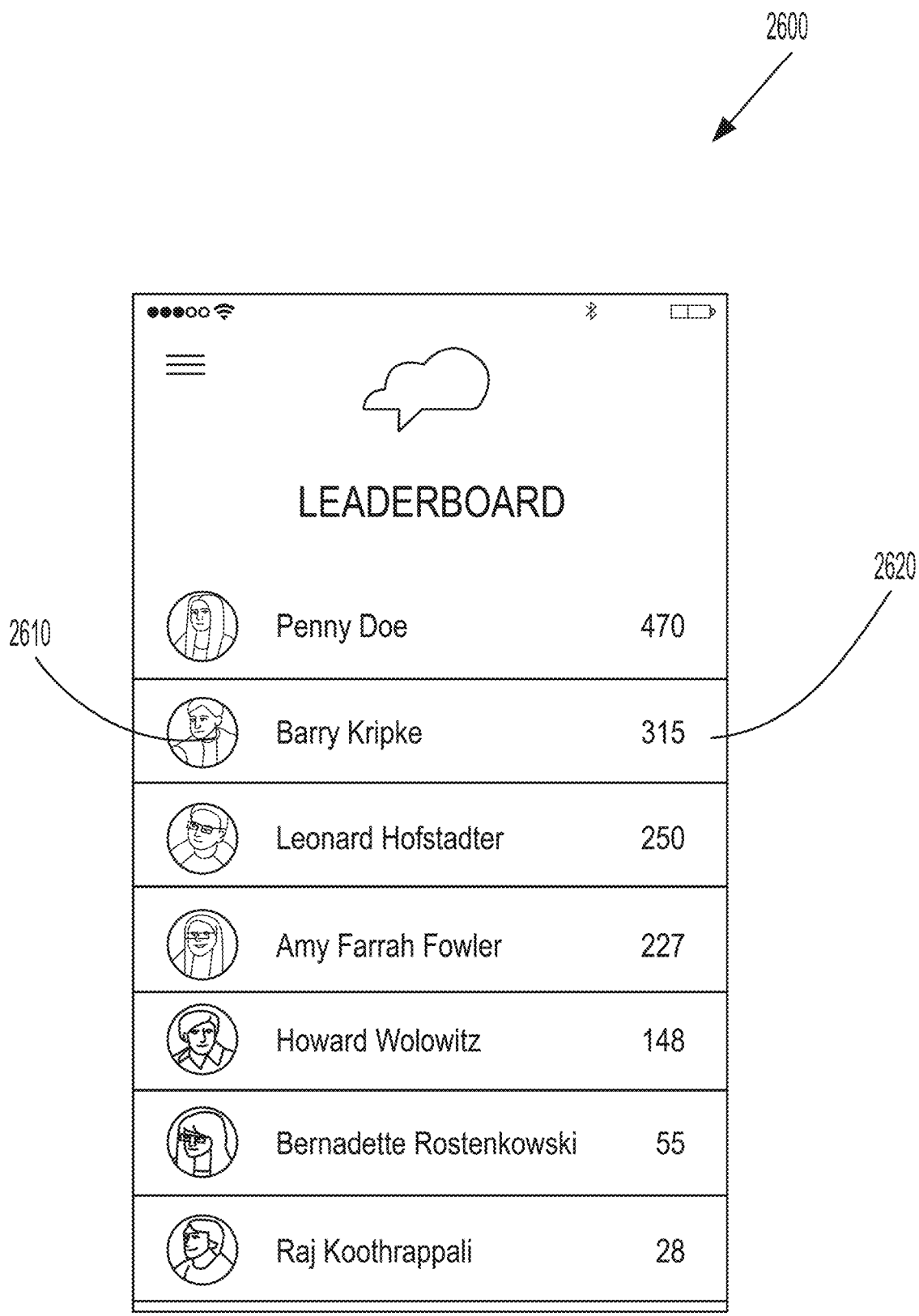
FIG. 26 is an exemplary screen of the mobile application showing a leaderboard listing the drivers with the top accumulated number of points.

In one optional embodiment, the above components generate points 2620 for each user 2610. In one embodiment, the points are computed by multiplying the SDS by a factor, such as 10, as mentioned earlier. FIG. 26 shows an optional screen 2600 which is called the Leaderboard screen. The Leaderboard screen contains a list of the drivers with top driving scores. For each driver their profile information 2610 such as name and picture are shown, along with their accumulated points 2620. All points may be accumulated on a centralized leader board where the user can compare their scores to other users. The top scorers on the leader board may be rewarded with cash incentives in their pursuit for increased road safety, or through the consumption of content in the app or purchasing services provided by $3^{rd}$ party partner through the app (e.g. roadside assistance). The optional centralized leaderboard may be maintained by server software 1100, via gamification rules engine 25100, and its output may be provided to mobile applications 24010 or to a website, to display point scores and other comparative data. Drivers who are high on the leaderboard may get significantly more points—for example twice the amount of points.

In a preferred embodiment, at the end of a selected period, such as every month for example, the system will calculate the aggregated score for each user and verify which badges they have earned based on the badge criteria. The users who have earned a badge will be notified. Badges with rewards will be paid to the user. The payouts could be cash payment via Interac email money transfer, or a retail voucher (e.g. free car wash code, or discount on a retail product such as winter tires).

This system works by calculating a monthly aggregate driving score (SDS) and users qualifying to earn badges based on the individual badge criteria. The badge criteria are tied to the SDS plus some additional attributes (e.g. number of trips, distance driven, etc.). The system creates a game of safe driving skills and allows control of the rewards by encouraging users to aiming to complete challenges to unlock badges by completing certain criteria such as reaching a specific SDS score, or driving distraction free for a given time period.

Figure 27:
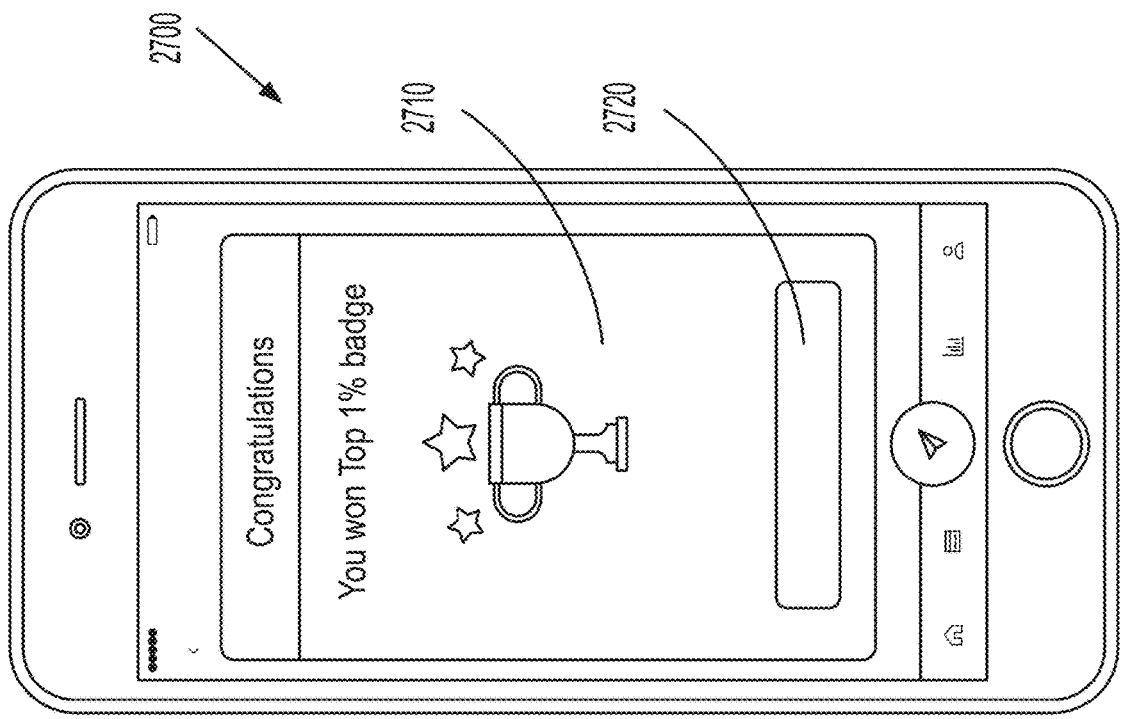
FIG. 27 is an exemplary screen of the mobile application showing a badge award notification screen.

FIG. 27 shows a screen 2700 which displays a message indicating that the user has earned a badge. The badge notification 2710 shown corresponds to the top 1% badge indicating that the driver has an SDS score higher than 99% of the drivers in the user community. A user interface element 2720 is also displayed which, when activated, allows the user to claim the badge.

Figure 28:
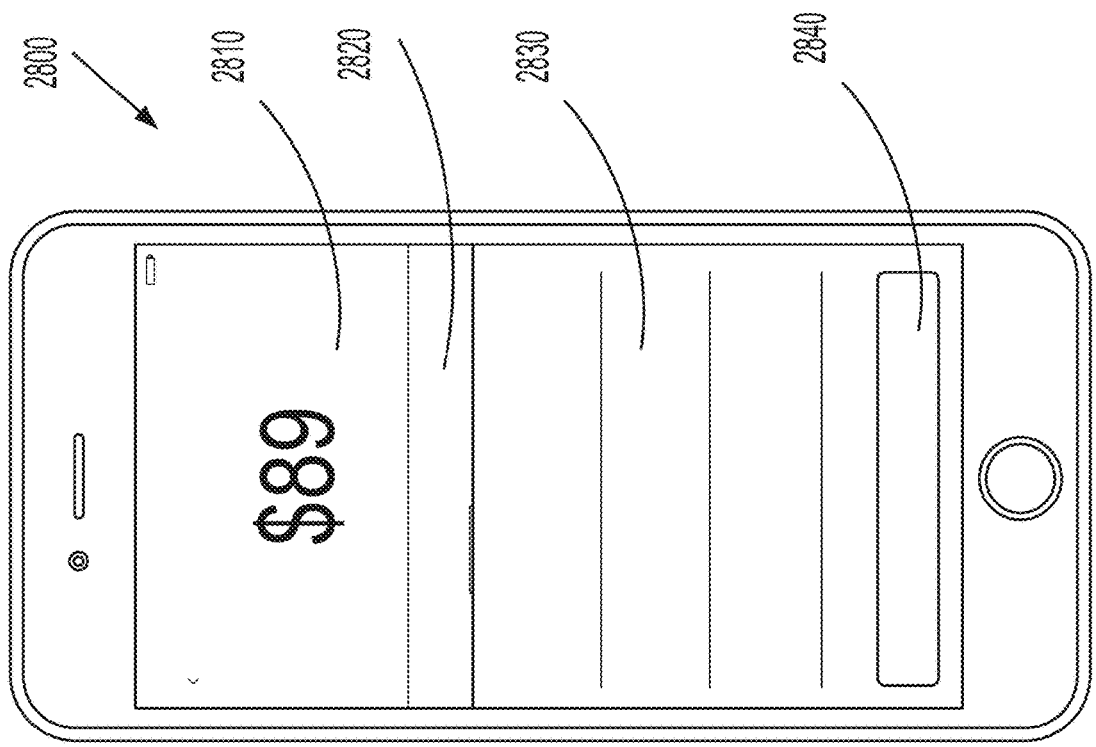
FIG. 28 is an exemplary screen of the mobile application showing a cash reward.

FIG. 28 shows a screen 2800 which displays cash reward 2810 earned by the user. The transfer table is shown in FIG. 28, which allows the user to get an email money transfer with the cash reward earned. The user provides his or her email 2830, and activates the "Send" user interface element 2840, to receive the rewards 2810 via email money transfer. In another embodiment, the user may provide the email information once, and the money transfer may happen automatically at the end of each rewards period, such as at the end of each month. In that case, a one-time setup fee may be charged to the user. Additionally, security credentials need to provide by the user which credentials are used in the email money transfer to verify the transaction.

Figure 29:
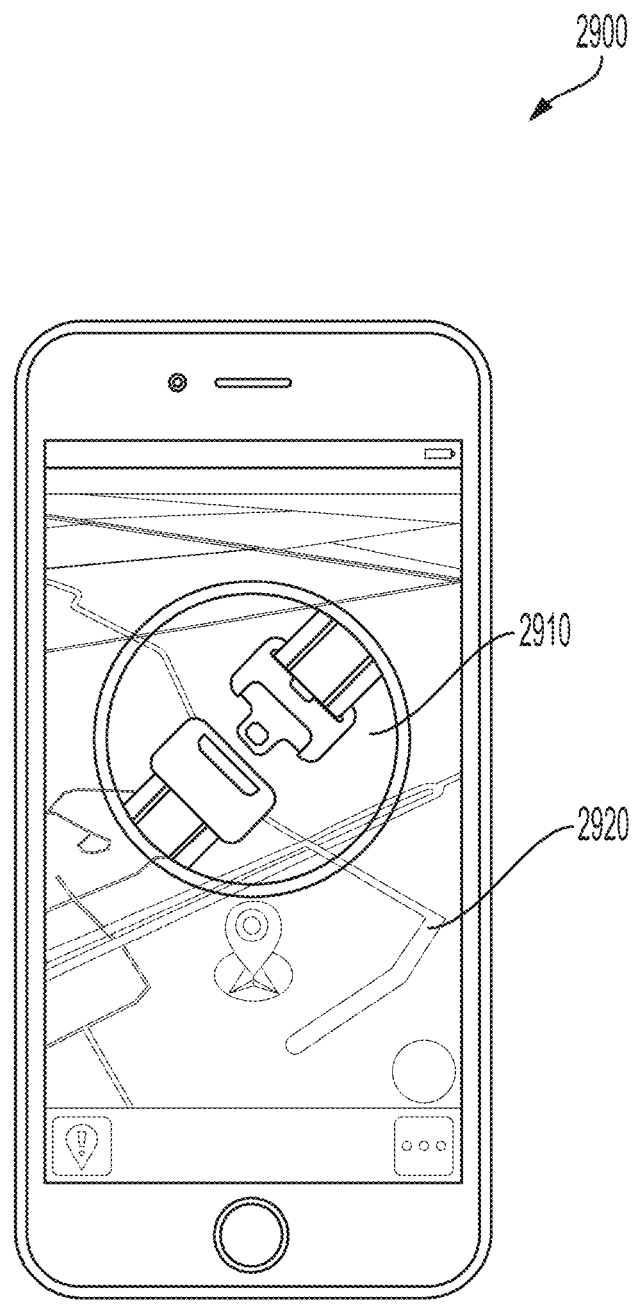
FIG. 29 is an exemplary screen of the mobile application indicating that driving mode is enabled.

FIG. 29 shows a driving mode screen 2900. In this disclosure, auto mode, also referred to as driving mode, refers to a mode on the driver's cellular phone that disables various notifications that may distract the driver of the vehicle. For example, the auto mode may disable email notification, SMS text message reception notification, social networking application notification, chat application notification, and other notifications that may distract a driver while driving. In this mode, the cellular phone screen simply shows a graphic 2910 indicating that the phone is in driving mode (Auto Mode), and may also display the current vehicle speed 2920.

Figure 30:
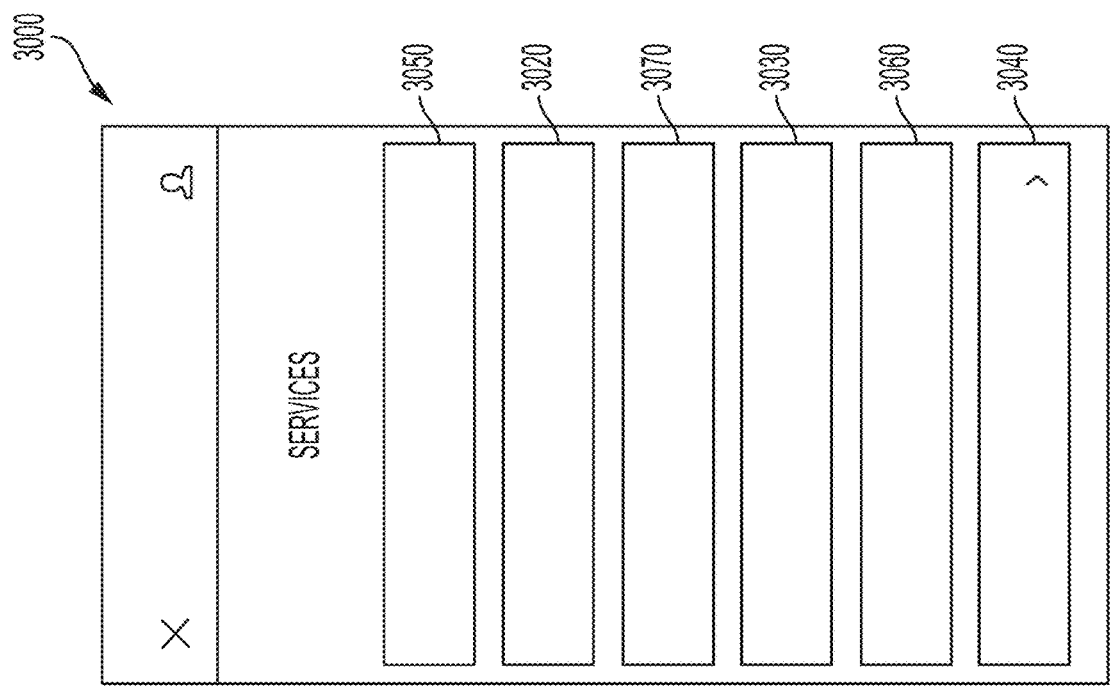
FIG. 30 is an exemplary roadside assistance screen showing the various services available.

FIG. 30 shows an exemplary roadside assistance services screen 3000 listing the various services available to the driver. Various user interface elements request, when activated, a corresponding roadside assistance service. For example, element 3020 is for requesting a flat tire service wherein the roadside assistance provider can replace the flat tire with a spare, repair the tire, or both. Element 3030 is for fuel service, which includes delivering fuel to stranded drivers whose vehicles have run out of fuel. Element 3050 is used to request a jump start where the vehicle's battery may be dead or needs recharging. Element 3060 is used to request towing for cases where the vehicle may not be repaired on the spot. Element 3070 is used to request lockout assistance where the driver has locked their case inside the vehicle. Element 3040 is for other services not specified by the other user interface elements but are still provided by the roadside assistance provider. More than one user interface element 3020-3070 may be selected to select multiple roadside assistance services.

Figure 31:
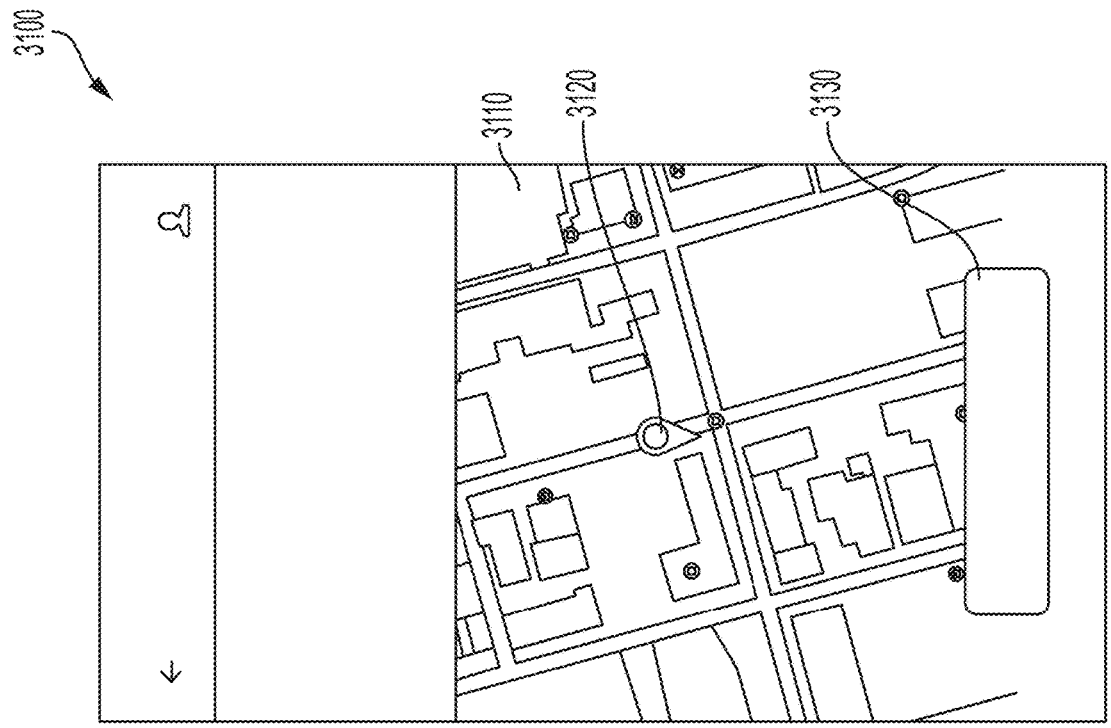
FIG. 31 is an exemplary roadside assistance screen including a map showing the driver's location.

Once one or more roadside assistance service is requested, a roadside assistance location screen 3100, as shown in FIG. 31, is displayed. Screen 3100 contains a map section 3110 on which the driver's location 3120 is shown. A user interface element 3130 may be used to confirm the location of the driver.

Figure 32:
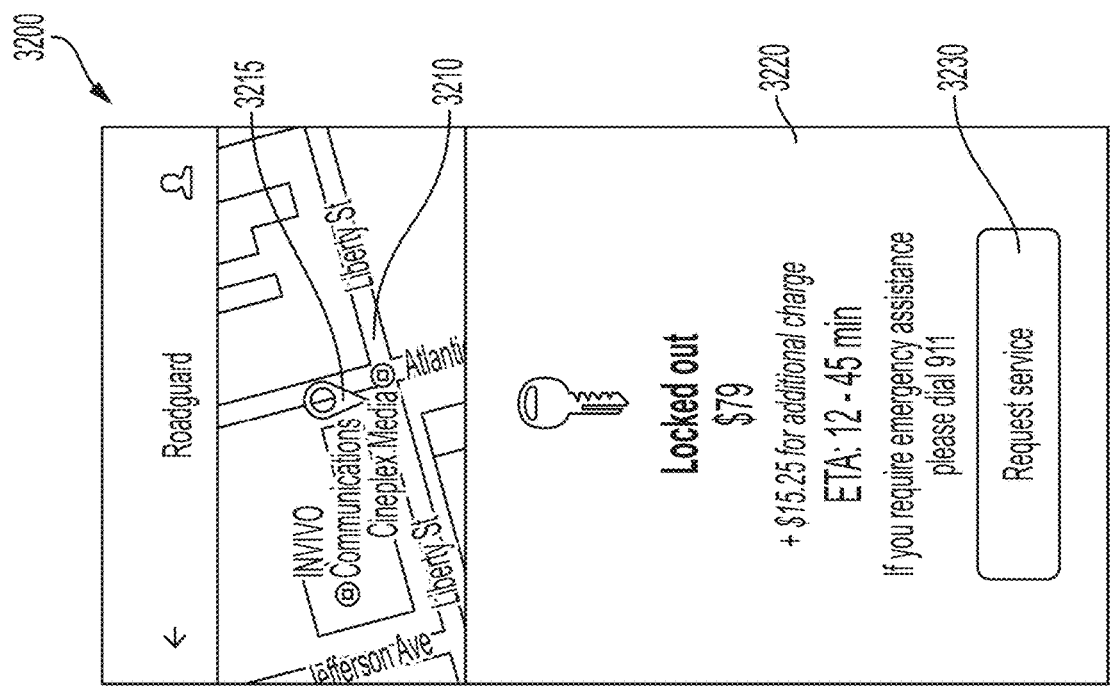
FIG. 32 is an exemplary locked out service screen.

FIG. 32 shows an example screen for the lockout service 3200 that may be requested by the driver (by activating element 3070 on screen 3000, for example). The lockout service screen 3200 contains a map section 3210 showing the user's location 3215, the cost 3220 for requesting the service, and a user interface element 3230 for requesting the service.

Figure 33:
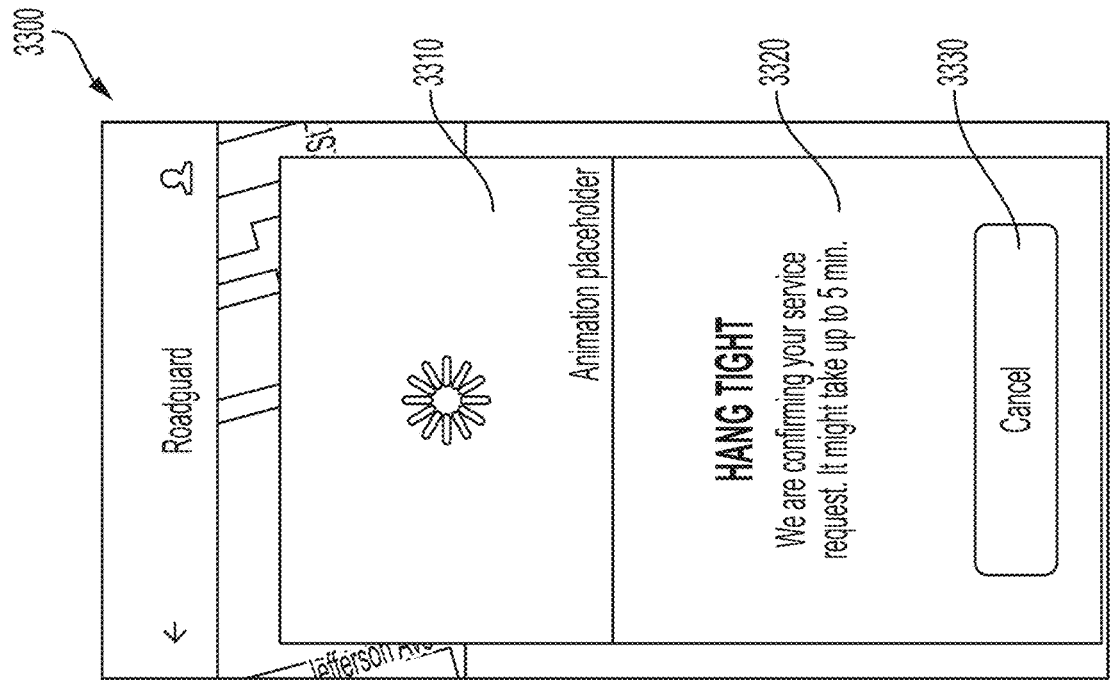
FIG. 33 is an exemplary roadside assistance progress screen.

Upon requesting a service, a progress screen 3300, shown in FIG. 33, is displayed. Progress screen 3300 includes a progress indicator 3310, a message 3320 indicating that the service is being requested and confirmed, and a user interface element 3330 for allowing the user to cancel the service, if desired.

Figure 34:
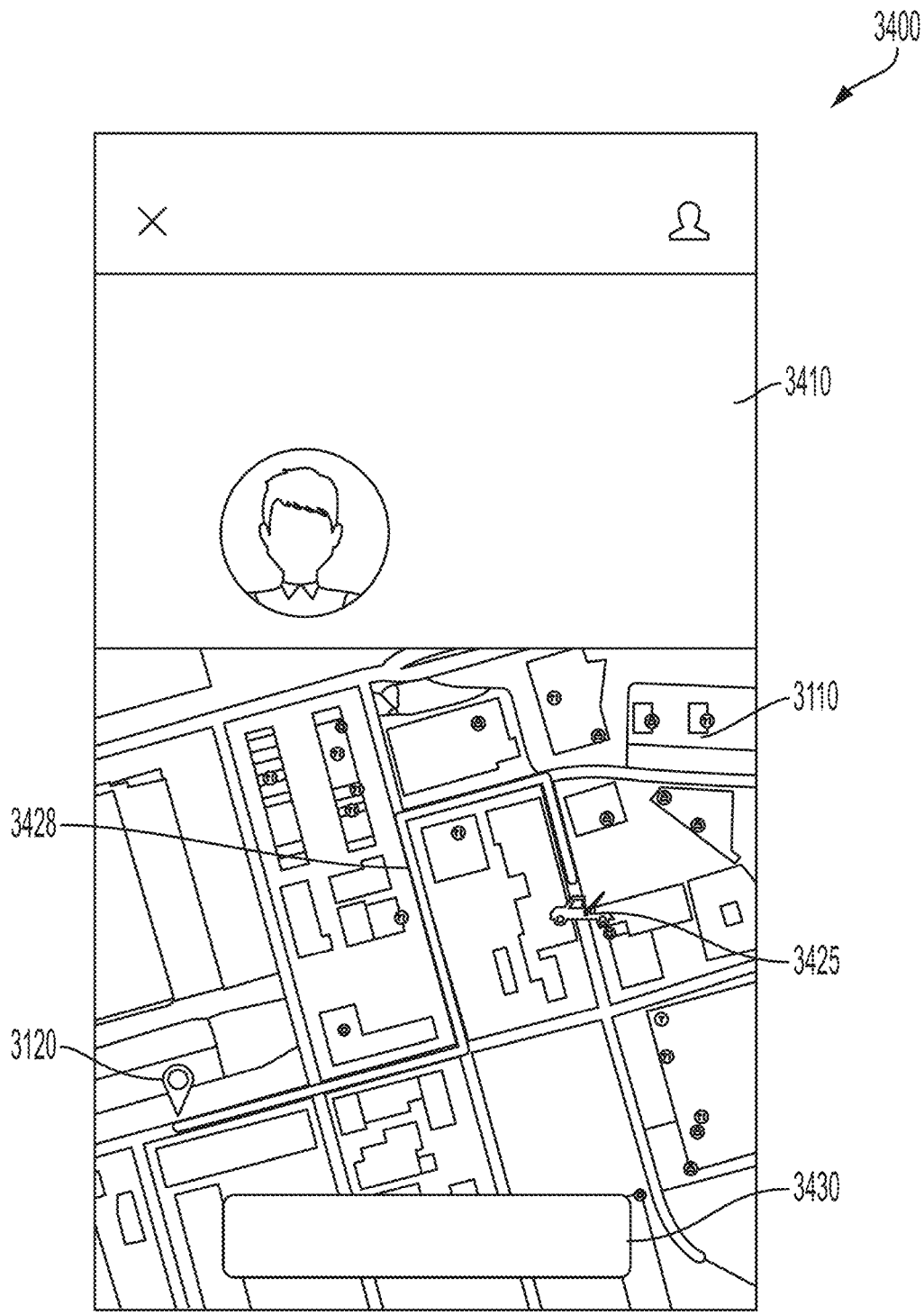
FIG. 34 is an exemplary roadside assistance confirmation screen.

FIG. 34 shows a confirmation screen 3400, in which the service is confirmed. Section 3110 is a map section showing the driver location 3120, the location of the service provider's specialist 3425, and the route 3428 taken by the service provider's specialist to reach the driver. Section 3410 identifies the service provider and shows an estimated time for arrival (ETA). In addition, user interface element 3430 allows the driver to call the specialist to provide any additional information or in case the specialist is late.

Figure 35:
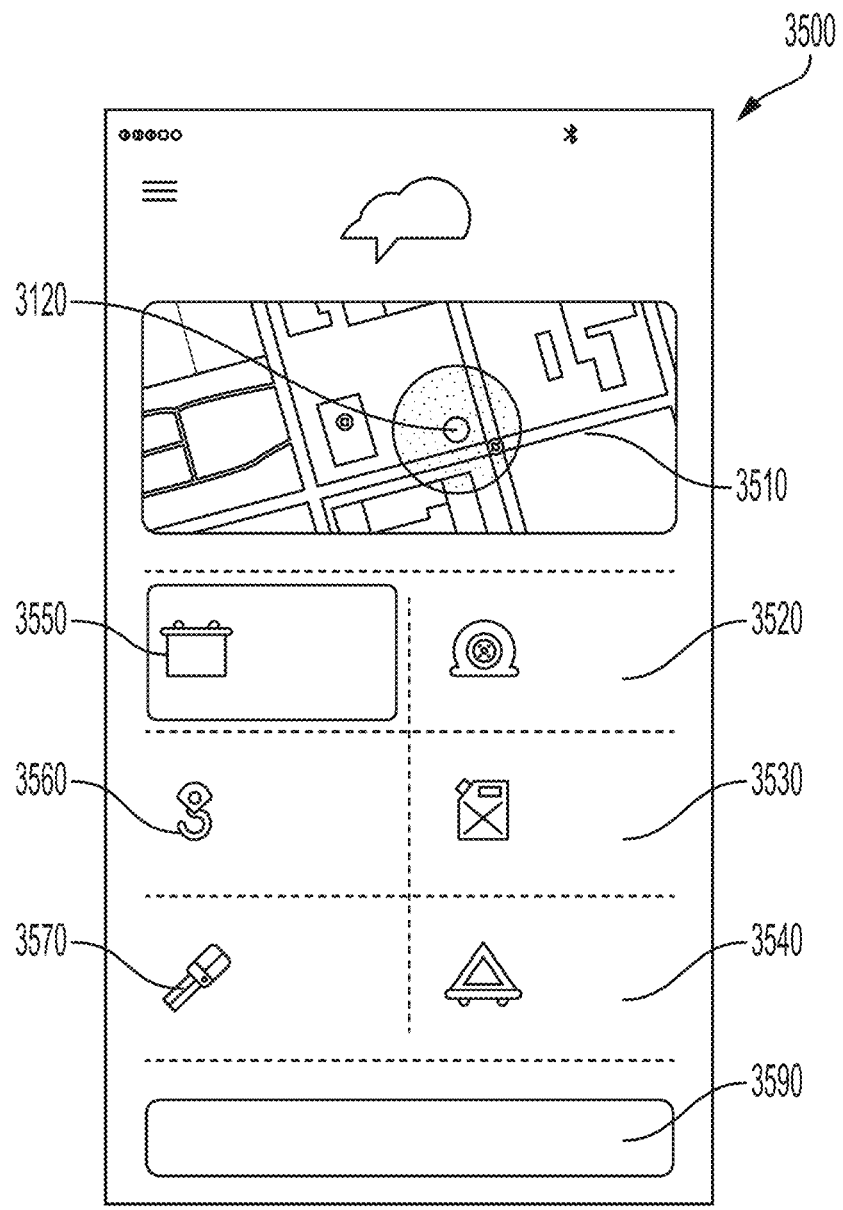
FIG. 35 is another exemplary roadside assistance screen showing available services, and driver location.

FIG. 35 depicts an alternate design for a roadside assistance screen 3500. Roadside assistance screen 3500 contains a map section 3510 showing the current location 3520 of the user's vehicle on a map. Various user interface elements are displayed which may be used to request various roadside assistance services. For example, element 3520 indicates that the user is requesting a flat tire service wherein the roadside assistance provider can replace the flat tire with a spare or repair the tire or both. Element 3530 is for fuel service, which includes delivering fuel to stranded drivers whose vehicles have run out of fuel. Element 3550 is used to request a jump start where the vehicle's battery may be dead or needs recharging. Element 3560 is used to request towing for cases where the vehicle may not be repaired on the spot. Element 3570 is used to request lockout assistance where the driver has locked their case inside the vehicle. Element 3540 is for other services not specified by the other user interface elements but are still provided by the roadside assistance provider. More than one user interface element 3520-3570 may be selected. Once all selections are made, the user may activate request user interface element 3590 to request the selected services from the roadside assistance provider.

The above-described embodiments are intended to be examples of the present invention and alterations and modifications may be effected thereto, by those of skill in the art, without departing from the scope of the invention, which is defined solely by the claims appended hereto.

The invention claimed is:

1. A method of using a smart mobility platform system comprising: a mobile application running on a mobile device, a mobile application server and a database on a computer system in data communication with a plurality of entities, the method comprising:
    providing a safe driving score by:
        gathering motion and positioning data, via the mobile device executing the mobile application, during driven trips taken during operation of a motor vehicle, said gathering performed using one or more of a global positioning satellite (GPS) receiver, a three-axis accelerometer, a gyroscope and an electronic compass, on the mobile device in the motor vehicle;
        collecting mobile device interaction data via the mobile device indicative of interaction of a driver with the mobile device during operation of the motor vehicle;
        determining driver distraction of the driver from the mobile device interaction data by determining one or more of:
            whether the mobile device is handled by the driver while driving;
            whether a screen of the mobile device is touched by the driver while driving;
            whether notifications on the mobile device are disabled while driving; and
            whether assisted driving is used;
        receiving the motion and positioning data;
        storing the motion and positioning data and the mobile device interaction data in a database of the computer system;
        deriving, via the computer system, a plurality of driving factors from the motion and positioning data;
        determining a telematics driving score based on the plurality of driving factors;
        determining the safe driving score based on the telematics driving score and the mobile device interaction data;
    providing a customer value based on the safe driving score and purchases made through the mobile application;
    calculating a reward based on the customer value;

unlocking a badge on the mobile application based on both use of the mobile application executing on the mobile device and demonstrated safe driving behavior as determined from the safe driving score; and paying the reward to the driver based on the badge;

wherein each of the plurality of driving factors is given an associated weight when determining the safe driving score, and the weight associated with each of the driving factors is determined at least in part on the motion and positioning data and the mobile device interaction data.

2. The method of claim 1, wherein the plurality of driving factors comprise: acceleration, speeding, cornering, and braking.

3. The method of claim 2, wherein the plurality of driving factors further comprise contextual data including at least one of: distance travelled, time of day, traffic, and day of week.

4. The method of claim 1, wherein said determining the safe driving score is further based on whether navigation was enabled, on the mobile device, during the driven trips.

5. The method of claim 4, wherein determining the safe driving score is further based on a notification reduction factor indicative of whether notification was enabled, on the mobile device, during the driven trips.

6. The method of claim 1, further comprising:
upon the safe driving score being equal to or more than a minimum safe driving score, then rewarding the driver with a percentage of the customer value.

7. The method of claim 6, wherein the customer value is derived by one of: an activity that reduces risk and claims loss ratio, a commission from a purchase made on a platform, and a commission from a big data or lead generation platform.

8. The method of claim 6, further comprising:
determining a distribution of safe driving scores for a plurality of drivers;
calculating the customer value for each one of the plurality of drivers, wherein the customer value is derived by one of: an activity that reduces risk and claims loss ratio, a commission from a purchase made on a platform, and a commission from a big data or lead generation platform;
calculating a fee from the customer value;
calculating from the percentage, a reward paid to each one of the plurality of drivers based on said each driver's safe driving score.

9. The method of claim 8, further comprising determining whether the driver has earned a badge for demonstrated safe driving behavior, and paying the reward to the driver based on the earned badge.

10. The method of claim 8, wherein determining the distribution of the safe driving scores is used to determine whether the driver has earned a top driver badge.

11. A smart mobility platform system comprising:
a client layer represented by a mobile application running on a mobile device;
an integration layer comprised of a mobile application server, a database in data communication with a plurality of entities; and
a backend layer;
wherein:
the mobile application comprises a trip detection and scoring module, the mobile device having one or more of a global positioning satellite (GPS) receiver, a three-axis accelerometer, a gyroscope and an electronic compass for gathering motion and positioning data from a motor vehicle during trips taken by driving using telematics and for sending the motion and positioning data to a driving telemetry service, the mobile application collecting mobile device interaction data via the mobile device indicative of interaction with the mobile device during operation of the motor vehicle, the mobile device determining distraction of a driver from the mobile device interaction data by determining one or more of:
whether the mobile device is handled by the driver while driving;
whether a screen of the mobile device is touched by the driver while driving;
whether notifications on the mobile device are disabled while driving; and
whether assisted driving is used;
the backend layer comprises the driving telemetry service receiving and storing the motion and positioning data in the database, deriving driving factors, and sending; and
the integration layer comprises the mobile application server that includes a trip rules engine receiving the driving factors, determining telematics driving scores for the trips from the driving factors and based on interaction with the mobile device during operation of the motor vehicle, and deriving a safe driving score from the telematics driving scores and the mobile device interaction data,
the system:
providing a customer value based on the safe driving score and purchases made through the mobile application;
calculating a reward based on the customer value;
unlocking a badge on the mobile application based on use of the mobile application and demonstrated safe driving behavior as determined from the safe driving score; and
paying the reward to the driver based on the badge,
wherein said trips comprise one or more sub-trips and said telematics driving scores are computed as a weighted average of telematics driving scores of each of the sub-trips, wherein the telematics driving scores are derived from the driving factors;
wherein each of the driving factors is given an associated weight when deriving the safe driving score, and the weight associated with each of the driving factors is determined at least in part on the motion and positioning data and the mobile device interaction data.

12. The system of claim 11, wherein:
the mobile application server further includes: a gamification rules engine for providing rules for awarding rewards, and a rewards engine for computing rewards for a driver based on the derived safe driving score, a customer value associated with a driver, and the rules defined by the gamification rules engine; and
wherein the system further includes a payment processing server for processing purchase payments made through the platform, by the driver, to determine the customer value.

13. The system of claim 11, wherein:
the backend layer comprises a banking server for depositing rewards to the driver.

14. A method by smart mobility platform including: a mobile application executing on a mobile device, an authentication server, a mobile application server, and a driving telemetry service, the method comprising:

the mobile application executing on the mobile device registering a user of the mobile device with the mobile application server and creating a user's account, for driving monitoring and rewards;

the mobile application requesting activation of the user's account with said driving telemetry service;

upon successful activation, the mobile application requesting enablement of trip detection by invoking a trip detection and scoring module, the mobile device having one or more of a global positioning satellite (GPS) receiver, a three-axis accelerometer, a gyroscope and an electronic compass;

sending, by said trip detection and scoring module, driving telemetry data and mobile device interaction data collected via the mobile device indicative of interaction with the mobile device during operation of a motor vehicle for a trip, in raw form, to said driving telemetry service;

storing said driving telemetry data and the mobile device interaction data for the trip in a database of the mobile application server;

determining driver distraction from the mobile device interaction data by determining one or more of:
  whether the mobile device is handled by the driver while driving;
  whether a screen of the mobile device is touched by the driver while driving;
  whether notifications on the mobile device are disabled while driving; and
  whether assisted driving is used;

the driving telemetry service deriving driving factors from said driving telemetry data, and sending said driving factors to the mobile application server;

the mobile application server deriving a safe driving score from said driving factors and the mobile device interaction data;

the mobile application server causing a push notification to be sent to said mobile application indicating the completion of deriving the safe driving score;

the mobile application receiving confirmation whether the user was a driver in said trip; and if the user was not a driver, the trip detection and scoring module sends a message to the driving telemetry service indicating that the trip data be tagged accordingly;

the mobile application server:
  providing a customer value based on the safe driving score and purchases made through the mobile application;
  calculating a reward based on the customer value;
  unlocking a badge on the mobile application based on use of the mobile application and demonstrated safe driving behavior as determined from the safe driving score; and
  paying the reward to the driver based on the badge;
  wherein each of the driving factors is given an associated weight when deriving the safe driving score, and the weight associated with each of the driving factors is determined at least in part on the driving telemetry data and the mobile device interaction data.

15. The method of claim 14, wherein said creating the user's account comprises:
  sending a request from said mobile application to an authentication server for creating a new user account;
  receiving, by said mobile application, a user identifier from said authentication server;
  performing a login to said authentication server;
  receiving an authentication token from said authentication server; and
  saving a profile for said user in a database on said mobile application server.

16. The method of claim 15, further comprising:
  signing in said user to said authentication server; and
  if the signing in was a first one, then obtaining an enterprise user ID from said mobile application server and storing said enterprise user ID in persistent storage on said mobile device.

17. The method of claim 14, further comprising:
  verifying a telephone number of the user using short messaging service prior to unlocking rewards.

18. The method of claim 14, further comprising verifying an email address of the user prior to enrolling said user in the driving telemetry service.

* * * * *